United States Patent
Manaka et al.

(10) Patent No.: US 9,190,941 B2
(45) Date of Patent: Nov. 17, 2015

(54) STEPPING MOTOR CONTROL CIRCUIT, MOVEMENT, AND ANALOG ELECTRONIC TIMEPIECE

(71) Applicant: SEIKO INSTRUMENTS INC., Chiba (JP)

(72) Inventors: Saburo Manaka, Chiba (JP); Kenji Ogasawara, Chiba (JP); Kazumi Sakumoto, Chiba (JP); Keishi Honmura, Chiba (JP); Kosuke Yamamoto, Chiba (JP); Satoshi Sakai, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 252 days.

(21) Appl. No.: 14/013,146

(22) Filed: Aug. 29, 2013

(65) Prior Publication Data

US 2014/0071795 A1    Mar. 13, 2014

(30) Foreign Application Priority Data

Sep. 7, 2012  (JP) .................. 2012-197539
Jul. 12, 2013  (JP) .................. 2013-146783

(51) Int. Cl.
*G04C 3/14* (2006.01)
*H02P 8/38* (2006.01)
*H02P 8/02* (2006.01)
*H02P 8/16* (2006.01)
*H02P 8/34* (2006.01)

(52) U.S. Cl.
CPC *H02P 8/38* (2013.01); *G04C 3/143* (2013.01); *H02P 8/02* (2013.01); *H02P 8/16* (2013.01); *H02P 8/34* (2013.01)

(58) Field of Classification Search
CPC .......... G04C 3/143; H02P 8/38; G04R 60/10; G04G 9/08
See application file for complete search history.

(56) References Cited

U.S. PATENT DOCUMENTS

| | | | |
|---|---|---|---|
| 4,477,196 A * | 10/1984 | Ito ............................ | 368/157 |
| 2006/0114750 A1 * | 6/2006 | Iida et al. .................. | 368/67 |
| 2008/0089183 A1 | 4/2008 | Manaka et al. ............ | 368/202 |
| 2009/0238044 A1 * | 9/2009 | Satoh et al. ............... | 368/155 |
| 2010/0172219 A1 | 7/2010 | Manaka et al. ............ | 368/80 |
| 2010/0254226 A1 * | 10/2010 | Ogasawara et al. ....... | 368/80 |
| 2010/0270965 A1 * | 10/2010 | Hasegawa et al. ........ | 318/696 |
| 2012/0044787 A1 * | 2/2012 | Manaka et al. ........... | 318/696 |
| 2012/0056574 A1 * | 3/2012 | Arisawa .................... | 318/696 |
| 2012/0287759 A1 * | 11/2012 | Manaka ..................... | 368/80 |
| 2012/0287760 A1 * | 11/2012 | Ogasawara et al. ....... | 368/80 |

OTHER PUBLICATIONS

Patent Abstracts of Japan, Publication No. 07-120567, Publication Date May 12, 1995.
Patent Abstracts of Japan, Publication No. 2003-259692, Publication Date Sep. 12, 2003.

* cited by examiner

*Primary Examiner* — Sean Kayes
(74) *Attorney, Agent, or Firm* — Adams & Wilks

(57) ABSTRACT

A rotation detection circuit detects an induced current flowing through a drive coil of a stepping motor in a detection section divided into a plurality of sections, and detects a rotation state of the stepping motor on the basis of a pattern indicating whether or not the induced current exceeds a predetermined reference value in each of the sections. A control unit selects a drive pulse corresponding to the rotation state detected by the rotation detection unit, and supplies a drive current to a drive coil to rotatably drive the stepping motor. The rotation detection unit carries out detection by selecting a detection direction of the induced current in the sections after the first section on the basis of whether or not the induced current exceeding each of a plurality of reference values is detected plural times in the first section.

22 Claims, 19 Drawing Sheets

FIG. 3

| STATE | ROTATION MOVEMENT | OUTPUT TIMING OF VRs | | T1 | T1 next | T2 | T2R | T3 | T3R | PULSE OPERATION |
|---|---|---|---|---|---|---|---|---|---|---|
| MINIMUM-LOAD-INCREMENT DRIVING MAXIMUM-MARGIN ROTATION | | | Vinv Vcomp | 0 0 | – – | – 1 | – – | – 1/0 | – – | PULSE DOWN |
| SMALL-LOAD-INCREMENT DRIVING LARGE-MARGIN ROTATION | | | Vinv Vcomp | 1 1 | 0 – | – 1 | – – | – 1/0 | – – | PULSE DOWN |
| INTERMEDIATE-LOAD-INCREMENT DRIVING INTERMEDIATE-MARGIN ROTATION | | | Vinv Vcomp | 1 1 | 1 0 | – – | 1 – | – – | 1/0 – | PULSE DOWN |
| LARGE-LOAD-INCREMENT DRIVING SMALL-MARGIN ROTATION | | | Vinv Vcomp | 1 1 | 1 1 | – – | 1 – | – – | 1/0 – | RETENTION |
| LARGE-LOAD-INCREMENT DRIVING LIMITED ROTATION | | | Vinv Vcomp | 1 1 | 1 1 | – – | 0 – | – – | 1 – | PULSE UP |
| MAXIMUM-LOAD-INCREMENT DRIVING NON-ROTATION | | | Vinv Vcomp | 1 1 | 0 – | – 0 | – – | – 0 | – – | PULSE UP+P2 |

FIG. 4

| STATE | ROTATION DETECTION | | | | | | | | RANK OPERATION | | |
|---|---|---|---|---|---|---|---|---|---|---|---|
| | THRESHOLD VALUE | T1 | T1 next | T2 | T2R | T3 | T3R | DETERMINATION | P1 | P2 |
| MINIMUM-LOAD-INCREMENT DRIVING MAXIMUM-MARGIN ROTATION | Vinv | 0 | — | — | — | — | — | DOWN | −1 RANK | NOT PERFORMED |
| | Vcomp | — | — | — | — | — | — | | | |
| SMALL-LOAD-INCREMENT DRIVING LARGE-MARGIN ROTATION | Vinv | 1 | — | — | — | — | — | DOWN | −1 RANK | NOT PERFORMED |
| | Vcomp | 0 | — | 1 | — | 1/0 | — | | | |
| INTERMEDIATE-LOAD-INCREMENT DRIVING INTERMEDIATE-MARGIN ROTATION | Vinv | 1 | 1 | — | 1 | — | 1/0 | DOWN | −1 RANK | NOT PERFORMED |
| | Vcomp | 1 | 0 | — | — | — | — | | | |
| LARGE-LOAD-INCREMENT DRIVING SMALL-MARGIN ROTATION | Vinv | 1 | 1 | — | 1 | — | 1/0 | RETENTION | ±0 RANK | NOT PERFORMED |
| | Vcomp | 1 | 1 | — | — | — | — | | | |
| LARGE-LOAD-INCREMENT DRIVING LIMITED ROTATION | Vinv | 1/0 | −/0 | — | 0 | — | — | UP | +1 RANK | NOT PERFORMED |
| | Vcomp | −/1/0 | — | 0 | — | 1 | 1 | | | |
| LARGE-LOAD-INCREMENT DRIVING LIMITED ROTATION | Vinv | 1 | 1 | — | — | — | — | UP | +1 RANK | NOT PERFORMED |
| | Vcomp | 1 | 1/0 | — | — | — | — | | | |
| MAXIMUM-LOAD-INCREMENT DRIVING NON-ROTATION | Vinv | 1/0 | −/0 | — | — | — | — | P2 + UP | +1 RANK | PERFORMED |
| | Vcomp | −/1/0 | — | 0 | — | 0 | — | | | |

FIG. 9

| STATE | ROTATION MOVEMENT | OUTPUT TIMING OF VRs | T1a | T1b | T2 | T2R | T3 | T3R | PULSE OPERATION |
|---|---|---|---|---|---|---|---|---|---|
| SMALL-LOAD-INCREMENT DRIVING LARGE-MARGIN ROTATION | | out1 — Vcomp; out2 — Vcomp | × × | 0 1 | 1 — | — — | — — | — — | PULSE DOWN |
| INTERMEDIATE-LOAD-INCREMENT DRIVING INTERMEDIATE-MARGIN ROTATION | | out1 — Vcomp; out2 — Vcomp | × × | 0 0 | 1 — | — — | — — | — — | PULSE DOWN |
| LARGE-LOAD-INCREMENT DRIVING SMALL-MARGIN ROTATION | | out1 — Vcomp; out2 — Vcomp | × × | 1 0 | — — | — 1 | — — | — — | RETENTION |
| LARGE-LOAD-INCREMENT DRIVING LIMITED ROTATION | | out1 — Vcomp; out2 — Vcomp | × × | 1 0 | — — | — 0 | — — | — 1 | PULSE UP |
| MAXIMUM-LOAD-INCREMENT DRIVING NON-ROTATION | | out1 P2 — Vcomp; out2 — Vcomp | × × | 0 0 | 0 — | — — | — — | — — | PULSE UP + P2 |

FIG. 10

| STATE | ROTATION DETECTION | | | | | | | RANK OPERATION | | |
|---|---|---|---|---|---|---|---|---|---|---|
| | DETECTION | T1a | T1b | T2 | T2R | T3R | | DETERMINATION | P1 | P2 |
| SMALL-LOAD-INCREMENT DRIVING LARGE-MARGIN ROTATION | out_1 | × | 0 | 1 | — | — | | DOWN | −1 RANK | NOT PERFORMED |
| | out_2 | × | 1 | — | — | — | | | | |
| INTERMEDIATE-LOAD-INCREMENT DRIVING INTERMEDIATE-MARGIN ROTATION | out_1 | × | 0 | 1 | — | — | | DOWN | −1 RANK | NOT PERFORMED |
| | out_2 | × | 1 | — | — | — | | | | |
| LARGE-LOAD-INCREMENT DRIVING SMALL-MARGIN ROTATION | out_1 | × | 1 | — | — | — | | RETENTION | ±0 RANK | NOT PERFORMED |
| | out_2 | × | 0 | — | 1 | — | | | | |
| LARGE-LOAD-INCREMENT DRIVING LIMITED ROTATION | out_1 | × | 1 | — | — | — | | UP | +1 RANK | NOT PERFORMED |
| | out_2 | × | 0 | — | 0 | 1 | | | | |
| MAXIMUM-LOAD-INCREMENT DRIVING NON-ROTATION | out_1 | × | 0 | 0 | — | — | | P2 + UP | +1 RANK | PERFORMED |
| | out_2 | × | 0 | — | — | — | | | | |

MASK  T1a IS SET AS INVALID DETECTION SECTION (MASK)
WHEN T1b IS 0, CURRENT IN THE SAME DIRECTION AS DRIVE PULSE IS DETECTED
WHEN T1b IS 1, CURRENT IN DIRECTION OPPOSITE TO THAT OF DRIVE PULSE IS DETECTED

FIG. 15

| STATE | ROTATION MOVEMENT | OUTPUT TIMING OF VRs | | T1a | T1b | T2 | T2R | T3R | PULSE OPERATION |
|---|---|---|---|---|---|---|---|---|---|
| SMALL-LOAD-INCREMENT DRIVING MAXIMUM-MARGIN ROTATION | | (waveform) | Vinv / Vcomp | 0 | – | – | – | – | PULSE DOWN |
| | | | | 0 | – | 1 | – | – | |
| INTERMEDIATE-LOAD-INCREMENT DRIVING INTERMEDIATE-MARGIN ROTATION | | (waveform) | Vinv | 1 | 0 | – | – | – | PULSE DOWN |
| | | | Vinv | – | – | – | 1 | – | |
| LARGE-LOAD-INCREMENT DRIVING SMALL-MARGIN ROTATION | | (waveform) | Vinv | 1 | 1 | – | – | – | RETENTION |
| | | | Vinv | – | – | – | 1 | – | |
| LARGE-LOAD-INCREMENT DRIVING LIMITED ROTATION | | (waveform) | Vinv | 1 | 1 | – | – | – | PULSE UP |
| | | | Vinv | – | – | – | – | 1 | |
| MAXIMUM-LOAD-INCREMENT DRIVING NON-ROTATION | | (waveform) | Vinv / Vcomp | 1 | – | – | – | – | PULSE UP + P2 |
| | | | | – | – | 0 | – | – | |

FIG. 16

| STATE | THRESHOLD VALUE | ROTATION DETECTION | | | | | | RANK OPERATION | | |
|---|---|---|---|---|---|---|---|---|---|---|
| | | T1a | T1b | T2 | T2R | T3R | | DETERMINATION | P1 | P2 |
| SMALL-LOAD-INCREMENT DRIVING LARGE-MARGIN ROTATION | Vinv | 1 | — | — | — | — | | DOWN | −1 RANK | NOT PERFORMED |
| | Vcomp | — | — | — | — | — | | | | |
| INTERMEDIATE-LOAD-INCREMENT DRIVING INTERMEDIATE-MARGIN ROTATION | Vinv | 1 | — | — | — | — | | DOWN | −1 RANK | NOT PERFORMED |
| | Vcomp | — | — | 1 | — | — | | | | |
| LARGE-LOAD-INCREMENT DRIVING SMALL-MARGIN ROTATION | Vinv | 1 | 1 | — | — | — | | RETENTION | ±0 RANK | NOT PERFORMED |
| | Vcomp | — | — | — | 1 | — | | | | |
| LARGE-LOAD-INCREMENT DRIVING LIMITED ROTATION | Vinv | 1 | 1 | — | — | — | | UP | +1 RANK | NOT PERFORMED |
| | Vcomp | — | — | — | 0 | 1 | | | | |
| MAXIMUM-LOAD-INCREMENT DRIVING NON-ROTATION | Vinv | 1/0 | −/0 | — | — | — | | P2 + UP | +1 RANK | PERFORMED |
| | Vcomp | — | — | 0 | — | — | | | | |

STEPPING MOTOR CONTROL CIRCUIT, MOVEMENT, AND ANALOG ELECTRONIC TIMEPIECE

BACKGROUND OF THE INVENTION

1. Field of the Invention

The present invention relates to a stepping motor control circuit, a movement provided with the stepping motor control circuit, and an analog electronic timepiece using the movement.

2. Background Art

In the related art, a stepping motor, which is provided with a stator having a rotor accommodation through-hole and a plurality of positioning units that determine a stable stationary position of a rotor, the rotor being disposed inside the rotor accommodation through-hole, and a drive coil being wound around the stator, has been used in an analog electronic timepiece and the like. To allow the stepping motor to rotate in a relatively reliable manner, rotation detection thereof is carried out to allow the stepping motor to operate according to rotation detection results (for example, refer to Japanese Patent Nos. 3302804 and 4165092, International Publication No. 2005/119377, and JP-A-2010-166798).

A rotation detection method described in Japanese Patent Nos. 3302804 and 4165092 is configured to have a first detection section in which a rotor movement state after blocking a drive pulse is detected, and a second detection section in which an induced signal in a direction opposite to that of the first detection section is detected to carry out the final rotation determination based on the result. According to this configuration, rotation detection of the stepping motor is carried out, and the stepping motor is allowed to rotatably drive by the drive pulse according to rotation detection results.

The rotation detection is possible by the configuration. However, there is a problem in that in a case where a load variation (a calendar load, or a load of a moment of the long hand) is large, an induced signal varies, and thus accurate rotation detection is difficult.

On the other hand, a rotation detection method described in International Publication No. 2005/119377 is configured as follows. After rotating a rotor with a main drive pulse P11, when a detection voltage of an induced signal is less than a reference voltage Vcomp, the rotor is driven with a correction drive pulse P2, and the rotor is driven after changing (pulse-up) a next main drive pulse P1 to a main drive pulse P12 having energy larger than that of the main drive pulse P11. In addition, when it is detected that a detection time during rotation with the main drive pulse P12 is faster than a reference time, the main drive pulse P12 is pulsed down to the main drive pulse P11 to allow the rotor to drive with an appropriate main drive pulse P1.

However, the detection method is a rotation detection method using a phenomenon in which a detection time of the induced signal is delayed along with a relative load increase with respect to the drive energy, and a level of the induced signal decreases. Accordingly, when a load variation (a calendar load, or a load of a moment of the long hand) which is equal to or more than a certain load variation occurs, an angular velocity of the rotor decreases, and thus the induced signal is apt to decrease regardless of rotation. Therefore, there is a problem in that rotation is falsely detected as non-rotation, and thus the rotor is driven with the correction drive pulse. As a result, there is a problem in that a consumption current increases, and the lifetime of a battery decreases.

In addition, the rotation detection method described in JP-A-2010-166798 is a rotation detection method using a phenomenon in which the detection time of the induced signal is delayed along with an increase in a load, and a pattern of an induced signal VRs in sections obtained by dividing a detection section into a plurality of sections is different depending on a rotation state of the stepping motor. However, similarly to the invention described in International Publication No. 2005/119377, there is a problem in that false rotation detection may be conducted due to an effect of a load variation, and power consumption may increase.

SUMMARY OF THE INVENTION

It is an aspect of the present application to conduct accurate rotation detection by reducing an effect due to a load variation.

According to the application, there is provided a stepping motor control circuit including: a rotation detection unit that detects an induced current flowing through a drive coil due to free vibration of a stepping motor in a detection section divided into a plurality of sections, and detects a rotation state of the stepping motor on the basis of a pattern indicating whether or not an induced current exceeding a predetermined reference value is detected in each of the sections by using a phenomenon in which a detection time of the induced current is delayed along with a relative load increase with respect to drive energy, and a level of the induced current decreases; and a control unit that selects a drive pulse corresponding to the rotation state that is detected by the rotation detection unit among a plurality of kinds of drive pulses, each having different energy, and supplies a drive current to the drive coil by the selected drive pulse to rotatably drive the stepping motor. The rotation detection unit carries out the detection by selecting a detection direction of the induced current in sections after a first section on the basis of whether or not the induced current exceeding a predetermined reference value is detected in the first section that is an initial section of the detection section, and detects the rotation state of the stepping motor by a pattern based on the induced current detected in each of the sections.

According to the application, there is provided a stepping motor control circuit including: a rotation detection unit that detects an induced current flowing through a drive coil due to free vibration of a stepping motor in a detection section divided into a plurality of sections, and detects a rotation state of the stepping motor on the basis of a pattern indicating whether or not an induced current exceeding a predetermined reference value is detected in each of the sections by using a phenomenon in which a detection time of the induced current is delayed along with a relative load increase with respect to drive energy, and a level of the induced current decreases; and a control unit that selects a drive pulse corresponding to the rotation state that is detected by the rotation detection unit among a plurality of kinds of drive pulses, each having different energy, and supplies a drive current to the drive coil by the selected drive pulse to rotatably drive the stepping motor. The rotation detection unit includes first and second detection elements that detect induced currents flowing through the drive coil due to free vibration of the stepping motor in directions opposite to each other, and is configured to detect the induced current in the detection section by alternately repeating a first closed circuit including the drive coil of the stepping motor and the detection elements, and a second closed circuit constituted by the drive coil and a low-impedance element. In a first section that is an initial section of the detection section, the rotation detection unit carries out the detection by selecting a detection element to be used in sections after the first section on the basis of detection results of the induced current using the first and second detection elements, and detects the rotation state of the stepping motor by a pattern based on the induced current detected in each of the sections.

In addition, according to the application, there is provided a movement including the stepping motor control circuit.

In addition, according to the application, there is provided an analog electronic timepiece including the movement.

According to the stepping motor control circuit according to the application, accurate rotation detection may be carried out by reducing an effect of a load variation.

According to the movement according to the application, an analog electronic timepiece, which is capable of carrying out accurate rotation detection by reducing the effect of the load variation, may be constituted.

According to the analog electronic timepiece according to the application, accurate rotation detection may be carried out by reducing the effect of the load variation, and thus accurate hand movement or low power consumption may be realized.

BRIEF DESCRIPTION OF THE DRAWINGS

FIG. 3 is a timing diagram of the stepping motor control circuit, the movement, and the analog electronic timepiece according to a first embodiment of the invention;

FIG. 4 is a determination chart of the stepping motor control circuit, the movement, and the analog electronic timepiece according to the first embodiment of the invention;

FIG. 9 is a timing chart of the stepping motor control circuit, the movement, and the analog electronic timepiece according to a second embodiment of the invention;

FIG. 10 is a determination chart of the stepping motor control circuit, the movement, and the analog electronic timepiece according to the second embodiment of the invention;

FIG. 15 is a timing chart of the stepping motor control circuit, the movement, and the analog electronic timepiece according to a third embodiment of the invention;

FIG. 16 is a determination chart of the stepping motor control circuit, the movement, and the analog electronic timepiece according to the third embodiment of the invention;

DETAILED DESCRIPTION OF THE INVENTION

Figure 1:
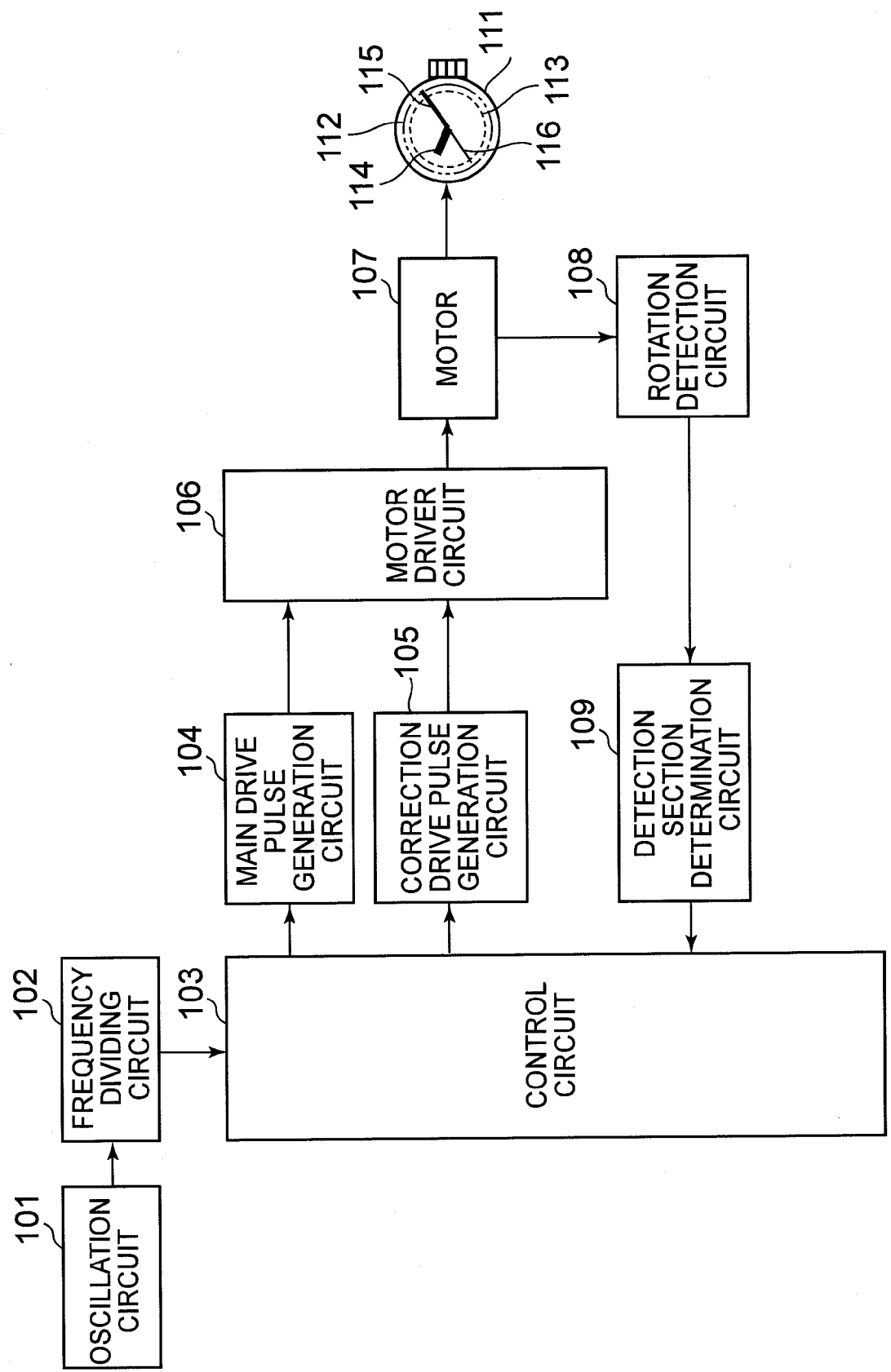
FIG. 1 is a block diagram that is common to a stepping motor control circuit, a movement, and an analog electronic timepiece according to each embodiment of the invention.

Hereinafter, embodiments of the invention will be described. In addition, in the drawings of respective embodiments, the same reference numerals will be given to parts having the same functions.

FIG. 1 shows a block diagram common to a stepping motor control circuit according to each embodiment of the invention, a movement provided with the stepping motor control circuit, and an analog electronic timepiece provided with the movement. FIG. 1 illustrates an example of an analog electronic watch.

In FIG. 1, the analog electronic timepiece includes an oscillation circuit 101 that generates a signal of a predetermined frequency, a frequency dividing circuit 102 that frequency-divides the signal generated in the oscillation circuit 101 to generate a timepiece signal serving as a reference of time counting, and a control circuit 103 that carries out various kinds of control such as control of respective electronic circuit elements constituting an electronic timepiece, and change control of a drive pulse (pulse control) starting from a time counting operation by counting the timepiece signal.

In addition, the analog electronic timepiece includes a main drive pulse generation circuit 104 that selects any of a plurality of kinds of main drive pulses P1, each having different energy, on the basis of a main drive pulse control signal transmitted from the control circuit 103, and that outputs the selected main drive pulse P1, and a correction drive pulse generation circuit 105 that outputs a correction drive pulse P2 having energy larger than that of the respective main drive pulses P1 on the basis of a correction drive pulse control signal transmitted from the control circuit 103.

In addition, the analog electronic timepiece includes a motor driver circuit 106 that drives a stepping motor 107 on the basis of the main drive pulse P1 transmitted from the main drive pulse generation circuit 104, and the correction drive pulse P2 transmitted from the correction drive pulse generation circuit 105, and the stepping motor 107.

In addition, the analog electronic timepiece includes a timepiece case 111, an analog display portion 112 that is disposed on an outer surface side of the timepiece case 111, and has time indicating hands (an hour hand 114, a minute hand 115, and a second hand 116) that are driven by the stepping motor 107 or a calendar display portion (not shown), and a movement 113 that is disposed inside the timepiece case 111.

In addition, the analog electronic timepiece includes a rotation detection circuit 108 that detects an induced current Ik that is generated due to free vibration of the stepping motor 107 and exceeds each of a plurality of predetermined reference values (two kinds including a first reference value and a second reference value) in a detection section T immediately after driving the stepping motor 107 by the main drive pulses P1, and a detection section determination circuit 109 that determines whether or not the rotation detection circuit 108 detects the induced current Ik exceeding the reference values in which section within the detection section T.

In addition, the details will be described later, but the rotation detection circuit 108 is configured to detect the induced current Ik exceeding the reference values by converting the induced current Ik to a voltage by a detection element. A case in which an induced voltage signal VRs exceeding a predetermined first reference voltage Vinv is detected is equivalent to a case in which the induced current Ik exceeding the first reference value is detected. In addition, a case in which an induced voltage signal VRs exceeding a predetermined second reference voltage Vcomp is detected is equivalent to a case in which an induced current Ik exceeding the second reference value is detected. The second reference value is larger than the first reference value, and the second reference voltage Vcomp is set to a value larger than that of the first reference voltage Vinv. The first reference voltage Vinv is a reference of determining a degree of margin of drive energy, and is a reference voltage at the time of carrying out rotation detection at the other polarity. The second reference voltage Vcomp is a reference voltage at the time of carrying out rotation detection at one polarity. As the first reference voltage Vinv and the second reference voltage Vcomp, a voltage having the same one polarity is used.

In addition, the detection section determination circuit 109 is configured to determine in which section within the detection section T the induced current Ik exceeding the first reference value or the second reference value is detected by determining in which section within the detection section T the induced voltage signal VRs exceeding the first reference voltage Vinv or the second reference voltage Vcomp is detected by the rotation detection circuit 108.

The detection section T for detecting a rotation state of the stepping motor 107 is provided immediately after blocking the main drive pulses P1, and is divided into a plurality of sections (in this embodiment, three sections of sections T1 to T3).

The detection section determination circuit 109 determines whether or not the induced voltage signal VRs detected by the rotation detection circuit 108 exceeds the reference voltage Vinv or Vcomp in each section of the detection section T (a determination value), and outputs a detection signal indicating rotation states such as the degree of margin of drive energy and non-rotation by a combination pattern of the determination value in the respective sections (a pattern of the induced voltage signal VRs) to the control circuit 103.

The oscillation circuit 101, the frequency dividing circuit 102, the control circuit 103, the main drive pulse generation circuit 104, the correction drive pulse generation circuit 105, the motor driver circuit 106, the stepping motor 107, the rotation detection circuit 108, and the detection section determination circuit 109 are constituent elements of the movement 113.

In general, a mechanical body of a timepiece, which is constituted by a power source of a timepiece, and devices of time reference and the like, is referred to as a movement. An electronic type mechanical body is sometimes referred to as a module. In a completed state as a timepiece, a dial plate and hands are mounted on the movement, and the movement is accommodated in the timepiece case.

The control circuit 103 also has a function of determining the rotation state of the stepping motor 107 (whether or not the stepping motor 107 rotates, the degree of margin of energy of the main drive pulse P1, and the like) by a pattern of determination value indicating whether or not the induced voltage signal VRs exceeds the reference voltage Vinv or Vcomp in each of the sections within the detection section T, and the like.

The rotation detection circuit 108 determines a level of the induced voltage signal VRs that is generated due to free vibration immediately after rotation driving of the stepping motor 107, and detects a point of time at which the induced voltage signal VRs exceeding the reference voltage Vinv or Vcomp is generated. The reference voltages Vinv and Vcomp are set to values with which determination of the rotation states such as rotation and non-rotation, and change control of the drive pulse (pulse control) may be carried out by a combination pattern of sections in which the induced voltage signal VRs exceeding the reference voltage Vinv or Vcomp is detected.

In a case where the rotor of the stepping motor 107 moves at a speed exceeding a constant speed like a case in which the stepping motor 107 rotates, the rotation detection circuit 108 detects the induced voltage signal VRs exceeding the second reference voltage Vcomp. In a case where the rotor of the stepping motor 107 does not move at a speed exceeding a constant speed like a case in which the stepping motor 107 does not rotate, the rotation detection circuit 108 does not detect the induced voltage signal VRs exceeding the second reference voltage Vcomp. The first reference voltage Vinv is set to a value lower than the second reference voltage Vcomp. For example, the second reference voltage Vcomp is set as a power supply voltage. In addition, the rotation detection circuit 108 may be configured in such a manner that the first reference voltage is set to be ½ times the power supply voltage by using a threshold voltage of an inverter as the first reference voltage Vinv when the stepping motor control circuit is made into an integrated circuit (IC).

Here, the oscillation circuit 101 and the frequency dividing circuit 102 constitute a signal generation unit, and the analog display portion 112 constitutes a display portion. The control circuit 103, the rotation detection circuit 108, and the detection section determination circuit 109 constitute a rotation detection unit. The main drive pulse generation circuit 104, and the correction drive pulse generation circuit 105 constitute a drive pulse generation unit. The motor driver circuit 106 constitutes a motor drive unit. The oscillation circuit 101, the frequency dividing circuit 102, the control circuit 103, the main drive pulse generation circuit 104, the correction drive pulse generation circuit 105, and the motor driver circuit 106 constitute a control unit. In addition, the oscillation circuit 101, the frequency dividing circuit 102, the control circuit 103, the main drive pulse generation circuit 104, the correction drive pulse generation circuit 105, the motor driver circuit 106, the rotation detection circuit 108, and the detection section determination circuit 109 constitute a stepping motor control circuit.

The rotation detection unit detects the induced current Ik flowing through the drive coil 209 due to free vibration of the stepping motor 107 in a detection section divided into a plurality of sections, and detects a rotation state of the stepping motor 107 on the basis of a pattern indicating whether or not an induced current exceeding a predetermined reference value is detected in each of the sections by using a phenomenon in which a detection time of the induced current Ik is delayed along with a relative load increase with respect to drive energy of the stepping motor 107, and a level of the induced current Ik decreases.

A hand movement operation of the respective hands (the hour hand 114, the minute hand 115, and the second hand 116) in a common operation will be schematically described below. In FIG. 1, the oscillation circuit 101 generates a signal of a predetermined frequency, and the frequency dividing circuit 102 frequency-divides the signal generated in the oscillation circuit 101 to generate a timepiece signal (for example, a signal with a cycle of one second) serving as a reference of time counting, and outputs the resultant timepiece signal to the control circuit 103.

The control circuit 103 counts the timepiece signal, and outputs a main drive pulse control signal to the main drive pulse generation circuit 104 in order for the stepping motor 107 to be rotatably driven with the main drive pulse P1 having energy corresponding to the magnitude of the power supply voltage with respect to a load (that is, the degree of margin of the drive energy) at a predetermined cycle.

In each embodiment of the invention, as a drive pulse for rotatably driving the stepping motor 107, a plurality of kinds of drive pulses are prepared. As the drive pulse, a plurality of kinds (that is, a plurality of ranks) of main drive pulses P1, each having different energy, and correction drive pulses P2 having energy larger than that of the main drive pulses P1 are used.

Each of the main drive pulses P1 is a drive pulse that moves the time indicating hands 114 to 116 by normally rotating the stepping motor 107 during a common operation. In addition, each of the correction drive pulses P2 is a drive pulse that forcibly rotates the stepping motor 107 in a case where the stepping motor 107 may not be rotated (normal rotation) through driving with the main drive pulse P1 during a common operation.

The main drive pulse generation circuit 104 outputs a main drive pulse P1 with an energy rank corresponding to a main drive pulse control signal transmitted from the control circuit 103 to the motor driver circuit 106. The motor driver circuit 106 rotatably drives the stepping motor 107 by the main drive pulse P1. The stepping motor 107 is rotatably driven by the main drive pulse P1, and rotatably drives the time indicating hands 114 to 116. According to this, when the stepping motor 107 is normally rotated, current time display by the time indicating hands 114 to 116 is carried out in the analog display portion 112.

The operation of the rotation detection circuit 108 is different depending on respective embodiments, and thus the details thereof will be described later. However, when schematically describing the operation, in a first embodiment of the invention, the rotation detection circuit 108 uses two kinds of reference threshold voltages Vinv and Vcomp, converts an induced current Ik generated in the drive coil 209 due to rotational free vibration of the stepping motor 107 to an induced voltage signal VRs using a detection element in a predetermined detection section T, and detects an induced voltage signal VRs exceeding the reference voltage Vinv or Vcomp on the assumption that the induced voltage VRs is equivalent to an induced current Ik exceeding a predetermined reference value (first reference value or second reference value). That is, the rotation detection circuit 108 equivalently detects the induced current Ik exceeding the predetermined reference value (first reference value or second reference value) by detecting the induced voltage signal VRs exceeding the reference voltage Vinv or Vcomp in the detection section T.

In a second embodiment of the invention, the rotation detection circuit 108 uses one kind of reference threshold voltage Vcomp, converts an induced current Ik generated in the drive coil 209 due to rotational free vibration of the stepping motor 107 to an induced voltage signal VRs using a detection element in a predetermined detection section T, and detects an induced voltage signal VRs exceeding the reference voltage Vcomp on the assumption that the induced voltage signal VRs is equivalent to an induced current Ik exceeding a predetermined reference value. That is, the rotation detection circuit 108 equivalently detects the induced current Ik exceeding the predetermined reference value by detecting the induced voltage signal VRs exceeding the reference voltage Vcomp in the detection section T.

In addition, in a third embodiment of the invention, the rotation detection circuit 108 uses two kinds of reference threshold voltages Vinv and Vcomp similarly to the first embodiment, converts an induced current Ik generated in the drive coil 209 due to rotational free vibration of the stepping motor 107 to an induced voltage signal VRs using a detection element in a predetermined detection section T, and detects an induced voltage signal VRs exceeding the reference voltage Vinv or Vcomp on the assumption that the induced voltage signal VRs is equivalent to an induced current Ik exceeding a predetermined reference value (first reference value or second reference value). That is, the rotation detection circuit 108 equivalently detects the induced current Ik exceeding the predetermined reference value (first reference value or second reference value) by detecting the induced voltage signal VRs exceeding the reference voltage Vinv or Vcomp in the detection section T.

In each embodiment of the invention, the reference voltages Vinv and Vcomp are set as follows. In a case where the rotor of the stepping motor 107 moves at a constant fast speed similarly to a case where the stepping motor 107 rotates, and the like, the reference voltages Vinv and Vcomp are set in order for the induced voltage signal VRs to exceed the reference voltages Vinv and Vcomp. In addition, in a case where the rotor of the stepping motor 107 does not move at a constant fast speed similarly to a case where the stepping motor 107 does not rotate, the reference voltages Vinv and Vcomp are set in order for the induced voltage signal VRs not to exceed the reference voltages Vinv and Vcomp.

The detection section determination circuit 109 compares detection times and sections of induced voltage signals VRs which are detected by the rotation detection circuit 108 and exceed the reference voltage Vinv or Vcomp to generate a pattern of the induced voltage signals VRs, and determines the degree of margin of the drive energy.

In this manner, the rotation detection circuit 108 detects the induced voltage signal VRs which is generated by the stepping motor 107 and exceeds the reference voltage Vinv or Vcomp (in other words, the induced current Ik exceeding a reference value). The detection section determination circuit 109 determines to which section in the detection section T the induced voltage signal VRs belongs, and determines the degree of drive margin of a drive pulse operated at that time on the basis of a pattern indicating the section to which the induced voltage signal VRs belongs.

The control circuit 103 carries out pulse control by outputting a main drive pulse control signal to the main drive pulse generation circuit 104 in order for the main drive pulse generation circuit 104 to carry out an operation of raising energy of the main drive pulse P1 by one rank (pulse-up), an operation of lowering the energy of the main drive pulse P1 by one rank (pulse-down), or retention of the main drive pulse P1 without change on the basis of the pattern of the induced voltage signal VRs which is transmitted from the detection section determination circuit 109. In addition, the control circuit 103 carries out pulse control in order for the correction drive pulse generation circuit 105 to output a correction drive pulse control signal for driving with the correction drive pulse P2.

The main drive pulse generation circuit 104 or the correction drive pulse generation circuit 105 outputs a drive pulse corresponding to the control signal to the motor driver circuit 106, and the motor driver circuit 106 rotatably drives the stepping motor 107 by the drive pulse.

Figure 2:
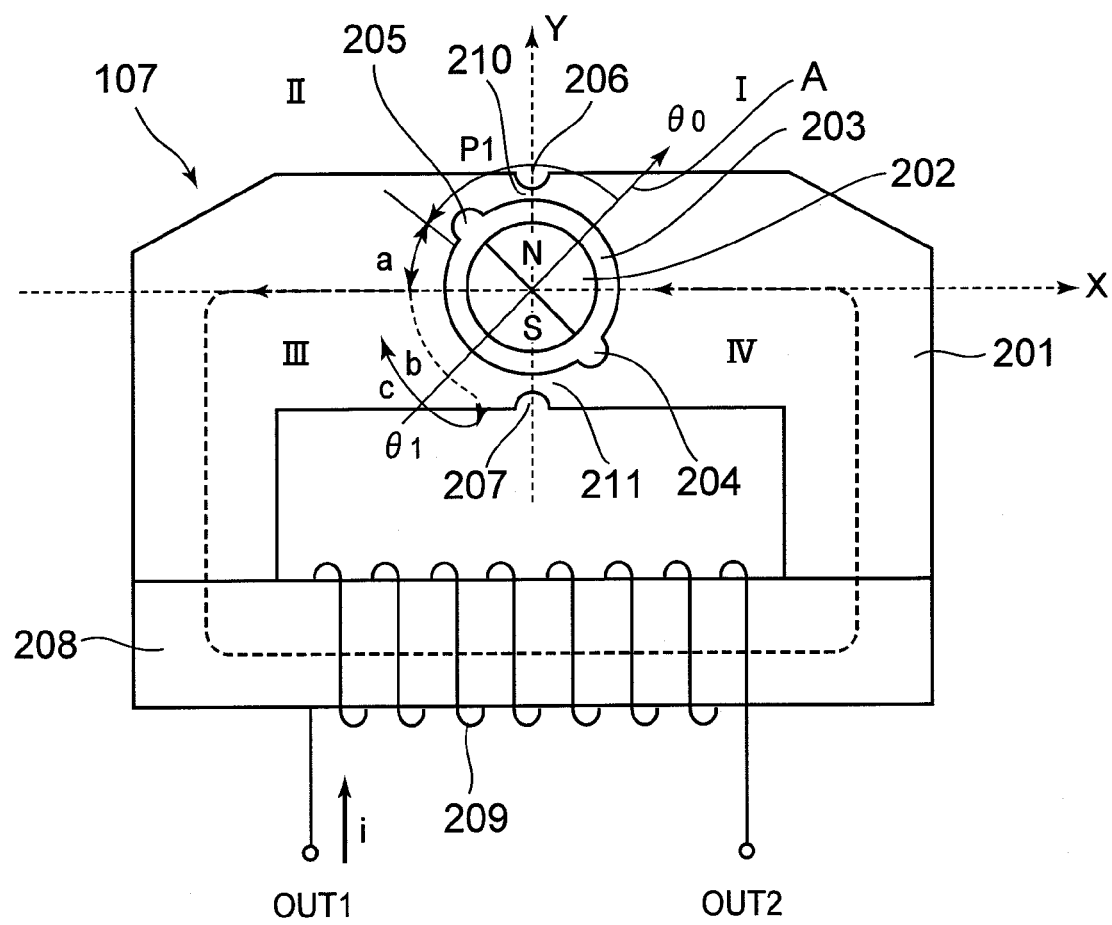
FIG. 2 is a configuration diagram of the stepping motor that is used in the analog electronic timepiece according to each embodiment of the invention.

FIG. 2 shows a configuration diagram of the stepping motor 107 that is used in each embodiment of the invention, and illustrates an example of a stepping motor for a timepiece that is generally used in an analog electronic timepiece.

In FIG. 2, the stepping motor 107 includes a stator 201 having a rotor accommodation through-hole 203, a rotor 202 that is rotatably disposed in the rotor accommodation through-hole 203, a magnetic core 208 that is joined to the stator 201, and a drive coil 209 wound around a magnetic core 208. In a case where the stepping motor 107 is used in the analog electronic timepiece, the stator 201 and the magnetic core 208 are fixed and joined to a base plate (not shown) by a screw (not shown). The drive coil 209 has a first terminal OUT1, and a second terminal OUT2.

The rotor 202 is magnetized to two poles (S-pole and N-pole). A plurality of (two in this embodiment) notched portions (outer notches) 206 and 207 are provided to an outer end of the stator 201 formed from a magnetic material at positions opposite to each other with the rotor accommodation through-hole 203 interposed therebetween. Saturable portions 210 and 211 are provided between the respective notches 206 and 207, and the rotor accommodation through-hole 203.

The saturable portions 210 and 211 are configured in such a manner that the saturable portions 210 and 211 are not magnetically saturated by a magnetic flux of the rotor 202, and are magnetically saturated when the drive coil 209 is excited, and thus magnetic resistance thereof increases. The rotor accommodation through-hole 203 is formed to have a circular hole shape in which a plurality of (two in this embodiment) semicircular notched portions (inner notches) 204 and 205 are integrally formed in a through-hole having a circular profile at positions opposite to each other.

The notched portions 204 and 205 constitute a positioning portion that determines a stop position of the rotor 202. In a state in which the drive coil 209 is not excited, the rotor 202 stably stops at a position corresponding to the positioning portion as shown in FIG. 2, in other words, at a position (position of an angle θ0) at which a magnetic pole axis A of the rotor 202 is perpendicular to a line segment obtained by connecting the notched portions 204 and 205. An XY coordinate space centering around a rotational axis (rotational center) of the rotor 202 is divided into four quadrants (a first quadrant I to a fourth quadrant IV).

When rectangular wave drive pulses are supplied from the motor driver circuit 106 to the terminals OUT1 and OUT2 of the drive coil 209 (for example, the first terminal OUT1 is set as a positive electrode, and the second terminal OUT2 is set as a negative electrode), and a drive current i is allowed to flow in an arrow direction of FIG. 2, the magnetic flux is generated in the stator 201 in a dashed arrow direction. Accordingly, the saturable portions 210 and 211 are saturated, and thus the magnetic resistance increases. Then, the rotor 202 is rotated by 180° in the arrow direction of FIG. 2 by the interaction between the magnetic pole generated in the stator 201 and the magnetic pole generated in the rotor 202, and thus the magnetic pole axis of the rotor 202 is stably stopped at a position of an angle θ1. In addition, a rotation direction (the counterclockwise direction in FIG. 2) to carry out a common operation (a hand movement operation of the analog electronic timepiece in this embodiment) by rotatably driving the stepping motor 107 is set as a forward direction, and the opposite direction (clockwise direction) of the rotation direction is set as a backward direction.

Next, when reversed-polarity rectangular wave drive pulses are supplied from the motor driver circuit 106 to the terminals OUT1 and OUT2 of the drive coil 209 (the first terminal OUT1 is set as a negative electrode and the second terminal OUT2 is set as a positive electrode to realize a polarity reversed to that of the above-described driving), and a drive current i is allowed to flow in the opposite direction of the arrow direction of FIG. 2, a magnetic flux is generated in the stator 201 in a direction opposite to that of a dashed arrow. Accordingly, the saturable portions 210 and 211 are first saturated. Thereafter, the rotor 202 is rotated by 180° in the same direction (forward direction) as described above by the interaction between the magnetic pole generated in the stator 201 and the magnetic pole generated in the rotor 202, and thus the magnetic pole axis of the rotor 202 is stably stopped at a position of an angle θ0.

In this manner, it is configured that the above-described operations are repetitively carried out to continuously rotate the rotor 202 by 180° in the arrow direction by supplying signals (alternating signals) having different polarity with respect to the drive coil 209 as described above.

The control circuit 103 rotatably drives the stepping motor 107 by alternately driving the stepping motor 107 by main drive pulses P1 having different polarity, and in a case where rotation by each of the main drive pulses P1 is impossible, the stepping motor 107 is rotatably driven by a correction drive pulse P2 having the same polarity as the main drive pulse P1.

FIG. 3 shows a timing chart in a case where the stepping motor 107 is driven by the main drive pulse P1 in a first embodiment of the invention. FIG. 3 collectively illustrates a degree of margin of energy of the main drive pulse P1 with respect to a load, a rotation position of the rotor 202 of the stepping motor 107, a pattern of the induced voltage signal VRs which represents a rotation state, and a pulse control operation.

FIG. 3 illustrates a state during normal driving (during a hand movement operation of time indicating hands 114 to 116 by the main drive pulse P1 in a state in which a power supply voltage of the analog electronic timepiece is a rated voltage). In addition, in FIG. 3, P1 represents the main drive pulse P1, and a drive section in which the rotor 202 is rotatably driven by the main drive pulse P1. In addition, a to e are regions indicating rotation positions of the magnetic axis A of the rotor 202 during the driving with the main drive pulse P1.

A predetermined time immediately after termination of the driving with the main drive pulse P1 is set as a detection section T in which a rotation state is detected, and the detection section T is divided into a plurality of continuous sections (in the first embodiment, three sections T1 to T3). In this embodiment, a first predetermined time immediately after termination of the driving with the main drive pulse P1 is set as a first section T1, a predetermined time subsequent to the first section T1 is set as a second section T2, and a predetermined time subsequent to the second section T2 is set as a third section T3.

When the XY coordinate space centering around the rotor 202, in which the magnetic pole axis A of the rotor 202 is located by the rotation of the rotor 202, is divided into a first quadrant I to a fourth quadrant IV, the section T1 to the section T3 may be expressed as follows.

For example, in a large-load-increment driving (small-margin rotation) state in which the rank of the main drive pulse P1 is retained without being changed, the first section T1 is a section in which a rotation state of the rotor 202 in a first forward region a in the second quadrant II is determined, the second section T2 is a section in which the rotation state of the rotor 202 in the first forward region a in the second quadrant II, and a rotation state of the rotor 202 in a first forward region b in the third quadrant III are determined, and the third section T3 is a section in which a rotation state of the rotor 202 in a first backward region c in the third quadrant III is determined.

In addition, in an intermediate-load-increment driving (intermediate-margin rotation) state in which the main drive pulse P1 is pulse-down controlled, the first section T1 is a section in which the rotation state of the rotor 202 in the first forward region a in the second quadrant II is determined, the second section T2 is a section in which the rotation state of the rotor 202 in the first forward region a in the second quadrant II, and the rotation state of the rotor 202 in the first forward region b in the third quadrant III are determined, and the third section T3 is a section in which the rotation state of the rotor 202 in the first backward region c in the third quadrant III is determined. The intermediate-load-increment driving (intermediate-margin rotation) state is a state in which energy of the main drive pulse P1 with respect to a load is larger compared to the large-load-increment driving (small-margin rotation) state.

In addition, in a small-load-increment driving (large-margin rotation) state in which the main drive pulse P1 is pulse-down controlled, the first section T1 is a section in which the rotation state of the rotor 202 in the first forward region a in the second quadrant II is determined, the second section T2 is a section in which the rotation state of the rotor 202 in the first forward region b in the third quadrant III, and the rotation state of the rotor 202 in the first backward region c in the third quadrant III are determined, and the third section T3 is a section in which the rotation state of the rotor 202 in the first backward region c in the third quadrant III is determined. The small-load-increment driving (large-margin rotation) state is a state in which energy of the main drive pulse P1 with respect to a load is larger compared to the intermediate-load-increment driving (intermediate-margin rotation) state.

In addition, in a minimum-load-increment driving (maximum-margin rotation) state in which the main drive pulse P1 is pulse-down controlled, the first section T1 is a section in which the rotation state of the rotor 202 in the first forward region b in the third quadrant III is determined, the second section T2 is a section in which the rotation state of the rotor 202 in the first forward region b in the third quadrant III, and the rotation state of the rotor 202 in the first backward region c in the third quadrant III are determined, and the third section T3 is a section in which a state of the rotor 202 after the first backward region c in the third quadrant III is determined. The minimum-load-increment driving (maximum-margin rotation) state is a state in which energy of the main drive pulse P1 with respect to a load is larger compared to the small-load-increment driving (large-margin rotation) state.

In addition, in a large-load-increment driving (limited rotation) state in which the main drive pulse P1 is pulse-up controlled, the first section T1 is a section in which the rotation state of the rotor 202 in the first forward region a in the second quadrant II is determined, the second section T2 is a section in which the rotation state of the rotor 202 in the first forward region a in the second quadrant II, and the rotation state of the rotor 202 in the first forward region b in the third quadrant III are determined, and the third section T3 is a section in which the rotation state of the rotor 202 in the first backward region c in the third quadrant III is determined. The large-load-increment driving (limited rotation) state is a state in which energy of the main drive pulse P1 with respect to a load is smaller compared to the large-load-increment driving (small-margin rotation) state.

In addition, in a state in which rotation does not occur by the driving with the main drive pulse P1 (driving with a correction drive pulse P2 and a maximum-load-increment driving (non-rotation) state in which the main drive pulse P1 is pulse-up controlled), the first section T1 is a section in which the rotation state of the rotor 202 in the first forward region a in the second quadrant II is determined, the second section T2 is a section in which the rotation state of the rotor 202 in the first forward region a in the second quadrant II, and a rotation state of the rotor 202 in a first backward region d in the second quadrant II and the first quadrant I are determined, and the third section T3 is a section in which the rotation state of the rotor 202 in the first backward region d in the first quadrant I, and a rotation state of the rotor 202 in a second forward region e in the first quadrant I are determined. The maximum-load-increment driving (non-rotation) state is a state in which energy of the main drive pulse P1 with respect to a load is smaller compared to the large-load-increment driving (limited rotation) state.

A plurality of reference voltages (in the first embodiment, two kinds including the first reference voltage Vinv and the second reference voltage Vcomp) which detect the induced voltage signal VRs are prepared.

In the section T1, the induced voltage signal VRs, which corresponds to the induced current Ik flowing through the drive coil 209 in the same direction as the drive current i, is detected.

The section T1 is a region in which the drive current i and the induced current Ik flow in the same direction as each other. When a load with respect to energy of the main drive pulse P1 increases, rotation of the rotor 202 becomes slow, and thus a time at which the induced current is generated is delayed. A detection time of the induced current Ik generated before the section T1 is delayed, and the induced current Ik is detected in the section T1.

That is, in a case where the load with respect to the energy of the main drive pulse P1 is smaller than a predetermined value, in the section T1, the rotor 202 rotates at a speed higher than a constant speed, and thus an induced current Ik exceeding a predetermined value is not detected. When a load with respect to the energy of the main drive pulse increases more than the predetermined value, the rotation of the rotor 202 becomes slow in the section T1, and thus the induced current Ik exceeding the predetermined value is detected.

The first embodiment utilizes the phenomenon as described above, and is configured in such a manner that selection of a reference voltage to be used in the sections T2 and T3 is carried out on the basis of whether or not the induced voltage signals VRs exceeding a predetermined reference voltage are detected plural times (in this embodiment, two values including T1 and T1next) in the section T1, and detection is carried out by changing the selection of the induced current Ik flowing in the same direction as the drive current i or a direction opposite to that of the drive current i, thereby carrying out determination of a rotation state, or pulse control.

In this manner, detection is carried out by changing polarity (detection direction) for detecting the induced current Ik in the sections T2 and T3 after the section T1 on the basis of whether or not the induced current Ik exceeding a predetermined reference value is detected plural times in the first section T1, and the rotation state of the stepping motor 107 is detected on the basis of the induced current Ik in each of the sections T1 to T3 (actually, an induced voltage signal VRs equivalent to the induced current Ik). Accordingly, even when a load is large and the rotation of the rotor 202 is slow, rotation detection may be carried out at a stage in which the rotation of the rotor 202 is fast, and thus accurate rotation detection may be carried out by reducing an effect due to a load variation.

In addition, in a case where the rotation is slow, the rotation state may be accurately detected by setting the reference value to be small. In addition, in a case where the rotor 202 is rotated at a speed higher than a constant speed at which the induced current Ik exceeding a predetermined reference value may not be detected plural times in the first section T1, a sufficiently large induced voltage signal VRs may be detected even when the direction of the induced current Ik is not changed. Accordingly, a detection process is configured to be simple by carrying out the rotation detection on the basis of the induced signal VRs corresponding to the induced current Ik that flows in the same direction as the main drive pulse P1 without changing the direction of the induced current Ik.

For example, in FIG. 3, in the minimum-load-increment driving (maximum-margin rotation) state, the small-load-increment driving (large-margin rotation) state, and maximum-load-increment driving (non-rotation) state, only one induced voltage signal VRs exceeding the first reference voltage Vinv is detected in the section T1, and thus rotation detection in the subsequent sections T2 and T3 is carried out using the second reference voltage Vcomp.

On the other hand, in the intermediate-load-increment driving (intermediate-margin rotation) state, the large-load-increment driving (small-margin rotation) state, and the large-load-increment driving (limited rotation) state, an induced current exceeding each of a plurality of reference values is detected plural times (in this embodiment, two induced voltage signals VRs exceeding the first reference voltage Vinv, and one induced voltage signal VRs exceeding the second reference voltage Vcomp) in the section T1, and thus the subsequent rotation detection is configured to be carried out in sections T2R and T3R using the second reference voltage Vcomp. In addition, in FIG. 3, a case of using the sections T1 to T3 is indicated by out1, and a case of using the sections T2R and T3R is indicated by out2.

As described above, a case in which the induced current Ik exceeding each of a plurality of reference values cannot be detected plural times in the section T1 corresponds to either a case in which energy of the main drive pulse P1 is sufficiently large and thus rotation is carried out without a problem, or a case in which the energy is insufficient and thus rotation is not carried out. Accordingly, rotation or non-rotation may be accurately detected without changing a subsequent rotation detection operation.

Conversely, a case in which the induced current Ik exceeding each of a plurality of reference values can be detected plural times in the section T1 corresponds to a state in which it cannot be said that the energy of the main drive pulse P1 is really insufficient, but it cannot be said that the energy is sufficiently large, and thus there is a concern that rotation becomes slow, and accurate determination of rotation may be difficult. However, the rotation detection in the subsequent sections T2 and T3 is configured in such a manner that rotation detection in the region c in a case where the drive current i and the induced current Ik flow in the same direction is changed to rotation detection in the region b in a case where the drive current i and the induced current Ik flow in directions opposite to each other by changing the detection direction of the induced current Ik as described above, thereby increasing rotation detection accuracy.

FIG. 4 shows a determination chart in which pulse control operations in the first embodiment of the invention are arranged.

In FIG. 4, T1 represents the section T1 and a determination value indicating whether or not a first induced voltage signal VRs exceeding the reference voltages Vinv or Vcomp is detected in the section T1. In addition, T1next represents a determination value indicating whether or not a second induced voltage signal VRs exceeding the reference voltage Vinv or Vcomp is detected in the section T1.

The sections T1, T2, and T3 are sections in which detection is carried out when the drive current i and the induced current Ik flow in the same direction, and the sections T2R and T3R are sections in which the induced current Ik is detected by setting the detection direction to a direction opposite to that of the sections T2 and T3. The sections T2 and the section T2R have the same width and position, respectively, and the section T3 and the section T3R have the same time width and position, respectively. That is, the sections T2 and T3, and the sections T2R and T3R are different only in that the detection direction of the induced current Ik is reversed.

As described above, a case in which the induced voltage signal VRs exceeding the first reference voltage Vinv or the second reference voltage Vcomp is detected is expressed by a determination value "1", and a case in which the induced voltage signal VRs exceeding the first reference voltage Vinv or the second reference voltage Vcomp is not detected is expressed by a determination value "0", respectively. In addition, "1/0" represents that the determination value may be either "1" or "0". In addition, "-" represents that the determination value is not considered as a pattern of the induced voltage signal VRs.

In a case of a pattern using the sections T1, T2, and T3, the pattern of the induced voltage signal VRs is expressed by a determination value (T1) indicating whether or not the induced voltage signal VRs exceeding the reference voltage Vinv or Vcomp is detected for the first time in the section T1, a determination value (T1next) indicating whether or not the induced voltage signal VRs exceeding the reference voltage Vinv or Vcomp is detected for the second time in the section T1, a determination value (T2) indicating whether or not the induced voltage signal VRs exceeding the second reference voltage Vcomp is detected in the section T2, and a determination value (T3) indicating whether or not the induced voltage signal VRs exceeding the second reference voltage Vcomp is detected in the section T3.

In a case of a pattern using the section T1, T2R, and T3R, the pattern of the induced voltage signal VRs is expressed by a determination value (T1) indicating whether or not the induced voltage signal VRs exceeding the reference voltage Vinv or Vcomp is detected for the first time in the section T1, a determination value (T1next) indicating whether or not the induced voltage signal VRs exceeding the reference voltage Vinv or Vcomp is detected for the second time in the section T1, a determination value (T2R) indicating whether or not the induced voltage signal VRs exceeding the first reference voltage Vinv is detected in the section T2R, and a determination value (T3R) indicating whether or not the induced voltage signal VRs exceeding the first reference voltage Vinv is detected in the section T3R.

The rotation detection circuit 108 detects whether or not the induced voltage signal VRs exceeding the reference voltage Vinv or Vcomp is present, the detection section determination circuit 109 determines the pattern (representing the degree of margin of the energy of the main drive pulse P1) of the induced voltage signal VRs, and the control circuit 103 carries out the following pulse control such as pulse-up or pulse-down of the main drive pulse P1, and driving with the correction drive pulse P2 on the basis of the pattern with reference to the determination chart of FIG. 4 which is stored inside the control circuit 103, thereby rotatably controlling the stepping motor 107.

Figure 5:
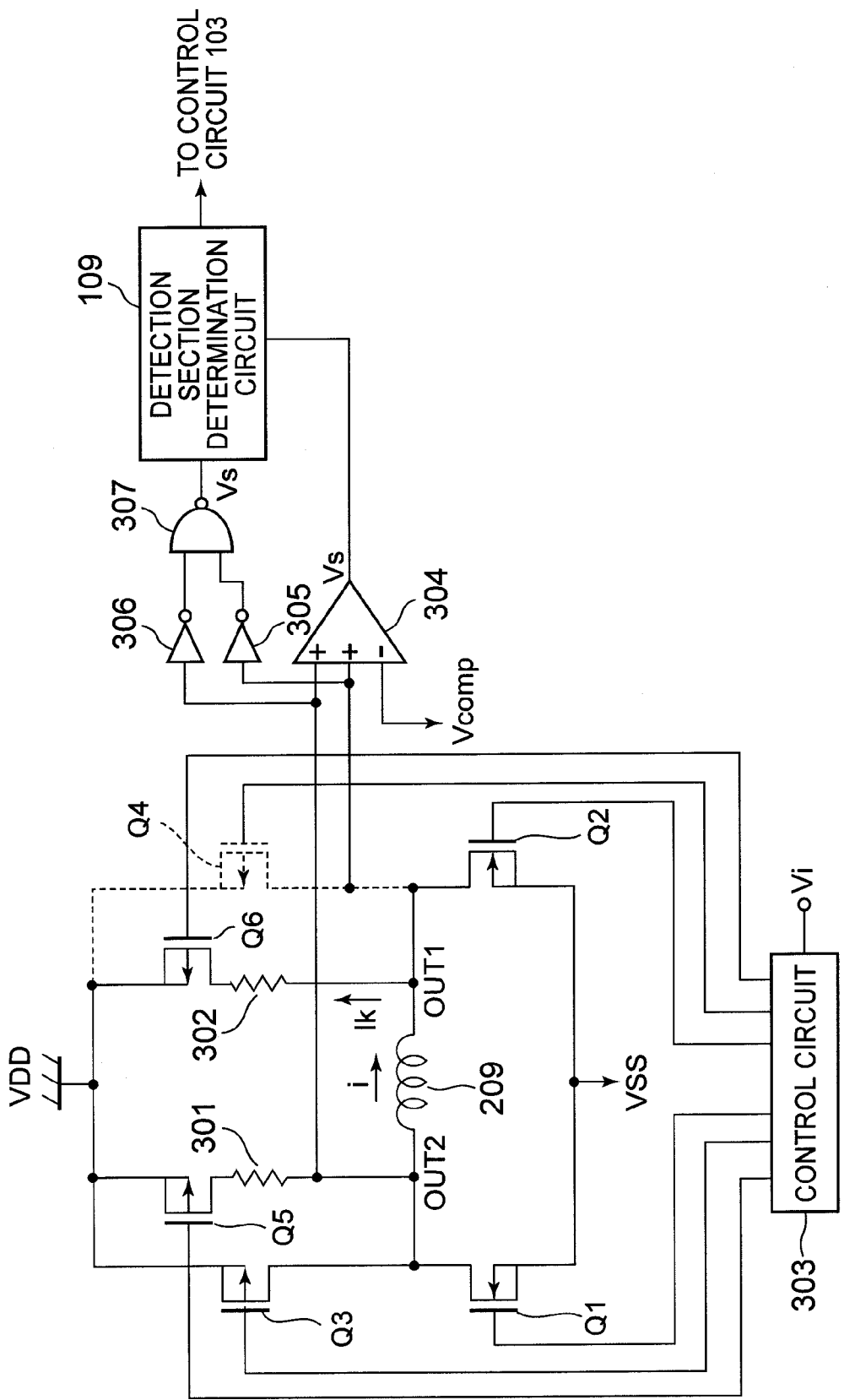
FIG. 5 is a partially detailed circuit diagram of the stepping motor control circuit, the movement, and the analog electronic timepiece according to the first and third embodiments of the invention.

FIG. 5 shows a partially detailed circuit diagram used in the stepping motor control circuit, the movement, and the analog electronic timepiece according to the first and third embodiments of the invention. FIG. 5 shows a partially detailed circuit diagram of the motor driver circuit 106 and the rotation detection circuit 108.

A detailed operation will be described later, but a switch control circuit 303 allows the transistors Q2 and Q3, or the transistors Q1 and Q4 to simultaneously enter an On-state in response to a control signal Vi supplied from the main drive pulse generation circuit 104 or the correction drive pulse generation circuit 105 during rotation driving to supply a drive current to the drive coil 209 in a normal direction or a reverse direction, thereby rotatably driving the stepping motor 107.

In addition, in each embodiment of the invention, as the main drive pulse P1 and the correction drive pulse P2, drive pulses having a waveform (comb-like shape) in which a supply state of supplying drive energy and a supply stop state of stopping supply of the drive energy are alternately repeated at a predetermined cycle are used.

In addition, the switch control circuit 303 controls transistors Q3 to Q6 to have any one of an ON-state, an OFF-state, and a switching state during rotation detection in order for an induced voltage signal VRs to be generated in a first detection resistor 301 or a second detection resistor 302.

The transistors Q1 and Q2 are constituent elements of the motor driver circuit 106, and the transistors Q5 and Q6, and detection resistors 301 and 302 are constituent elements of the rotation detection circuit 108. The transistors Q3 and Q4, and the switch control circuit 303 are constituent elements that are commonly used in both of the motor driver circuit 106 and the rotation detection circuit 108. In addition, the detection resistors 301 and 302, a comparator 304, inverters 305 and 306, and a NAND circuit 307 are constituent elements of the rotation detection circuit 108. The detection resistors 301 and 302 are elements having the same resistance value, and constitute a detection element. In addition, the transistors Q1 to Q6 have small on-resistance in an ON-state, respectively, and constitute a low-impedance element. The detection resistors 301 and 302 have on-resistance larger than that of the transistors Q1 to Q6, and constitute a high-impedance element.

The second reference voltage Vcomp is configured to be input to a reference signal input portion of the comparator 304, and induced voltage signals VRs detected by the detection resistors 301 and 302 are configured to be input to first and second input portions of the comparator 304, respectively. In a case where the induced voltage signal VRs exceeding the second reference voltage Vcomp is generated in the detection resistor 301 or 302, a detection signal Vs of a high-level signal "1" is output to detection section determination circuit 109 from the comparator 304.

In addition, threshold values of the inverters 305 and 306 are set to the first reference voltage Vinv, respectively. In a case where the induced voltage signal VRs exceeding the first reference voltage Vinv is generated in the detection resistor 301, a low-level signal "0" is output from the inverter 306 to the detection section determination circuit 109, and a detection signal Vs of a high level "1" is output from the NAND circuit 307 to the detection section determination circuit 109. In a case where the induced voltage signal VRs exceeding the first reference voltage Vinv is generated in the detection resistor 302, the low-level signal "0" is output from the inverter 305 to the detection section determination circuit 109, and the detection signal Vs of the high level "1" is output from the NAND circuit 307 to the detection section determination circuit 109.

The detection section determination circuit 109 selects the detection signal Vs transmitted from the comparator 304 or the NAND circuit 307 in response to a detection direction of the induced current Ik or the reference voltages Vinv and Vcomp that are used, and determines to which one of the sections T1 to T3, T2R, and T3R the induced voltage signal VRs belongs.

Figure 6:
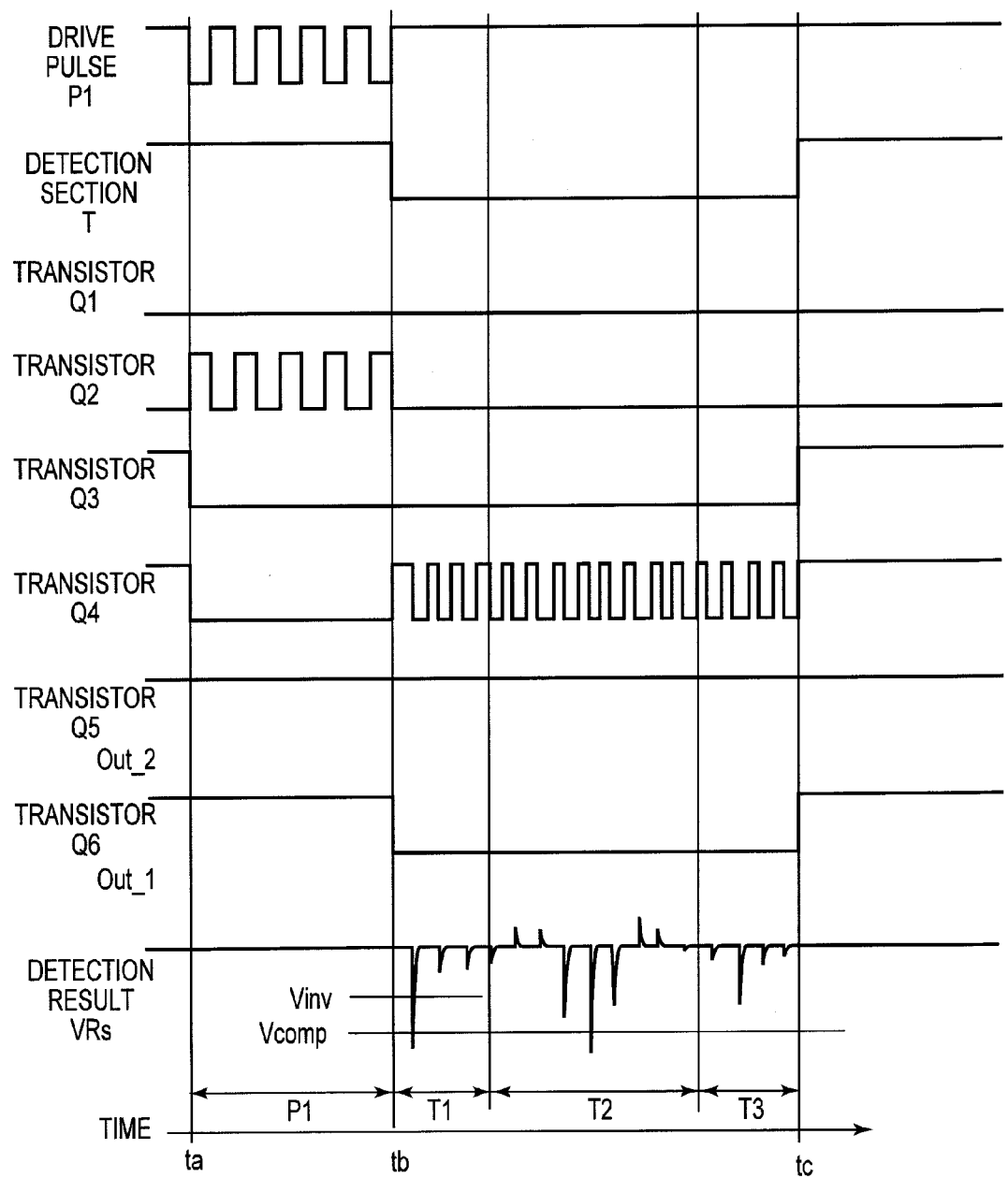
FIG. 6 is a timing chart of the stepping motor control circuit, the movement, and the analog electronic timepiece according to the first embodiment of the invention.

FIG. 6 shows a timing chart of the first embodiment of the invention in a case where detection is carried out without changing a detection direction of the induced current Ik. FIG. 6 shows a timing chart of the small-load-increment driving (large-margin rotation) state, and illustrates a timing during detection in a state (sections T1, T2, and T3) in which the induced current Ik flows in the same direction as the drive current i.

In a case where the stepping motor 107 is rotatably driven, in a drive period P1 between times ta and tb, the switch control circuit 303 repetitively switches the transistor Q2 between an ON-state (supply state) and an OFF-state (supply stop state) at a predetermined cycle while maintaining the transistor Q3 in an ON-state to generate a comb-like main drive pulse P1, and supplies the drive current i in an arrow direction of FIG. 6 to the drive coil 209 of the stepping motor 107. According to this, in a case where the stepping motor 107 rotates, the rotor 202 rotates in a forward direction by 180°.

On the other hand, detection of a rotation state is carried out in a detection section T from the termination time tb of the drive period P1 of the main drive pulse P1 to time tc.

That is, in the section T1 starting from the time tb, the switch control circuit 303 switches the transistor Q4 between an ON-state and an OFF-state at a predetermined cycle while maintaining the transistors Q3 and Q6 in an ON-state to allow the induced current Ik to flow to the detection resistor 302 in the same direction as the drive current i. According to this, the induced voltage signal VRs is generated in the detection resistor 302.

The comparator 304 compares the induced voltage signal VRs and the second reference voltage Vcomp. When the induced voltage signal VRs exceeds the second reference voltage Vcomp, the comparator 304 outputs "1" to detection section determination circuit 109 as the detection signal Vs. When the induced voltage signal VRs does not exceed the second reference voltage Vcomp, the comparator 304 outputs "0" to the detection section determination circuit 109 as the detection signal Vs.

In addition, when the induced voltage signal VRs exceeds the first reference voltage Vinv, the inverter 305 outputs "0", and when the induced voltage signal VRs does not exceed the first reference voltage Vinv, the inverter 305 outputs "1". The NAND circuit 307 outputs an inverted signal "1" or "0" to the detection section determination circuit 109 as the detection signal Vs.

The detection section determination circuit 109 determines whether or not a plurality of induced voltage signals VRs exceeding a predetermined reference voltage (in this embodiment, two induced voltage signals VRs exceeding at least the first reference voltage Vinv) are detected in the section T1 on the basis of detection signals Vs transmitted from the comparator 304 and the NAND circuit 307.

In an example of FIG. 6, since a plurality of the induced voltage signals VRs exceeding the predetermined reference voltage Vinv are not detected in the section T1, even in the sections T2 and T3, the switch control circuit 303 of the rotation detection circuit 108 carries out the detection operation without changing a flow direction of the induced current Ik. Accordingly, even in the sections T2 and T3, each transistor is drive-controlled to carryout the same operation as described above.

In this case, in the sections T2 and T3, a determination value of the induced voltage signal VRs, which is obtained by carrying out determination using the second reference voltage Vcomp without using the first reference voltage Vinv, is only used. That is, although the detection signal Vs is input to the detection section determination circuit 109 from both of the NAND circuit 307 and the comparator 304, in the sections T2 and T3, the detection section determination circuit 109 carries out determination only on whether or not the detection signal Vs input from the comparator 304 belongs to the section T2 or T3. According to this, even in a non-rotation state in which a plurality of induced voltage signals VRs exceeding the predetermined reference voltage Vinv are not detected in the section T1, determination is carried out using the second reference voltage Vcomp with a high level, and thus determination of the rotation state may be carried out more accurately. In addition, since the detection direction of the induced current Ik is not changed, the detection operation becomes simple.

As a determination result, the detection section determination circuit 109 outputs a pattern (a first determination value in the section T1, a next determination value (T1next) in the section T1, a determination value in the section T2, and a determination value in the section T3) of the induced voltage signal VRs to the control circuit 103.

The control circuit 103 determines the rotation state of the stepping motor 107 with reference to the determination chart of FIG. 4 on the basis of the pattern output from the detection section determination circuit 109, and carries out pulse control such as pulse-down, and pulse-up+driving with the correction drive pulse P2.

In a case where a plurality of induced voltage signals VRs exceeding the predetermined reference voltage Vinv are not detected in the section T1 even in a next cycle after the cycle shown in FIG. 6 is terminated, each of the transistors Q1 to Q6 is drive-controlled to carry out the same operation. That is, the transistor Q4 enters an ON-state in place of the transistor Q3, and the transistor Q1 is switched in place of the transistor Q2 at the same cycle as the transistor Q2, and thus driving with a comb-like main drive pulse P1 having polarity reversed to the previous cycle is carried out. In addition, in the detection section T, the transistor Q3 is switched in place of the transistor Q4 at the same cycle as the transistor Q4, and the transistors Q4 and Q5 are driven to an ON-state in place of the transistors Q3 and Q6. According to this, rotation detection based on the induced current Ik is carried out.

The induced voltage signal VRs, which is generated due to rotation of the stepping motor 107, is generated in the detection resistor 301, and the comparator 304 outputs a result obtained by comparing the induced voltage signal VRs and the second reference voltage Vcomp to the detection section determination circuit 109 as the detection signal Vs. In addition, the inverter 306 compares the induced voltage signal VRs and the first reference voltage Vinv, and outputs "1" or "0" in response to the comparison result. The NAND circuit 307 outputs an inverted signal "0" or "1" to the detection section determination circuit 109 as the detection signal Vs.

In a case where a plurality of induced voltage signals VRs exceeding the predetermined reference voltage Vinv are not detected in the section T1, the same operation as described above is carried out, and in the sections T2 and T3, similarly to the previous cycle, the detection section determination circuit 109 carries out section determination only with respect to the detection signal Vs transmitted from the comparator 304.

The detection section determination circuit 109 outputs a pattern (a first determination value in the section T1, a next determination value (T1next) in the section T1, a determination value in the section T2, and a determination value in the section T3) of the induced voltage signal VRs to the control circuit 103.

The control circuit 103 determines the rotation state of the stepping motor 107 on the basis of the pattern output from the detection section determination circuit 109, and carries out pulse control such as pulse-down, and pulse-up+driving with the correction drive pulse P2.

In a case where a plurality of induced voltage signals VRs exceeding the predetermined reference voltage Vinv are not detected in the section T1, rotation control of the stepping motor 107 is carried out by alternately repeating the above-described two cycles.

Figure 7:
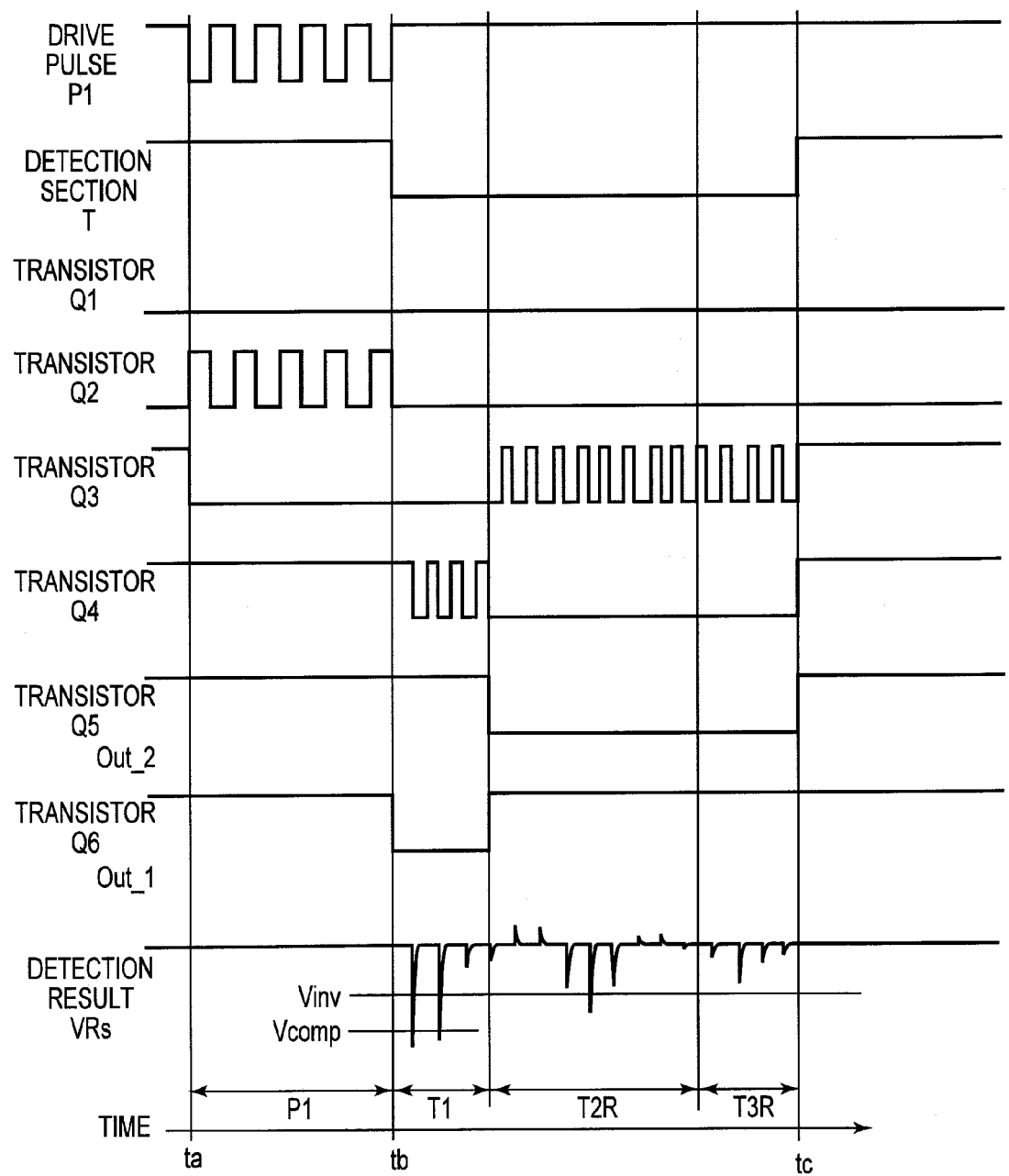
FIG. 7 is a timing chart of the stepping motor control circuit, the movement, and the analog electronic timepiece according to the first embodiment of the invention.

FIG. 7 shows a timing chart of the first embodiment of the invention in a case where detection is carried out by changing the detection direction of the induced current Ik. FIG. 7 illustrates a timing in a large-load-increment driving (small-margin rotation) state. In FIG. 7, to carry out detection by changing the detection direction of the induced current Ik to an opposite direction in the sections T2R and T3R, detection is carried out by inverting the polarity of the induced voltage signal VRs. According to this, the detection of the induced voltage signal VRs is configured to be carried out in the region b earlier in time instead of the region c later in time as shown in FIG. 6 so as to carryout the rotation detection with relatively high accuracy even when rotation is slow.

In a case where the stepping motor 107 is rotatably driven, in a drive period P1 between times ta and tb, the switch control circuit 303 repetitively switches the transistor Q2 between an ON-state (supply state) and an OFF-state (supply stop state) at a predetermined cycle while maintaining the transistor Q3 in an ON-state to supply the drive current i in an arrow direction of FIG. 5 to the drive coil 209 of the stepping motor 107 with the comb-like main drive pulse P1. According to this, in a case where the stepping motor 107 rotates, the rotor 202 rotates in a forward direction by 180°.

On the other hand, detection of a rotation state is carried out in a detection section T from the termination time tb of the drive period P1 of the main drive pulse P1 to time tc.

That is, in the section T1 starting from the time tb, the switch control circuit 303 switches the transistor Q4 between an ON-state and an OFF-state at a predetermined cycle while maintaining the transistors Q3 and Q6 in an ON-state to allow the induced current Ik to flow to the detection resistor 302 in the same direction as the drive current i. According to this, the induced voltage signal VRs is generated in the detection resistor 302.

The comparator 304 compares the induced voltage signal VRs and the second reference voltage Vcomp. When the induced voltage signal VRs exceeds the second reference voltage Vcomp, the comparator 304 outputs "1" to detection section determination circuit 109 as the detection signal Vs. When the induced voltage signal VRs does not exceed the second reference voltage Vcomp, the comparator 304 outputs "0" to the detection section determination circuit 109 as the detection signal Vs.

In addition, when the induced voltage signal VRs exceeds the first reference voltage Vinv, the inverter 305 outputs "0", and when the induced voltage signal VRs does not exceed the first reference voltage Vinv, the inverter 305 outputs "1". The NAND circuit 307 outputs an inverted signal "1" or "0" to the detection section determination circuit 109 as the detection signal Vs.

The detection section determination circuit 109 determines whether or not a plurality of induced voltage signals VRs exceeding a predetermined reference voltage (in this embodiment, two induced voltage signals VRs exceeding the first reference voltage Vinv) are detected in the section T1 on the basis of detection signals Vs transmitted from the comparator 304 and the NAND circuit 307. That is, the detection section determination circuit 109 determines whether or not rotation of the rotor 202 is slower than a predetermined speed in the section T1.

In an example of FIG. 7, since a plurality of the induced voltage signals VRs exceeding the predetermined reference voltage (in this embodiment, two induced voltage signals VRs exceeding the first reference voltage Vinv) are detected in the section T1 (in a state in which the rotation of the rotor 202 is slow), the switch control circuit 303 operates so that the detection is carried out by changing the detection direction of the induced current Ik to an opposite direction in sections (section T2R and section T3R) that are continuous with the section T1.

In the sections T2R and T3R, the switch control circuit 303 switches the transistor Q3 between an ON-state and an OFF-state at a predetermined cycle while maintaining the transistors Q4 and Q5 in an ON-state, and the transistor Q6 in an OFF-state in order for the induced current Ik to flow to the detection resistor 301. In the detection resistor 301, the induced voltage signal VRs in which the detection direction is opposite to that of the sections T2 and T3 is generated, and thus detection of the induced current Ik in which the detection direction is changed to the opposite direction is carried out. According to this, the detection of the induced voltage signal VRs generated in the region b is carried out.

The comparator 304 compares the induced voltage signal VRs and the second reference voltage Vcomp. When the induced voltage signal VRs exceeds the second reference voltage Vcomp, the comparator 304 outputs "1" to detection section determination circuit 109 as the detection signal Vs. When the induced voltage signal VRs does not exceed the second reference voltage Vcomp, the comparator 304 outputs "0" to the detection section determination circuit 109 as the detection signal Vs.

In addition, when the induced voltage signal VRs exceeds the first reference voltage Vinv, the inverter 306 outputs "0", and when the induced voltage signal VRs does not exceed the first reference voltage Vinv, the inverter 306 outputs "1". The NAND circuit 307 outputs an inverted signal "1" or "0" to the detection section determination circuit 109 as the detection signal Vs.

In the sections T2R and T3R, rotation is slow and the level of the induced signal VRs is low, and thus a determination value of the induced voltage signal VRs, which is obtained by carrying out determination using the first reference value Vinv without using the second reference voltage Vcomp is only used so as to increase detection sensitivity. That is, although the detection signal Vs is input to the detection section determination circuit 109 from both of the NAND circuit 307 and the comparator 304, in the sections T2R and T3R, the detection section determination circuit 109 carries out determination only on whether or not the detection signal Vs input from the NAND circuit 307 belongs to the section T2R or T3R.

As a determination result, the detection section determination circuit 109 outputs a pattern (a first determination value in the section T1, a next determination value (T1next) in the section T1, a determination value in the section T2, and a determination value in the section T3) of the induced voltage signal VRs to the control circuit 103.

The control circuit 103 determines the rotation state of the stepping motor 107 on the basis of the pattern transmitted from the detection section determination circuit 109, and carries out pulse control such as pulse-down, retention, and pulse-up.

As described above, in a case where it is determined that the energy of the main drive pulse P1 with respect to a load is small, and the rotation of the rotor 202 is slow in the section T1, in sections after the section T1, detection is carried out after changing the detection direction of the induced current Ik to an opposite direction, and determination of the rotation state is carried out, whereby rotation detection in a stage in which the rotation of the rotor is fast (the rotation region b of the rotor 202) is possible, and thus the rotation state may be detected more accurately. In addition, even in a case where the rotation of the rotor 202 is slow, and the level of the induced voltage signal VRs is low, since a plurality of the induced voltage signals VRs exceeding a predetermined reference voltage (in this embodiment, two induced voltage signals VRs exceeding the first reference voltage Vinv) are detected in the section T1, stable stopping at a position perpendicular to a line segment connecting the notched portion 204 and 205 is possible in a reliable manner, and the first reference voltage Vinv that is a relatively low reference voltage is used, and thus determination of the rotation state may be carried out in a relatively accurate manner.

In a case where a plurality of induced voltage signals VRs exceeding a plurality of predetermined reference voltages Vinv and Vcomp are detected in the section T1 even in a next cycle after the cycle shown in FIG. 7 is terminated, each of the transistors Q1 to Q6 is drive-controlled to carry out the same operation as described above. That is, the transistor Q4 enters an ON-state in place of the transistor Q3, and the transistor Q1 is switched in place of the transistor Q2 at the same cycle as the transistor Q2, and thus driving with a comb-like main drive pulse P1 having polarity reversed to the previous cycle is carried out.

In the section T1 of the detection section T, the transistor Q3 is switched in place of the transistor Q4 at the same cycle as the transistor Q4, and the transistors Q4 and Q5 are driven to an ON-state in place of the transistors Q3 and Q6. According to this, the induced current Ik flows to the detection resistor 301 in the same direction as the drive current i, and thus the induced voltage signal VRs is generated in the detection resistor 301. According to this, rotation detection based on the induced current Ik flowing in the same direction as the drive current i is carried out.

In addition, in the sections T2R and T3R, the transistor Q4 is switched between an ON-state and an OFF-state in place of the transistor Q3 at a predetermined cycle while maintaining the transistors Q3 and Q6 in an ON-state in place of the transistors Q4 and Q5, and the induced current Ik is allowed to flow to the detection resistor 302. The induced voltage signal VRs is generated in the detection resistor 302. According to this, detection of the induced current Ik in which the detection direction is changed to an opposite direction is carried out.

Similarly to the previous cycle, with regard to the induced voltage signal VRs generated due to rotation of the stepping motor 107, in the section T1, a determination value may be obtained on the basis of the first reference voltage Vinv and the second reference voltage Vcomp, and in the sections T2R and T3R, the determination value may be obtained only on the basis of the first reference voltage Vinv.

As a determination result, the detection section determination circuit 109 outputs a pattern (a first determination value in the section T1, a next determination value (T1next) in the section T1, a determination value in the section T2, and a determination value in the section T3) of the induced voltage signal VRs to the control circuit 103.

The control circuit 103 determines the rotation state of the stepping motor 107 on the basis of the pattern transmitted from the detection section determination circuit 109, and carries out pulse control such as pulse-down, retention, and pulse-up.

In a case where a plurality of induced voltage signals VRs exceeding a predetermined reference voltage Vinv are detected in the section T1, rotation control of the stepping motor 107 is carried out by alternately repeating the above-described two cycles.

The rotation driving operation, the rotation detection operation, and the pulse control operation which correspond to the magnitude of energy of the main drive pulse P1 with respect to a load are carried out by a combination of the above-described four cycles.

Figure 8:
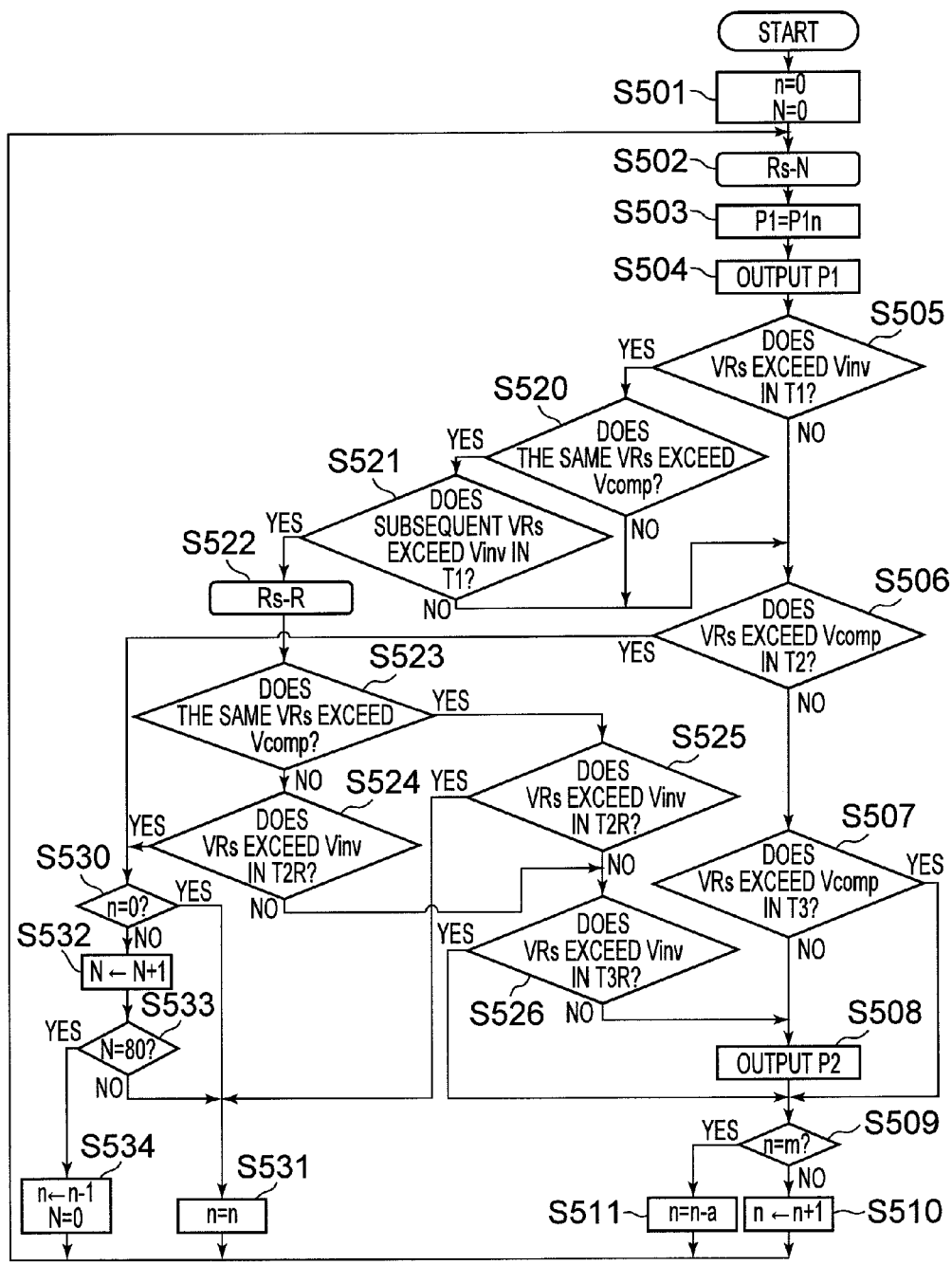
FIG. 8 is a flowchart of the stepping motor control circuit, the movement, and the analog electronic timepiece according to the first embodiment of the invention.

FIG. 8 shows a flowchart illustrating the operation of the stepping motor control circuit, the movement, and the analog electronic timepiece according to the first embodiment of the invention. The flowchart mainly illustrates a process of the control circuit 103.

Hereinafter, an operation of the first embodiment of the invention will be described in detail with reference to FIGS. 1 to 8.

In FIG. 1, the oscillation circuit 101 generates a reference clock signal of a predetermined frequency, and the frequency dividing circuit 102 frequency-divides the signal generated in the oscillation circuit 101 to generate a timepiece signal serving as a reference of time counting, and outputs the resultant timepiece signal to the control circuit 103.

The control circuit 103 carries out a time counting operation by counting the timepiece signal, and first of all, resets an energy rank n of the main drive pulse P1n, and a counted value N indicating the number of times of continuous driving with the same main drive pulse P1 to 0 (step S501 in FIG. 8).

The control circuit 103 carries out initial setting to allow the rotation detection circuit 108 to carryout rotation detection on the basis of the induced current Ik (in other words, the induced voltage signal VRs) flowing in the same direction as the drive current i (setting to Rs-N) (step S502).

Next, the control circuit 103 outputs a main drive pulse control signal so as to rotatably drive the stepping motor 107 with a main drive pulse P10 having the minimum energy which is set in process step S501 (steps S503 and S504).

The main drive pulse generation circuit 104 outputs the main drive pulse P10 corresponding to the control signal to the motor driver circuit 106 in response to the control signal output from the control circuit 103. The motor driver circuit 106 rotatably drives the stepping motor 107 with the main drive pulse P10. The motor driver circuit 106 rotatably drives the stepping motor 107 with the main drive pulse P10. The stepping motor 107 is rotatably driven with main drive pulse P10, and rotatably drives the time indicating hands 114 to 116 of the analog display portion 112. According to this, in a case where the stepping motor 107 is normally rotated, a current time is displayed at any time in the analog display portion 112 by the time indicating hands 114 to 116. In addition, in a case where a calendar display portion (not shown) is rotatably driven by the stepping motor 107, calendar display is changed to display of the next day.

The rotation detection circuit 108 detects whether or not the induced current Ik that flows in the same direction as the drive current i and exceeds a predetermined reference value is present. In other words, the rotation detection circuit 108 determines whether or not a plurality of induced voltage signals VRs exceeding a plurality of predetermined reference voltages Vinv and Vcomp are detected in the section T1. That is, first, as described with reference to FIGS. 6 and 7, the rotation detection circuit 108 detects the induced voltage signal VRs while allowing the induced current Ik to flow in the same direction as the drive current i. The control circuit 103 determines whether or not the rotation detection circuit 108 detects the induced voltage signal VRs exceeding the first reference voltage Vinv (step S505).

In process step S505, in a case where it is determined that the induced signal exceeding the first reference voltage Vinv is not detected, in subsequent sections, as shown in FIG. 6, the control circuit 103 controls the rotation detection circuit 108 to determine whether or not an induced voltage signal VRs exceeding the second reference voltage Vcomp is detected while retaining the detection direction of the induced current Ik without change. The detection section determination circuit 109 determines to which one of the sections T2 and T3 the induced voltage signal VRs exceeding the second reference voltage Vcomp, which is detected by the rotation detection circuit 108, belongs.

The control circuit 103 determines whether or not the induced voltage signal VRs exceeding the second reference voltage Vcomp is detected in the section T2 (step S506). In a case where it is determined that the induced voltage signal VRs exceeding the second reference voltage Vcomp is not detected in the section T2, the control circuit 103 determines whether or not the induced voltage signal VRs exceeding the second reference voltage Vcomp is detected in the section T3 (step S507).

In process step S507, in a case where it is determined that the induced voltage signal VRs exceeding the second reference voltage Vcomp is not detected in the section T3 (this corresponds to a case of maximum-load-increment driving (not-rotation)), the control circuit 103 outputs a control signal to the correction drive pulse generation circuit 105 for driving with the correction drive pulse P2 (step S508). The correction drive pulse generation circuit 105 outputs the correction drive pulse P2 to the motor driver circuit 106 in response to the control signal output from the control circuit 103. The motor driver circuit 106 forcibly rotates the stepping motor 107 with the correction drive pulse P2.

Next, in a case where the rank n of the energy of the main drive pulse P1 driven at this time (the main drive pulse of process step S504) is not the maximum rank m (step S509), the control circuit 103 carries out pulse-up of the rank n of the main drive pulse P1 to be driven next time by one rank, and returns to process step S502 (step S510). In process step S504 of next time, the main drive pulse generation circuit 104 carries out rotation driving with the main drive pulse P1 (n+1) pulsed-up by one rank pulse.

In process step S509, in a case where the rank n of the main drive pulse P1 is determined as the maximum rank m, since the rank n of the main drive pulse P1 may not be raised and rotation may not be carried out, the control circuit 103 sets the rank of the main drive pulse P1 to a main drive pulse P1 (n−a) by lowering the rank by a predetermined rank a for electric power saving, and then returns to process step S502. (step S511).

In a case where it is determined that the induced voltage signal VRs exceeding the second reference voltage Vcomp is detected in the section T2 in process step S506 (this corresponds to a case of minimum-load-increment (maximum-margin rotation)), the control circuit 103 determines whether or not the main drive pulse P1 has the lowest rank 0 (step S530).

In process step S530, in a case where it is determined that the rank n of the main drive pulse P1 is not the lowest rank 0, the control circuit 103 adds 1 to a count number N of the number of times of continuous driving (step S532), and determines whether or not the counted value N reaches a predetermined number of times (in the first embodiment, 80 times) (step S533).

In process step S533, in a case where it is determined that the predetermined number of times is not reached, the control circuit 103 returns to process step S502 without changing the rank n of the main drive pulse P1 (step S531). In a case where it is determined that the predetermined number of times is reached, the control circuit 103 carries out pulse-down of the rank n of the main drive pulse P1 by one rank, and resets the counted value N to 0, and returns to process step S502 (step S534).

In process step S530, in a case where it is determined that the main drive pulse P1 is the lowest rank 0, the control circuit 103 transitions to process step S531, and returns to process step S502 without changing the rank n of the main drive pulse P1.

On the other hand, in process step S505, in a case where the rotation detection circuit 108 determines that the induced voltage signal VRs exceeding the first reference voltage Vinv is detected, the control circuit 103 determines whether or not the induced voltage signal VRs exceeds the second reference voltage Vcomp (step S520).

In a case where it is determined that the induced voltage signal VRs does not exceed the second reference voltage Vcomp in process step S520, the control circuit 103 transitions to process step S506.

In process step S520, when it is determined that the induced voltage signal VRs exceeds the second reference voltage Vcomp, the control circuit 103 determines whether of not an induced voltage signal VRs (T1next) subsequently detected by the rotation detection circuit 108 exceeds the first reference voltage Vinv in the section T1 (step S521).

In process step S521, when it is determined that the induced voltage signal VRs (T1next) subsequently detected does not exceed the first reference voltage Vinv in the section T1, the control circuit 103 transitions to process step S506.

In process step S521, in a case where it is determined that the induced voltage signal VRs (T1next) subsequently detected exceeds the first reference voltage Vinv in the section T1 (this corresponds to a case in which a plurality of induced voltage signals VRs exceeding a plurality of reference voltages are detected), as described with reference to FIG. 7, the control circuit 103 carries out control in order for the rotation detection circuit 108 to carry out rotation detection after changing the detection direction of the induced current Ik (in other words, induced voltage signal VRs) to the opposite direction (setting to Rs-R) (step S522).

As described with reference to FIG. 7, in the sections T2R and T3R, the rotation detection circuit 108 detects whether or not the induced voltage signal VRs exceeding the first reference voltage Vinv is present after changing the detection direction of the induced current Ik to the opposite direction by changing the detection resistors 301 and 302. The detection section determination circuit 109 determines whether or not the induced voltage signal VRs, which is detected by the rotation detection circuit 108 and exceeds the first reference voltage Vinv, belongs to the sections T2R or T3R, and outputs a pattern of the induced voltage signal VRs to the control circuit 103.

That is, the control circuit 103 determines whether or not the induced voltage signal VRs subsequently detected exceeds the second reference voltage Vcomp in the section T1 (step S523). In a case where it is determined that the induced voltage signal VRs subsequently detected exceeds the second reference voltage Vcomp, the control circuit 103 determines whether or not another induced voltage signal VRs exceeding the first reference voltage Vinv is detected in the section T2R (step S525).

In process step S525, when it is determined that another induced voltage signal VRs exceeding the first reference voltage Vinv is not detected in the section T2R, the control circuit 103 determines whether or not the induced voltage signal VRs exceeding the first reference voltage Vinv is detected in the section T3R (step S526).

In process step S526, in a case where it is determined that the induced voltage signal VRs exceeding the first reference voltage Vinv is not detected in the section T3R (this corresponds to a case of maximum-load-increment driving (non-rotation)), the control circuit 103 transitions to process step S508. In a case where it is determined that the induced voltage signal VRs exceeding the first reference voltage Vinv is detected in the section T3R (this corresponds to a case of maximum-load-increment driving (limited rotation), the control circuit 103 transitions to process step S509.

In process step S525, it is determined that the induced voltage signal VRs exceeding the first reference voltage Vinv is detected in the section T2R (this corresponds to a case of large-load-increment driving (small-margin rotation)), the control circuit 103 transitions to process step S531.

In process step S523, in a case where it is determined that the induced voltage signal VRs subsequently detected does not exceed the second reference voltage Vcomp, the control circuit 103 determines whether or not the induced voltage signal VRs exceeding the first reference voltage Vinv is detected in the section T2R (step S524).

In process step S524, in a case where it is determined that the induced voltage signal VRs exceeding the first reference voltage Vinv is not detected in the section T2R, the control circuit 103 transitions to process step S526. In a case where it is determined that the induced voltage signal VRs exceeding the first reference voltage Vinv is detected in the section T2R (this corresponds to a case of intermediate-load-increment driving (intermediate-margin rotation)), the control circuit 103 transitions to process step S530.

The rotation driving of the stepping motor 107 is carried out by selecting the drive pulse P1 or P2 with energy corresponding to the rotation state of the stepping motor 107 by repetitively carrying out the above-described process.

As described above, the stepping motor control circuit according to the first embodiment of the invention includes: a rotation detection unit that detects an induced current Ik flowing through a drive coil 209 due to free vibration of a stepping motor 107 in a detection section T divided into a plurality of sections T1 to T3, and detects a rotation state of the stepping motor 107 on the basis of a pattern indicating whether or not an induced current Ik exceeding a predetermined reference value Vinv is detected in each of the sections T1 to T3 by using a phenomenon in which a detection time of the induced current Ik is delayed along with a relative load increase with respect to drive energy, and a level of the induced current Ik decreases; and a control unit that selects a drive pulse corresponding to the rotation state that is detected by the rotation detection unit among a plurality of kinds of drive pulses, each having different energy, and supplies a drive current i to the drive coil 209 by the selected drive pulse to rotatably drive the stepping motor 107. The rotation detection unit carries out the detection by selecting a detection direction of the induced current Ik in sections T2 and T3 after a first section T1 on the basis of whether or not the induced current Ik exceeding a predetermined reference value Vinv is detected in the first section T1 that is an initial section of the detection section T, and detects the rotation state of the stepping motor 107 by a pattern based on the induced current Ik detected in each of the sections T1 to T3.

Here, the rotation detection unit may be configured as follows. In a case where the induced current Ik exceeding the predetermined reference value Vinv is detected in the first section T1, in sections T2 and T3 after the first section T1, the rotation detection unit carries out the detection by selecting a first direction as the detection direction of the induced current Ik in the sections T2 and T3 after the first section T1, and in a case where the induced current Ik exceeding the predetermined reference value Vinv is not detected in the first section T1, in the sections T2 and T3 after the first section T1, the rotation detection unit carries out the detection by selecting a second direction opposite to the first direction as the detection direction of the induced current Ik, and detects the rotation state of the stepping motor 107 by a pattern based on the induced current Ik detected in each of the sections T1 to T3.

In addition, the rotation detection unit may be configured as follows. The rotation detection unit carries out the detection by selecting the detection direction of the induced current Ik in the sections T2 and T3 after the first section T1 on the basis of whether or not the induced current Ik exceeding the predetermined reference value Vinv is detected plural times in the first section T1 that is an initial section of the detection section T, and detects the rotation state of the stepping motor 107 by a pattern based on the induced current Ik detected in each of the sections T1 to T3.

In addition, the rotation detection unit may be configured as follows. In a case where the induced current Ik exceeding a predetermined reference value Vinv is detected plural times in the first section T1 that is an initial section of the detection section T, in sections T2 and T3 after the first section T1, the rotation detection unit carries out the detection by changing the detection direction of the induced current Ik to a direction opposite to the direction of the first section T1, and detects the rotation state of the stepping motor 107 by a pattern based on the induced current Ik detected in each of the sections T1 to T3.

In addition, the rotation detection unit may be configured as follows. In a case where the induced current Ik exceeding the predetermined reference value Vinv is not detected plural times in the first section T1 that is an initial section of the detection section T, in the sections T2 and T3 after the first section T1, the rotation detection unit detects the induced current Ik by setting the detection direction to the same direction as the first section T1, and detects the rotation state of the stepping motor 107 by a pattern based on the induced current Ik detected in each of the sections T1 to T3.

In addition, the rotation detection unit may be configured to carry out the detection in the first section T1 by allowing the drive current i and the induced current Ik flow in the same direction.

In addition, the rotation detection unit may be configured in such a manner that as the plurality of reference values, a first reference value Vinv and a second reference value Vcomp larger than the first reference value Vinv are set.

In addition, the rotation detection unit may be configured as follows. In a case where the induced current Ik exceeding the first reference value is detected plural times in the first section T1 that is an initial section of the detection section T, in the sections T2 and T3 after the first section T1, the rotation detection unit detects the induced current Ik on the basis of the first reference value.

In addition, the rotation detection unit may be configured as follows. In a case where the induced current Ik exceeding the first reference value is not detected plural times in the first section T1 that is an initial section of the detection section T, in the sections T2 and T3 after the first section T1, the rotation detection unit detects the induced current Ik on the basis of the second reference value.

In addition, the detection section T is divided into the first section T1 immediately after driving with the main drive pulse P1, a second section T2 after the first section T1, and a third section T3 after the second section T2. In a state in which the stepping motor 107 is driven while retaining a rank n of the drive pulse, the first section T1 is a section in which a first forward rotation state of the rotor 202 in a second quadrant II of a space centering around the rotor 202 of the stepping motor 107 is determined, the second section T2 is a section in which the first forward rotation state of the rotor 202 in the second quadrant II, and a first forward rotation state of the rotor 202 in a third quadrant III are determined, and the third section T3 is a section in which a first backward rotation state of the rotor 202 in the third quadrant III is determined. In a case where the induced current Ik exceeding the first reference value in the first section T1 is detected plural times, the rotation detection unit may be configured to detect the induced current Ik using the first reference value in the second section T2 and the third section T3.

In addition, the detection section T is divided into a first section T1 immediately after driving with the main drive pulse P1, a second section T2 after the first section T1, and a third section T3 after the second section T2. In a state in which the stepping motor 107 is driven while retaining a rank n of the main drive pulse P1, the first section T1 is a section in which a first forward rotation state of the rotor 202 in a second quadrant II of a space centering around the rotor 202 of the stepping motor 107 is determined, the second section T2 is a section in which the first forward rotation state of the rotor 202 in the second quadrant II, and a first forward rotation state of the rotor 202 in a third quadrant III are determined, and the third section T3 is a section in which a first backward rotation state of the rotor 202 in the third quadrant III is determined. In a case where the induced current Ik exceeding the first reference value is not detected plural times in the first section T1, the rotation detection unit may be configured to detect the induced current Ik using the second reference value in the second section T2 and the third section T3.

In addition, the rotation detection unit may be configured as follows. The rotation detection unit includes first and second detection resistors 301 and 302 that detect induced currents Ik flowing through the drive coil 209 due to free vibration of the stepping motor 107 in directions opposite to each other, and detects the induced current Ik in the detection section T by alternately repeating a first closed circuit including the drive coil 209 of the stepping motor 107 and the detection resistor 301 or 302, and a second closed circuit constituted by the drive coil 209 and a low-impedance element. In addition, the rotation detection unit carries out the detection by changing the detection resistor constituting the first closed circuit to the first detection resistor 301 or the second detection resistor 302 in response to the direction of the induced current Ik that is detected.

Accordingly, according to the stepping motor control circuit according to the embodiment of the invention, an effect of a load variation is reduced, and thus accurate rotation detection may be carried out.

In addition, in a case where rotation is slow, rotation is detected in a section (b region) in which the speed of the rotor 202 becomes the maximum after blocking the main drive pulse P1, and thus a stable induced current Ik with a high level (in other words, an induced voltage signal VRs) may be obtained, and thus it is not likely to be affected by the load variation. Accordingly, stable detection performance may be provided.

In addition, the rotation detection immediately after blocking the main drive pulse P1 is carried out, and thus it is not likely to be affected by the load variation, and improvement in accuracy of a drive control operation on the basis of time at which the induced voltage signal VRs is generated may be realized. Accordingly, there is an effect of reducing useless power consumption.

In addition, since rotation detection accuracy is improved, it is possible to reduce driving with the correction drive pulse P2 due to false detection as non-rotation in spite of rotation, and thus waste of power consumption may be suppressed.

In addition, when the rotation state is detected using a phenomenon in which a rotation detection time is delayed along with an increase in a load, occurrence of a problem, in which an angular velocity of the rotor 202 decreases at a load variation (a calendar load, or a load of a moment of the long hand) over a certain degree, the induced voltage signal VRs decreases, and driving with the correction drive pulse P2 is carried out although rotation continues, may be reduced. Accordingly, power consumption may be reduced, and lifespan of a battery that is used as a power source may be lengthened.

In addition, in the stepping motor control circuit using a phenomenon in which the detection time of the induced voltage signal VRs is delayed along with an increase in a load, it is not likely to be affected by a load variation, and thus stable detection becomes possible.

Next, a second embodiment of the invention will be described.

In the first embodiment, the rotation state is determined by detecting the induced signal VRs of one polarity, and a direction of the induced current Ik is selected on the basis of the determination result to carry out rotation detection. However, in the second embodiment of the invention, the rotation state is determined by detecting an induced signal VRs of each of both polarities, and the direction of the induced current Ik is selected on the basis of the determination result to carry out rotation detection. According to this, even when drive energy with respect to a load is relatively decreased, rotation detection in the region b not the region c is reliably carried out by selecting an appropriate induced current Ik, whereby accurate rotation detection may be realized. In addition, in the first embodiment, two kinds of reference voltages Vinv and Vcomp are used as a reference voltage, but in the second embodiment, one kind of reference threshold voltage Vcomp is used as a reference voltage.

FIG. 9 shows a timing chart of a case where the stepping motor 107 is driven with the main drive pulse P1 in the second embodiment of the invention.

FIG. 9 illustrates a state during normal driving (during a hand movement operation of time indicating hands 114 to 116 by the main drive pulse P1 in a state in which a power supply voltage of the analog electronic timepiece is a rated voltage). In addition, in FIG. 9, P1 represents the main drive pulse P1, and a drive section in which the rotor 202 is rotatably driven by the main drive pulse P1. In addition, a to e are regions indicating rotation positions of the magnetic axis A of the rotor 202 during driving with the main drive pulse P1.

A predetermined period after termination of driving with the main drive pulse P1 is set as a detection section T in which a rotation state is detected, and the detection section T is divided into a plurality of continuous sections. In a case of detecting an induced current Ik flowing in the same direction as the drive current flowing through the drive coil 209 during driving with the main drive pulse P1, two sections including a first section T1b and a fourth section T2 are used. In addition, in a case of detecting an induced current Ik flowing in a direction opposite to that of the drive current flowing through the drive coil 209 during driving with the main drive pulse P1, three sections including the first section T1b, a second section T2R, and a third section T3R are used. The sum of a time width of the section T2R and a time width of the section T3R is equal to a time width of the section T2. In addition, the section T1a is a mask section provided immediately after the driving with the main drive pulse, and the induced current Ik generated in the section T1a is not used for determination of a rotation state.

When the XY coordinate space centering around the rotor 202, in which the magnetic pole axis A of the rotor 202 is located by the rotation of the rotor 202, is divided into a first quadrant I to a fourth quadrant IV, the sections T1b, T2, T2R, and T3R may be expressed as follows.

For example, in a large-load-increment driving (small-margin rotation) state in which the rank of the main drive pulse P1 is retained without being changed, in a case of detecting the induced current Ik flowing in a direction (different direction) opposite to that of the drive current i, the section T2R is a section in which the rotation state of the rotor 202 in a first forward region b in the third quadrant III is determined, and the section T3R is a section in which the rotation state of the rotor 202 in a first backward region c in the third quadrant III is determined.

In a large-margin rotation state in which the main drive pulse P1 is pulsed down, in a case of detecting the induced current Ik flowing in the same direction (one direction) as the drive current i, the section T1b is a section in which the rotation state of the rotor 202 in the first forward region b in the third quadrant III is determined, and the section T2 is a section in which the rotation state of the rotor 202 after the first backward region c in the third quadrant III is determined.

As the reference voltage that detects the induced voltage signal VRs, one kind of reference voltage Vcomp is used.

In the section T1b, both an induced voltage signal VRs which corresponds to an induced current Ik flowing through the drive coil 209 in the same direction as the drive current i, and an induced voltage signal VRs which corresponds to an induced current Ik flowing through the drive coil 209 in a direction opposite to that of the drive current i are detected.

When a load with respect to energy of the main drive pulse P1 increases, rotation of the rotor 202 becomes slow, and thus a time at which the induced current Ik is generated is delayed. In this case, the induced current Ik which is generated before the section T1b is delayed, and is detected in the section T1b.

That is, in a case where the load with respect to the energy of the main drive pulse P1 is smaller than a predetermined value, the rotor 202 rotates at a speed higher than a constant speed in the section T1b, and thus an induced current Ik which flows in the same direction as the drive current i and exceeds a predetermined value is not detected, and an induced current Ik which flows in a direction opposite to the direction of the drive current i and exceeds a predetermined value is detected.

Conversely, in a case where the load with respect to the energy of the main drive pulse P1 is larger than a predetermined value, the rotation speed of the rotor 202 is slower than a constant speed in the section T1b, and thus the induced current Ik which flows in the same direction as the drive current i and exceeds a predetermined value is detected, and the induced current Ik which flows in a direction opposite to that of the drive current i and exceeds a predetermined value is not detected.

The second embodiment utilizes the phenomenon as described above, and is configured in such a manner that the detection is carried out by selecting a direction of the induced current Ik to be detected in subsequent sections on the basis of whether or not the induced voltage signal VRs exceeding a predetermined reference voltage is detected in the section T1b of each polarity, and determination of the rotation state or pulse control is carried out.

As described above, detection is carried out by changing polarity (detection direction) for detecting the induced current Ik in the sections T2, T2R, and T3R after the section T1b on the basis of whether or not the induced current Ik exceeding a predetermined reference value is detected in the first section T1b of both polarities, the rotation state of the stepping motor 107 is detected on the basis of the induced current Ik in each of the sections T1b, T2, T2R, and T3R (actually, an induced voltage signal VRs equivalent to the induced current Ik). Accordingly, even when a load is large and the rotation of the rotor 202 is slow, rotation detection may be carried out at a stage in which the rotation of the rotor 202 is fast, and thus accurate rotation detection may be carried out by reducing an effect due to a load variation.

In addition, in a case where the rotor 202 is rotated at a speed higher than a constant speed at which the induced current Ik exceeding a predetermined reference value may not be detected at one polarity in the first section T1b, a sufficiently large induced voltage signal VRs may be detected even when the direction of the induced current Ik is not changed. Accordingly, a detection process is configured to be simple by carrying out the rotation detection on the basis of the induced voltage signal VRs corresponding to the induced current Ik that flows in the same direction as the main drive pulse P1 without changing the direction of the induced current Ik.

As described above, in the section T1b, the induced current Ik exceeding a reference value is detected at both polarities, and a detection target in subsequent sections is changed, thereby increasing rotation detection accuracy.

FIG. 10 shows a determination chart in which pulse control operations in the second embodiment of the invention are arranged.

The sections T1b and T2 are sections in which detection is carried out when the drive current i and the induced current Ik flow in the same direction, and the sections T2R, T3R, and T2 are sections in which the induced current Ik is detected by setting the detection direction to a direction opposite to that of the section T2. A width of the section T2 is equal to the sum of a width of the section T2R and a width of the section T3R.

As described above, a case in which the induced voltage signal VRs exceeding the reference voltage Vcomp is detected is expressed by a determination value "1", and a case in which the induced voltage signal VRs exceeding the reference voltage Vcomp is not detected is expressed by a determination value "0", respectively. In addition, "1/0" represents that the determination value may be either "1" or "0". In addition, "-" represents that the determination value is not considered as a pattern of the induced voltage signal VRs.

The rotation detection circuit 108 detects whether or not the induced voltage signal VRs exceeding the reference voltage Vcomp is present, the detection section determination circuit 109 determines the pattern (representing the degree of margin of the energy of the main drive pulse P1) of the induced voltage signal VRs, and the control circuit 103 carries out the following pulse control such as pulse-up or pulse-down of the main drive pulse P1, and driving with the correction drive pulse P2 on the basis of the pattern with reference to the determination chart of FIG. 10 which is stored inside the control circuit 103, thereby rotatably controlling the stepping motor 107.

Figure 11:
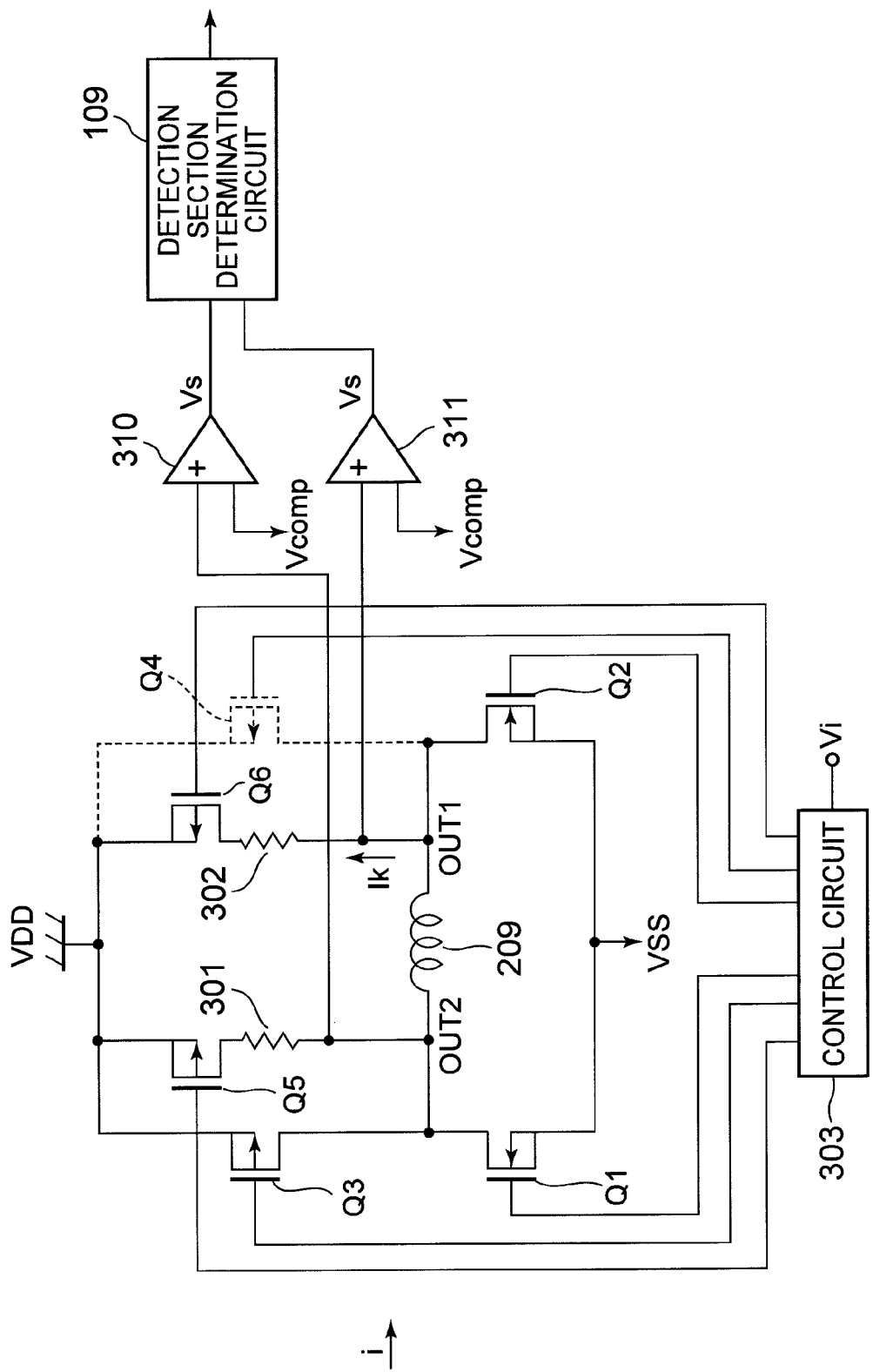
FIG. 11 is a partially detailed circuit diagram of the stepping motor control circuit, the movement, and the analog electronic timepiece according to the second embodiment of the invention.

FIG. 11 shows a partially detailed circuit diagram used in the stepping motor control circuit, the movement, and the analog electronic timepiece according to the second embodiment of the invention. FIG. 5 shows a partially detailed circuit diagram of the motor driver circuit 106 and the rotation detection circuit 108. The same reference numerals are given to the same parts as FIG. 5.

A comparator 310 that detects the induced signal VRs generated in a detection resistor 301, and a comparator 311 that detects the induced signal VRs generated in a detection resistor 302 are provided. The comparators 310 and 311 are constituent elements of the rotation detection circuit 108.

As a reference voltage of the comparators 310 and 311, the same reference threshold voltage Vcomp is input. In a case where the induced voltage signal VRs detected by each of the corresponding detection resistors 301 and 302 exceeds the reference threshold voltage Vcomp, each of the comparators 310 and 311 outputs a determination value "1" as a detection signal, and in a case where the induced voltage signal VRs does not exceed the reference threshold voltage Vcomp, each of the comparators 310 and 311 outputs a determination value "0" as a detection signal Vs. The detection section determination circuit 109 selects the output of each of the comparators 310 and 311, each corresponding to a direction of the induced current Ik that is detected, and outputs a determination value of each section.

Figure 12:
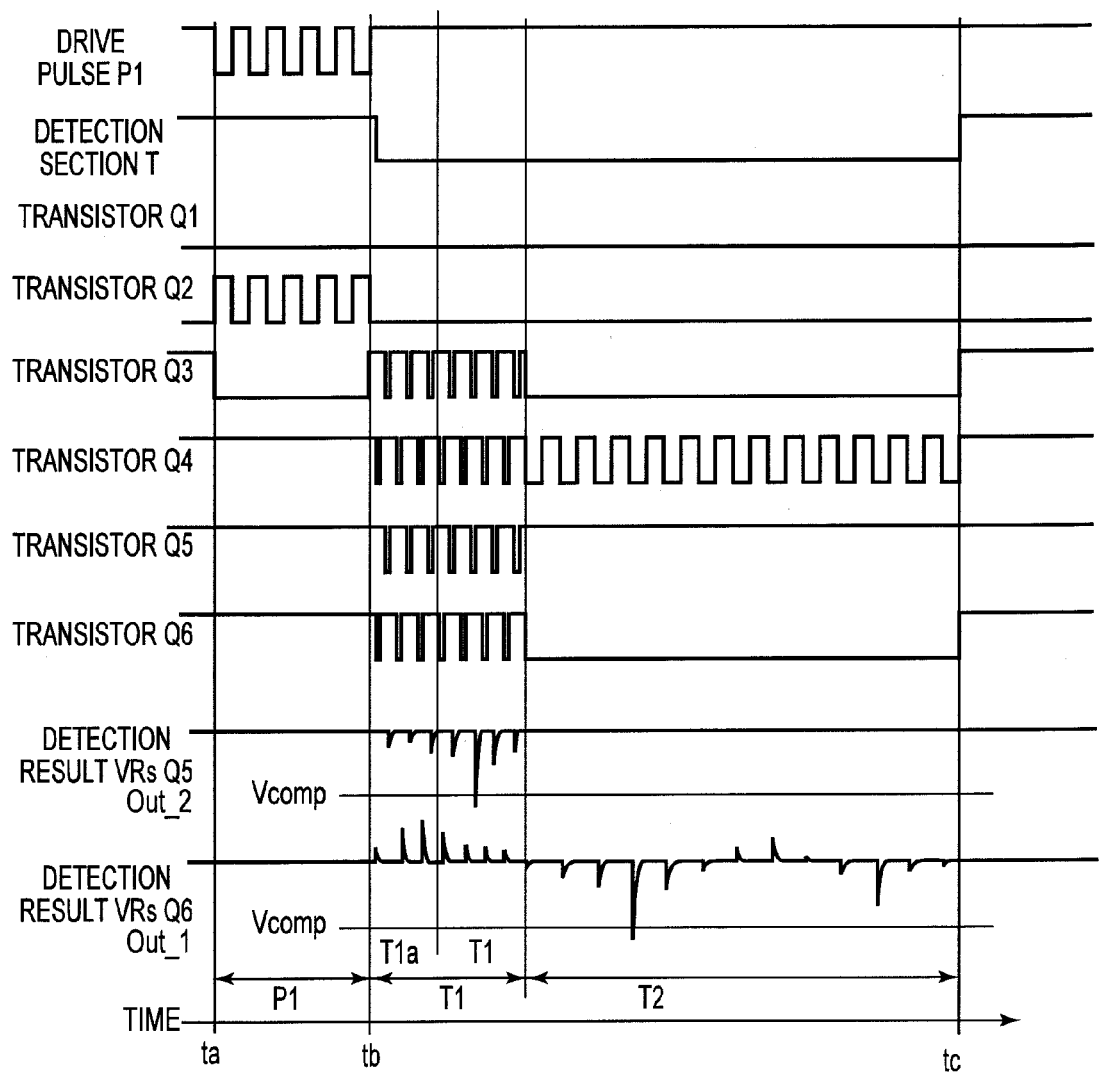
FIG. 12 is a timing chart of the stepping motor control circuit, the movement, and the analog electronic timepiece according to the second embodiment of the invention.

FIG. 12 shows a timing chart according to the second embodiment of the invention in a case where detection is carried out without changing a detection direction of the induced current Ik. FIG. 12 shows a timing chart of the small-load-increment driving (large-margin rotation) state, and illustrates a timing during detection in a state in which the induced current Ik flows in the same direction as the drive current i. In this case, the rotation state is determined according to a pattern of the determination value of the induced signal VRs in the first section T1b and the fourth section T2.

In a case where the stepping motor 107 is rotatably driven, in a drive period P1 between times ta and tb, the switch control circuit 303 repetitively switches the transistor Q2 between an ON-state (supply state) and an OFF-state (supply stop state) at a predetermined cycle while maintaining the transistor Q3 in an ON-state to generate a comb-like main drive pulse P1, and supplies the drive current i in an arrow direction of FIG. 11 to the drive coil 209 of the stepping motor 107. According to this, in a case where the stepping motor 107 rotates, the rotor 202 rotates in a forward direction by 180°.

On the other hand, detection of a rotation state is carried out in a detection section T from the termination time tb of the drive period P1 of the main drive pulse P1 to time tc.

With regard to the detection of the rotation state, first, in the section T1 starting from the time tb (a section in which the mask section T1a is added to the section T1b), the switch control circuit 303 detects the induced signal VRs of both polarities. In this case, the switch control circuit 303 controls respective transistors Q1 to Q6 in such a manner that a first detection state (1) and a second detection state (2) to be described below are alternately repeated while maintaining transistors Q1 and Q2 in an OFF-state. The first detection state (1) is a detection state in which detection is carried out by switching the transistor Q4 between an ON-state and an OFF-state at a predetermined cycle to allow the induced current Ik to flow through the detection resistor 302 in the same direction as the drive current i at a predetermined cycle while maintaining the transistors Q3 and Q6 in an ON-state. The second detection state (2) is a detection state in which detection is carried out by switching the transistor Q3 between an ON-state and an OFF-state to allow the induced current Ik to flow through the detection resistor 301 in a direction opposite to that of the drive current i while maintaining the transistors Q4 and Q5 in an ON-state.

According to this, in the first detection state, the induced voltage signal VRs is generated in the detection resistor 302, and in the second detection state, the induced voltage signal VRs is generated in the detection resistor 301.

The comparator 311 compares the induced voltage signal VRs generated in the detection resistor 302 and the reference voltage Vcomp. When the induced voltage signal VRs exceeds the reference voltage Vcomp, the comparator 311 outputs "1" to the detection section determination circuit 109 as the detection signal Vs, and when the induced voltage signal VRs does not exceed the reference voltage Vcomp, the comparator 311 outputs "0" to the detection section determination circuit 109 as the detection signal Vs.

In addition, the comparator 311 compares the induced voltage signal VRs generated in the detection resistor 301 and the reference voltage Vcomp. When the induced voltage signal VRs exceeds the reference voltage Vcomp, the comparator 311 outputs "1" to the detection section determination circuit 109 as the detection signal Vs, and when the induced voltage signal VRs does not exceed the reference voltage Vcomp, the comparator 311 outputs "0" to the detection section determination circuit 109 as the detection signal Vs.

The detection section determination circuit 109 ignores the induced voltage signal VRs in the mask section T1a and does not carry out the determination of this signal VRs, and carries out the determination of the induced voltage signal VRs in the section T1b.

Since a determination value in an OUT1 of one polarity is "0", and a determination value in an OUT2 of the other polarity is "1", in a subsequent section, the detection section determination circuit 109 detects the induced current Ik flowing in the same direction as the drive current i. That is, the detection section determination circuit 109 determines whether or not the induced voltage signal VRs exceeding the reference threshold voltage Vcomp is detected in the section T2.

In this case, the detection signal Vs is input to the detection section determination circuit 109 from both of the comparators 310 and 311. However, in the section T2, the detection section determination circuit 109 carries out determination with respect to only the detection signal Vs transmitted from the comparator 311 whether or not the detection signal Vs belongs to the section T2. According to this, determination of the rotation state may be carried out more accurately. In addition, since the detection direction of the induced current Ik is not changed, the detection operation becomes simple.

As a determination result, the detection section determination circuit 109 outputs a pattern (a determination value in the section T1b and a determination value in the section T2) of the induced voltage signal VRs to the control circuit 103.

The control circuit 103 determines the rotation state of the stepping motor 107 with reference to the determination chart of FIG. 10 on the basis of the pattern output from the detection section determination circuit 109, and carries out pulse control such as pulse-down, and pulse-up+driving with the correction drive pulse P2.

Even in a next cycle after termination of the cycle shown in FIG. 12, polarity of the induced voltage signal VRs to be detected in a section after the section T1 is determined in the section T1b on the basis of the induced voltage signal VRs of both polarities, and a rotation detection operation is carried out.

Figure 13:
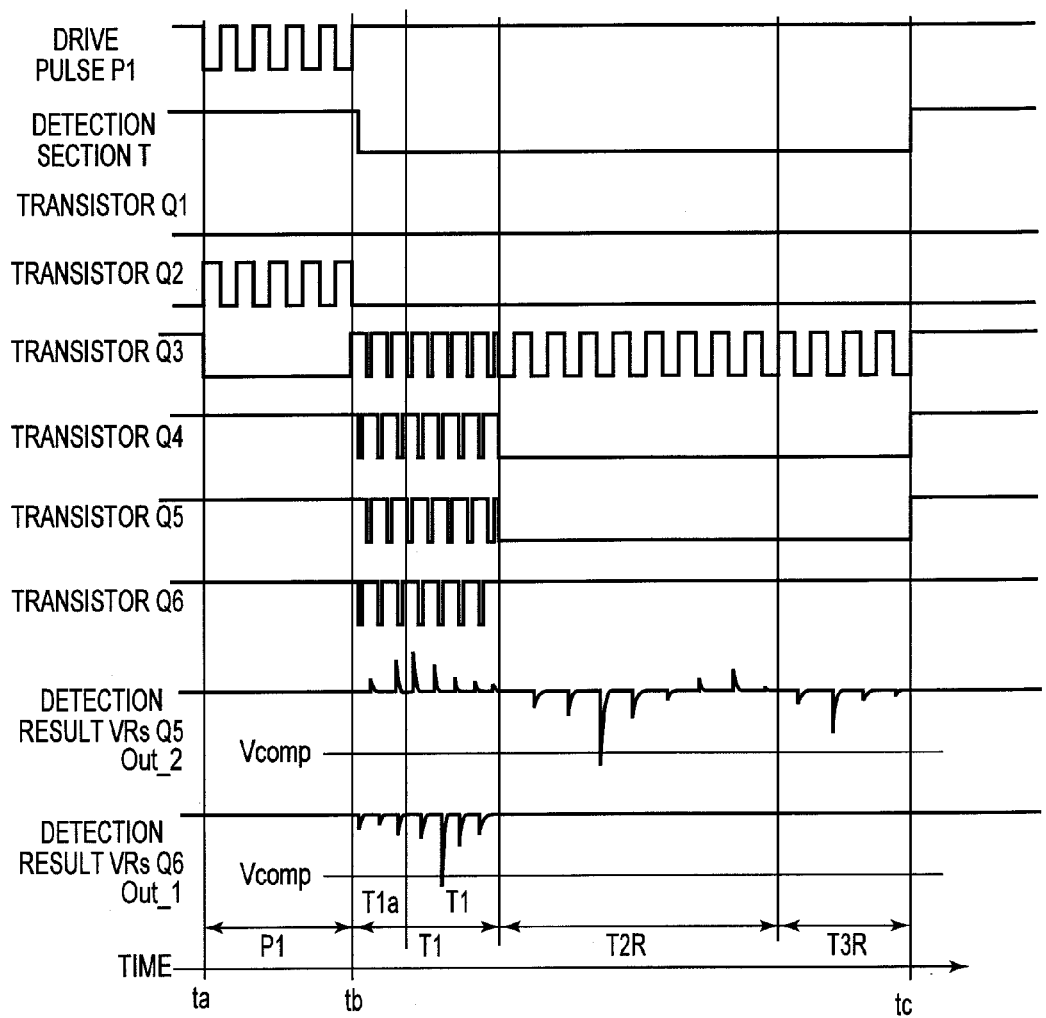
FIG. 13 is a timing chart of the stepping motor control circuit, the movement, and the analog electronic timepiece according to the second embodiment of the invention.

FIG. 13 shows a timing chart of the second embodiment of the invention in a case where detection is carried out by changing the detection direction of the induced current Ik. FIG. 13 illustrates a timing in a large-load-increment driving (small-margin rotation) state. In FIG. 13, to carry out detection by changing the detection direction of the induced current Ik to an opposite direction in the sections T2R and T3R, detection is carried out by inverting the polarity of the induced voltage signal VRs. According to this, the detection of the induced voltage signal VRs is configured to be carried out in the region b earlier in time instead of the region c later in time as shown in FIG. 12 so as to carry out the rotation detection with relatively high accuracy even when rotation is slow.

That is, in FIG. 13, similarly to FIG. 12, the stepping motor 107 is rotatably driven between times ta and tb, and in a section T1 (section T1a+section T1b) starting from the time tb, the induced signal VRs of both polarities is detected.

Since a determination value in the OUT1 of one polarity is "1", and a determination value in the OUT2 of the other polarity is "0", in a subsequent section, the detection section determination circuit 109 detects the induced current Ik flowing in a direction opposite to that of the drive current i. That is, the detection section determination circuit 109 determines whether or not the induced voltage signal VRs exceeding the reference threshold voltage Vcomp is detected in the sections T2R and T3R.

In this case, the detection signal Vs is input to the detection section determination circuit 109 from both of the comparators 310 and 311. However, in the sections T2R and T3R, the detection section determination circuit 109 carries out determination with respect to only the detection signal Vs transmitted from the comparator 310 whether or not the detection signal Vs belongs to the section T2R or the section T3R. According to this, the rotation state is detected early, and thus determination of the rotation state may be carried out more accurately.

As a determination result, the detection section determination circuit 109 outputs a pattern (a determination value in the section T1b, a determination value in the section T2R, and a determination value in the section T3R) of the induced voltage signal VRs to the control circuit 103.

The control circuit 103 determines the rotation state of the stepping motor 107 with reference to the determination chart of FIG. 10 on the basis of the pattern output from the detection section determination circuit 109, and carries out pulse control such as retention and pulse-up.

In FIG. 13, the switch control circuit 303 operates so that the detection is carried out by changing the detection direction of the induced current Ik to an opposite direction in sections (the third section T2R and the fourth section T3R) that are continuous with the section T1b. The sum of a time width of the section T2R and a time width of the section T3R is configured to be equal to the time width of the section T2.

In the sections T2R and T3R, the switch control circuit 303 switches the transistor Q3 between an ON-state and an OFF-state at a predetermined cycle while maintaining the transistors Q4 and Q5 in an ON-state and the transistor Q6 in an OFF-state so as to allow the induced current Ik to flow through the detection resistor 301. In the detection resistor 301, the induced voltage signal VRs in which the detection direction is opposite to that of the sections T1b is generated, and thus detection of the induced current Ik in which the detection direction is changed to the opposite direction is carried out. According to this, the detection of the induced voltage signal VRs generated in the region b is carried out.

The comparator 310 compares the induced voltage signal VRs and the reference voltage Vcomp. In a case where the induced voltage signal VRs exceeds the reference voltage Vcomp, the comparator 310 outputs "1" to the detection section determination circuit 109 as a detection signal Vs, and in a case where the induced voltage signal VRs does not exceed the reference voltage Vcomp, the comparator 310 outputs "0" to the detection section determination circuit 109 as the detection signal Vs.

In addition, the comparator 311 compares the induced voltage signal VRs and the reference voltage Vcomp. In a case where the induced voltage signal VRs exceeds the reference voltage Vcomp, the comparator 310 outputs "1" to the detection section determination circuit 109 as the detection signal Vs, and in a case where the induced voltage signal VRs does not exceed the reference voltage Vcomp, the comparator 310 outputs "0" to the detection section determination circuit 109 as the detection signal Vs.

As a determination result, the detection section determination circuit 109 outputs a pattern (a determination value in the section T1b, a determination value in the section T2R, and a determination value in the section T3R) of the induced voltage signal VRs to the control circuit 103 on the basis of the detection signal output from the comparator 310.

The control circuit 103 determines the rotation state of the stepping motor 107 on the basis of the pattern output from the detection section determination circuit 109, and carries out pulse control such as retention and pulse-up.

As described above, in a case where it is determined that energy of the main drive pulse P1 with respect to a load is small and rotation of the rotor 202 is slow in section T1b on the basis of induced currents Ik from the OUT1 and OUT2, each having different polarity, since in sections after the section T1, detection is carried out by changing the detection direction of the induced current Ik to an opposite direction, and determination of the rotation state is carried out, the rotation detection is possible at a stage (the rotation region b of the rotor 202) in which rotation of the rotor is fast. Accordingly, the rotation state may be detected more accurately.

Even in a next cycle after termination of the cycle shown in FIG. 13, the respective transistors Q1 to Q6 are drive-controlled so that polarity of the induced voltage signal VRs to be detected in a section after the section T1 is determined in the section T1b on the basis of the induced voltage signal VRs of both polarities, and a rotation detection operation is carried out.

Figure 14:
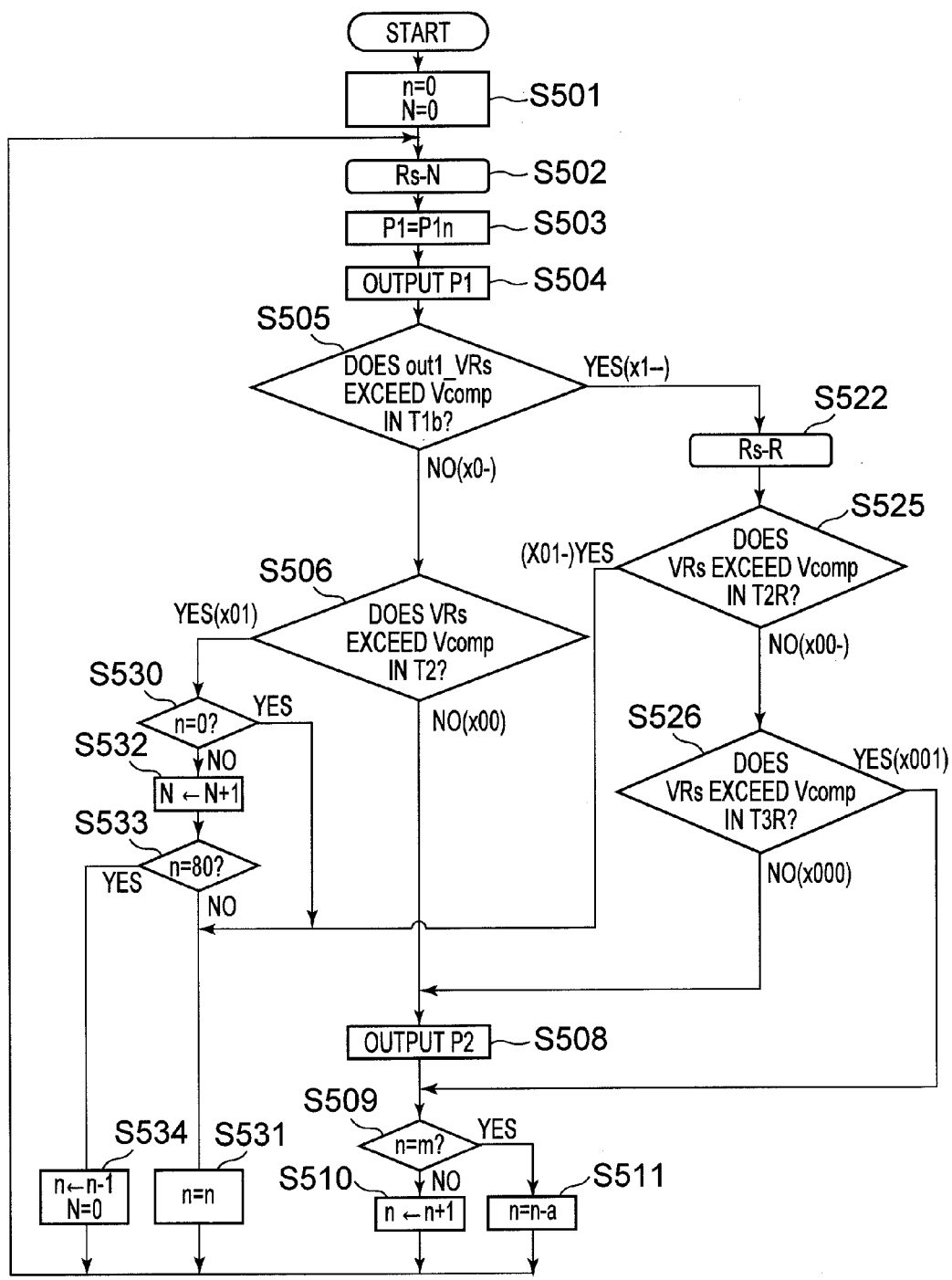
FIG. 14 is a flowchart of the stepping motor control circuit, the movement, and the analog electronic timepiece according to the second embodiment of the invention.

FIG. 14 shows a flowchart illustrating the operation of the stepping motor control circuit, the movement, and the analog electronic timepiece according to the second embodiment of the invention. The flowchart mainly illustrates a process of the control circuit 103. The same reference numerals are given to portions in which a process of the same content as FIG. 8 is carried out.

Hereinafter, an operation of the second embodiment of the invention will be described in detail with reference to FIGS. 1, 2, and 9 to 14.

The control circuit 103 carries out a time counting operation by counting the timepiece signal transmitted from the frequency dividing circuit 102, and first of all, resets an energy rank n of the main drive pulse P1n, and a counted value N indicating the number of times of continuous driving with the same main drive pulse P1 to 0 (step S501 in FIG. 14).

The control circuit 103 carries out initial setting to allow the rotation detection circuit 108 to carry out rotation detection on the basis of the induced current Ik (in other words, the induced voltage signal VRs) flowing in the same direction as the drive current i (setting to Rs-N) (step S502).

Next, the control circuit 103 outputs a main drive pulse control signal so as to rotatably drive the stepping motor 107 with a main drive pulse P10 having the minimum energy which is set in process step S501 (steps S503 and S504).

The main drive pulse generation circuit 104 outputs the main drive pulse P10 corresponding to the control signal to the motor driver circuit 106 in response to the control signal output from the control circuit 103. The motor driver circuit 106 rotatably drives the stepping motor 107 with the main drive pulse P10. The stepping motor 107 is rotatably driven with main drive pulse P10, and rotatably drives the time indicating hands 114 to 116 of the analog display portion 112. According to this, in a case where the stepping motor 107 is normally rotated, a current time is displayed at any time in the analog display portion 112 by the time indicating hands 114 to 116. In addition, in a case where a calendar display portion (not shown) is rotatably driven by the stepping motor 107, calendar display is changed to display of the next day.

The rotation detection circuit 108 detects whether or not the induced current Ik that flows in the same direction as the drive current i and exceeds a predetermined reference value is present. In other words, the rotation detection circuit 108 determines whether or not the induced voltage signal VRs exceeding a predetermined reference voltage Vcomp is detected in the section T1b. That is, first, as described with reference to FIGS. 12 and 13, the rotation detection circuit 108 detects the induced voltage signal VRs while allowing the induced current Ik to flow in the same direction as the drive current i. The control circuit 103 determines whether or not the rotation detection circuit 108 detects the induced voltage signal VRs exceeding the reference voltage Vcomp (step S505).

In process step S505, in a case where it is determined that the induced signal VRs exceeding the reference voltage Vcomp is not detected, in subsequent sections, as shown in FIG. 12, the control circuit 103 controls the rotation detection circuit 108 to determine whether or not an induced voltage signal VRs exceeding the reference voltage Vcomp is detected while retaining the detection direction of the induced current Ik without change. The detection section determination circuit 109 determines whether or not the rotation detection circuit 108 detects the induced voltage signal VRs exceeding the reference voltage Vcomp in the section T2.

The control circuit 103 determines whether or not the induced voltage signal VRs exceeding the reference voltage Vcomp is detected in the section T2 (step S506). In a case where it is determined that the induced voltage signal VRs exceeding the reference voltage Vcomp is not detected in the section T2, the control circuit 103 carries out the process of process steps S508 to S511, and returns to process step S502.

In process step S506, in a case where it is determined that the induced voltage signal VRs exceeding the reference voltage Vcomp is detected in the section T2, the control circuit 103 carries out the process of process step S530 to S534, and returns to process step S502.

On the other hand, in process step S505, in a case where it is determined that the rotation detection circuit 108 detects the induced voltage signal VRs exceeding the reference voltage Vcomp, as described with reference to FIG. 13, the control circuit 103 carries out control in order for the rotation detection circuit 108 to carry out rotation detection after changing the detection direction of the induced current Ik (in other words, induced voltage signal VRs) to the opposite direction (setting to Rs-R) (step S522).

As described with reference to FIG. 13, in the sections T2R and T3R, the rotation detection circuit 108 detects whether or not the induced voltage signal VRs exceeding the reference voltage Vcomp is present after changing the detection direction of the induced current Ik to the opposite direction by changing the detection resistors 301 and 302. The detection section determination circuit 109 determines whether or not the induced voltage signal VRs, which is detected by the rotation detection circuit 108 and exceeds the reference voltage Vcomp, belongs to the sections T2R or T3R, and outputs a pattern of the induced voltage signal VRs to the control circuit 103.

That is, in a case where it is determined that the induced voltage signal VRs detected in the section T1b exceeds the reference voltage Vcomp, the control circuit 103 determines whether or not the induced voltage signal VRs exceeding the reference voltage Vcomp is detected in the section T2R (step S525).

In process step S525, when it is determined that another induced voltage signal VRs exceeding the reference voltage Vcomp is not detected in the section T2R, the control circuit 103 determines whether or not the induced voltage signal VRs exceeding the reference voltage Vcomp is detected in the section T3R (step S526).

In process step S526, in a case where it is determined that the induced voltage signal VRs exceeding the reference voltage Vcomp is not detected in the section T3R, the control circuit 103 carries out the process of process steps S508 to S511, and then returns to process step S502. In a case where it is determined that the induced voltage signal VRs exceeding the reference voltage Vcomp is detected in the section T3R, the control circuit 103 carries out the process of process step S509 to S511, and then returns to process step S502.

In process step S525, in a case where it is determined that the induced voltage signal VRs exceeding the reference voltage Vcomp is detected in the section T2R, the control circuit 103 transitions to process step S531.

As described above, the stepping motor control circuit according to the second embodiment of the invention includes; a rotation detection unit that detects an induced current flowing through a drive coil due to free vibration of a stepping motor in a detection section divided into a plurality of sections, and detects a rotation state of the stepping motor on the basis of a pattern indicating whether or not an induced current exceeding a predetermined reference value is detected in each of the sections by using a phenomenon in which a detection time of the induced current is delayed along with a relative load increase with respect to drive energy, and a level of the induced current decreases; and a control unit that selects a drive pulse corresponding to the rotation state that is detected by the rotation detection unit among a plurality of kinds of drive pulses, each having different energy, and supplies a drive current to the drive coil by the selected drive pulse to rotatably drive the stepping motor. The rotation detection unit includes first and second detection elements that detect induced currents flowing through the drive coil due to free vibration of the stepping motor in directions opposite to each other, and is configured to detect the induced current in the detection section by alternately repeating a first closed circuit including the drive coil of the stepping motor and the detection elements, and a second closed circuit constituted by the drive coil and a low-impedance element. In a first section T1b that is an initial section of the detection section, the rotation detection unit carries out the detection by selecting a detection element to be used in sections after the first section on the basis of detection results of the induced current using the first and second detection elements, and detects the rotation state of the stepping motor by a pattern based on the induced current detected in each of the sections.

Here, the detection section is divided into the first section T1b after driving with the drive pulse, a second section T2R after the first section T1b, and a third section T3R after the second section T2R, and in a state in which the stepping motor 107 is driven while retaining a rank of the main drive pulse P1, the first section T1b is a section in which a first forward rotation state of the rotor 202 in a second quadrant II of a space centering around the rotor 202 of the stepping motor 107 is determined, the second section T2R is a section in which a first forward rotation state of the rotor 202 in a third quadrant III is determined, and the third section T3R is a section in which a first backward rotation state of the rotor 202 in the third quadrant III is determined. The rotation detection unit may be configured as follows. In a case where an induced current Ik, which exceeds a predetermined value, in a direction opposite to the direction of the drive current i is detected, the rotation detection unit carries out the detection of an induced current Ik in the same direction as the drive current i after the second section T2R, and carries out determination of a rotation state.

In addition, the rotation detection unit may be configured as follows. In a case where an induced current Ik, which exceeds a predetermined value, in a direction opposite to the direction of the drive current i is detected, the rotation detection unit carries out the detection of the induced current Ik in a fourth section T2 obtained by unifying the second section T2R and the third section T3R, and carries out determination of the rotation state on the basis of a pattern of induced currents Ik detected in the first section T1b and the fourth section T2.

In addition, the detection section T is divided into the first section T1b after driving with the drive pulse, a second section T2R after the first section T1b, and a third section T3R after the second section T2R, and in a state in which the stepping motor is driven while retaining a rank of the drive pulse, the first section T1b is a section in which a first forward rotation state of the rotor 202 in a second quadrant II of a space centering around the rotor 202 of the stepping motor 107 is determined, the second section T2R is a section in which a first forward rotation state of the rotor 202 in a third quadrant III is determined, and the third section T3R is a section in which a first backward rotation state of the rotor 202 in the third quadrant III is determined. The rotation detection unit may be configured as follows. In a case where an induced current Ik, which exceeds a predetermined value, in the same direction as the drive current i is detected, the rotation detection unit carries out the detection of an induced current Ik in a direction opposite to the direction of the drive current i after the second section T2R to determine a rotation state.

In addition, the rotation detection unit may be configured as follows. In a case where an induced current Ik, which exceeds a predetermined value, in the same direction as the drive current i is detected, the rotation detection unit carries out determination of the rotation state on the basis of a pattern of induced currents Ik detected in the first to third sections T1b to T3R.

As described above, in the second embodiment of the invention, an appropriate direction of a rotation detection current is selected using the induced signals VRs from the OUT1 and OUT2, each having different polarity, in the section T1b to reduce a variation in drive remaining power (magnitude of a load with respect to drive energy), thereby realizing rotation determination with high accuracy.

Accordingly, the same effect as the first embodiment may be obtained. In addition, since detection is carried out in the region b at which the speed of the rotor becomes the maximum after blocking the drive pulse P1, a stable induced signal VRs may be obtained in a level higher than the case of carrying out detection in the region c, and it is not likely to be affected by the load variation. Accordingly, stable detection performance may be obtained.

In addition, the rotation detection immediately after blocking the drive pulse P1 is carried out, and thus it is not likely to be affected by the load variation, and it is possible to realize improvement in accuracy of a control operation of determining a drive margin on the basis of time at which the induced signal VRs exceeding a predetermined level is generated. Accordingly, there is an effect of reducing useless power consumption.

Next, a third embodiment of the invention will be described.

In the first embodiment of the invention, the rotation state is determined by detecting the induced signal VRs of one polarity in the first section T1 with a fixed time width, and the direction of the induced current Ik is selected on the basis of the determination result to carry out rotation detection. However, in the third embodiment of the invention, the rotation state is determined by detecting the induced signal VRs of one polarity in the first section with a variable time width, and the direction of the induced current Ik is selected on the basis of the determination result to carry out the rotation detection. In addition, similarly to the first embodiment, as the reference voltage, two kinds of reference voltages Vinv and Vcomp are used.

According to this, even when drive energy with respect to a load is relatively decreased, rotation detection in the region b not the region c is reliably carried out by accurately grasping a rotation state, whereby accurate rotation detection may be realized.

FIG. 15 shows a timing chart in a case of driving the stepping motor 107 with the main drive pulse P1 in the third embodiment of the invention. FIG. 15 illustrates a state during normal driving (during a hand movement operation of time indicating hands 114 to 116 by the main drive pulse P1 in a state in which a power supply voltage of the analog electronic timepiece is a rated voltage).

A predetermined period after termination of driving with the main drive pulse P1 is set as a detection section T in which a rotation state is detected, and the detection section T is divided into a plurality of continuous sections. In a case of detecting an induced current Ik flowing in the same direction as the drive current i flowing through the drive coil 209 during driving with the main drive pulse P1, three sections including a fifth section T1a, a sixth section T1b, and a fourth section T2 are used. In addition, in a case of detecting an induced current Ik flowing in a direction opposite to that of the drive current i flowing through the drive coil 209 during driving with the main drive pulse P1, four sections including the fifth section T1a, the sixth section T1b, and a second section T2R, and a third section T3R are used.

The time width of the section T1a is fixed to a constant value. The time width of the section T1b varies in response to the induced signal VRs that is detected, but the longest time width is set to a predetermined value. The time width of the section T3R is fixed to a predetermined width. In addition, the sum of the time width of the section T1b, the time width of the section T2R, and the time width of the third section T3R is configured to be equal to the time width of the section T2. The section T1a and the section T1b constitute the section T1. The time width of the detection section T is configured not to vary. In addition, in the third embodiment, the mask section is not provided.

When the XY coordinate space centering around the rotor 202, in which the magnetic pole axis A of the rotor 202 is located by the rotation of the rotor 202, is divided into a first quadrant I to a fourth quadrant IV, the sections T1, T1a, T1b, T2, T2R, and T3R may be expressed as follows.

For example, in a large-load-increment driving (small-margin rotation) state in which the rank of the main drive pulse P1 is retained without being changed, the sections T1a and T1b are sections in which a rotation state of the rotor 202 in a first forward region a in the second quadrant II is determined, the section T2R is a section in which the rotation state of the rotor 202 in the first forward region a in the second quadrant II, and a rotation state of the rotor 202 in a first forward region b in the third quadrant III are determined, and the section T3R is a section in which the rotation state of the rotor 202 in a first forward region b in the third quadrant III, and a rotation state of the rotor 202 in a first backward region c in the third quadrant III are determined.

In addition, in a small-load-increment driving (represents maximum-margin rotation, and the section T1b is not used in the driving) in which the rank of the main drive pulse P1 is pulsed down, the section T1a is a section in which the rotation state of the rotor 202 in the first forward region b in the third quadrant III is determined, and the section T2 is a section in which the rotation state of the rotor 202 in the first forward region b in the third quadrant III, and a rotation state of the rotor 202 in a section after the first backward region c in the third quadrant III are determined.

Similarly to the first embodiment, as the reference voltage for detecting the induced voltage signal VRs, two kinds of predetermined reference voltages Vinv and Vcomp are used. A case in which an induced voltage signal VRs exceeding a first reference voltage Vinv is detected is equivalent to a case in which the induced current Ik exceeding the first reference value is detected. In addition, a case in which an induced voltage signal VRs exceeding a second reference voltage Vcomp is detected is equivalent to a case in which an induced current Ik exceeding the second reference value is detected. The second reference value is larger than the first reference value, and the second reference voltage Vcomp is set to a value larger than that of the first reference voltage Vinv. The first reference voltage Vinv is a reference of determining a degree of margin of drive energy, and is a reference voltage at the time of carrying out rotation detection on the basis of an induced current Ik of polarity opposite to that of the drive current i. The second reference voltage Vcomp is a reference voltage at the time of carrying out the rotation detection on the basis of the induced current Ik of the same polarity as the drive current i.

In the sections T1a and T1b, rotation determination is carried out by the reference voltage Vinv, and the detection direction and the reference voltage are selected in response to the detection result to carry out rotation detection.

For example, in a case where a plurality of induced signals VRs do not exceed the reference voltage Vinv in the section T1a, an induced signal VRs corresponding to the induced current Ik in the same current direction as the drive current i of the main drive pulse P1 is detected, and determination is carried out using high reference voltage Vcomp to reliably carry out the determination of non-rotation. That is, rotation detection in the section T2 is carried out. In this case, in the example of FIG. 15, it enters a maximum-margin rotation state, the main drive pulse P1 is pulsed down.

In a case where a plurality of induced signals VRs exceeding the reference voltage Vinv are detected in the section T1a, detection continues until an induced signal VRs less than the reference voltage Vinv is generated. In a case where a plurality of induced signals VRs exceed the reference voltage Vinv in the section T1a, and then an induced signal VRs do not exceed the reference voltage Vinv in the section T1a, or in a case where an induced signal VRs does not exceed the reference voltage Vinv in the section T1b, at a point of time at which the section T1a is terminated or a point of time at which the induced signal VRs does not exceed the reference voltage Vinv, rotation detection is changed to rotation detection by the induced current Ik in a direction opposite to that of the drive current i of the main drive pulse P1, and rotation detection is carried out using the reference voltage Vinv. That is, rotation detection in the sections T2R and T3R is carried out. In this case, in the example of FIG. 15, it enters an intermediate-margin rotation state, and the main drive pulse P1 is pulsed down.

In the case where a plurality of induced signals VRs exceeding the reference voltage Vinv are detected in the section T1a, when an induced signals VRs exceeds the reference voltage Vinv in the entire region of the section T1a, and an induced signal VRs exceeds the reference voltage Vinv even in the section T1b, detection is carried out until an induced signal VRs less than the reference voltage Vinv is generated in the section T1b. In a case where the induced signal VRs less than the reference voltage Vinv is generated in the section T1b, at that point of time, rotation detection may be changed to rotation detection by the induced current Ik in a direction opposite to that of the drive current i of the main drive pulse P1 by using the reference voltage Vinv. That is, rotation detection in the section T2R and the section T3R is carried out. In this case, in the example of FIG. 15, it enters a small-margin rotation state, and the main drive pulse P1 is retained.

In a case where a plurality of induced signals VRs exceeding the reference voltage Vinv are detected in the section T1a, when an induced signals VRs exceeds the reference voltage Vinv in the entire region of the section T1a, and an induced signal VRs exceeds the reference voltage Vinv in the entire region of the section T1b, at a point of time at which the maximum width of the section T1b is terminated, rotation detection may be changed to rotation detection by the induced current Ik in a direction opposite to that of the drive current i of the main drive pulse P1 by using the voltage Vinv. That is, rotation detection in the section T2R and the section T3R is carried out. In this case, in the example of FIG. 15, it enters a small-margin rotation state, and the main drive pulse P1 is pulsed up. In addition, the maximum width of the section T1b is set to a predetermined width as a seventh section. In addition, the maximum length of the sum of the time width of the section T1a and the time width of the section T1b is set to be ½ or less times the detection section T.

FIG. 16 shows a determination chart in which pulse control operations in the third embodiment of the invention are arranged.

The sections T1a, T1b, and T2 are sections in which detection is carried out when the drive current i and the induced current Ik flow in the same direction, and the section T2R and T3R are sections in which the induced current Ik is detected by setting the detection direction to a direction opposite to that of the section T2.

The rotation detection circuit 108 detects whether or not the induced voltage signal VRs exceeding the reference voltage Vcomp is present, and the detection section determination circuit 109 determines the pattern (representing the degree of margin of the energy of the main drive pulse P1) of the induced voltage signal VRs, and the control circuit 103 carries out the following pulse control such as pulse-up or pulse-down of the main drive pulse P1, and driving with the correction drive pulse P2 on the basis of the pattern with reference to the determination chart of FIG. 16 which is stored inside the control circuit 103, thereby rotatably controlling the stepping motor 107.

Figure 17:
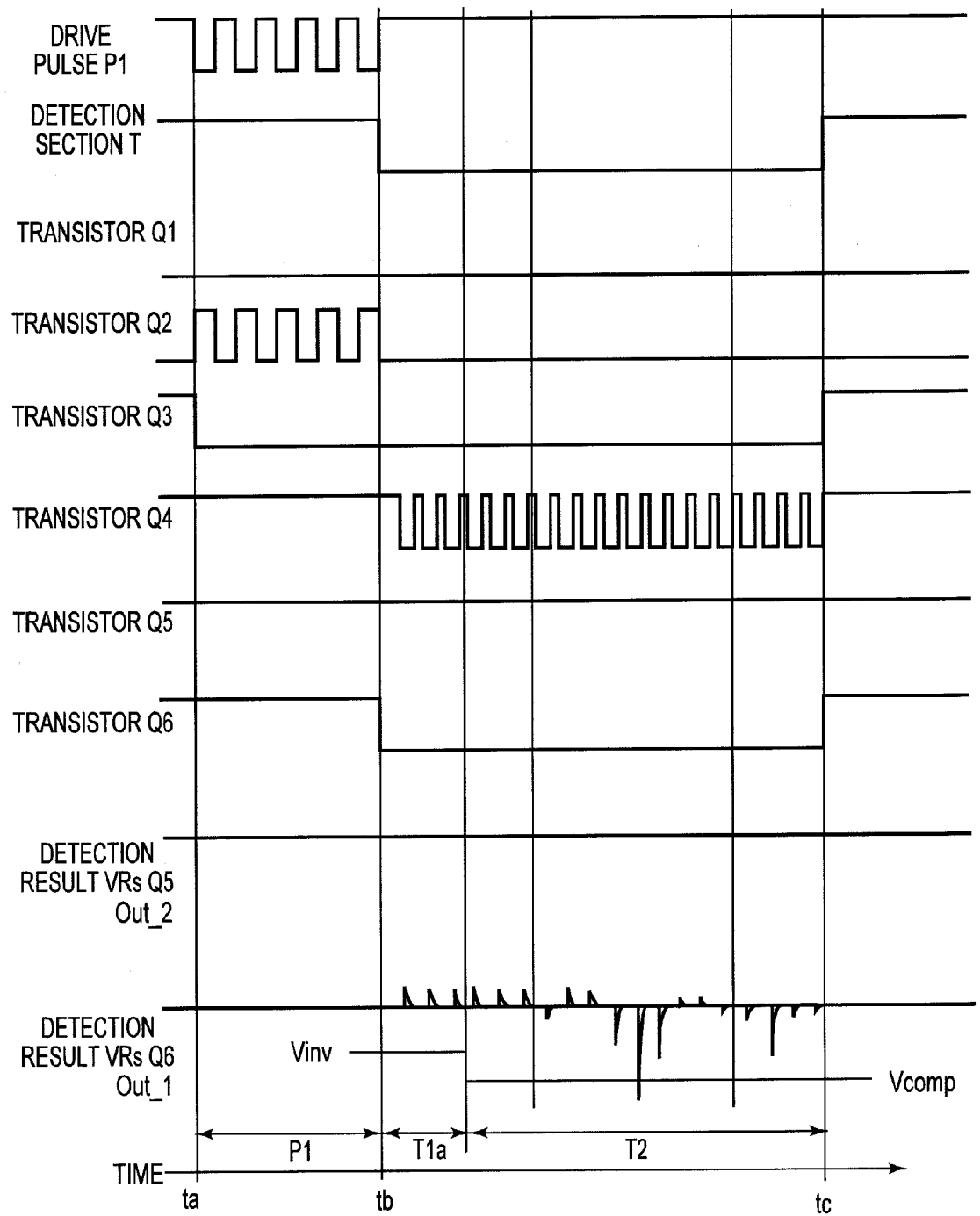
FIG. 17 is a timing chart of the stepping motor control circuit, the movement, and the analog electronic timepiece according to the third embodiment of the invention.

FIG. 17 shows a timing chart of the third embodiment of the invention in a case where detection is carried out without changing the detection direction of the induced current Ik. FIG. 17 shows a timing chart in a small-load-increment driving (maximum-margin rotation) state, and illustrates a timing when detection is carried out in a state in which the induced current Ik flows in the same direction as the drive current i. In this case, the rotation state is determined by a pattern of a determination value of the induced signal VRs in the section T1a and the section T2.

In a case where the stepping motor 107 is rotatably driven, in a drive period P1 between times ta and tb, the switch control circuit 303 repetitively switches the transistor Q2 between an ON-state (supply state) and an OFF-state (supply stop state) at a predetermined cycle while maintaining the transistor Q3 in an ON-state to generate a comb-like main drive pulse P1, and supplies the drive current i in an arrow direction of FIG. 5 to the drive coil 209 of the stepping motor 107. According to this, in a case where the stepping motor 107 rotates, the rotor 202 rotates in a forward direction by 180°.

On the other hand, detection of a rotation state is carried out in a detection section T from the termination time tb of the drive period P1 of the main drive pulse P1 to time tc.

That is, in the section T1a starting from the time tb, the switch control circuit 303 switches the transistor Q4 between an ON-state and an OFF-state at a predetermined cycle while maintaining the transistors Q3 and Q6 in an ON-state to allow the induced current Ik to flow to the detection resistor 302 in the same direction as the drive current i. According to this, the induced voltage signal VRs is generated in the detection resistor 302.

The comparator 304 compares the induced voltage signal VRs and the second reference voltage Vcomp. When the induced voltage signal VRs exceeds the second reference voltage Vcomp, the comparator 304 outputs "1" to detection section determination circuit 109 as the detection signal Vs. When the induced voltage signal VRs does not exceed the second reference voltage Vcomp, the comparator 304 outputs "0" to the detection section determination circuit 109 as the detection signal Vs.

In addition, when the induced voltage signal VRs exceeds the first reference voltage Vinv, the inverter 305 outputs "0", and when the induced voltage signal VRs does not exceed the first reference voltage Vinv, the inverter 305 outputs "1". The NAND circuit 307 outputs an inverted signal "1" or "0" to the detection section determination circuit 109 as the detection signal Vs.

The detection section determination circuit 109 determines whether or not a plurality of induced voltage signals VRs exceeding a predetermined reference voltage (in this embodiment, at least two induced voltage signals VRs exceeding the first reference voltage Vinv) are detected in the section T1a on the basis of detection signals Vs transmitted from the comparator 304 and the NAND circuit 307.

In an example of FIG. 17, since a plurality of the induced voltage signals VRs exceeding the predetermined reference voltage Vinv are not detected in the section T1a, the switch control circuit 303 of the rotation detection circuit 108 carries out a detection operation without changing a flow direction of the induced current Ik even in the section T2. Accordingly, even in the section T2, each transistor is drive-controlled to carry out the same operation as described above.

In this case, in the section T2, a determination value of the induced voltage signal VRs, which is obtained by carrying out determination using the second reference voltage Vcomp without using the first reference voltage Vinv, is only used. That is, although the detection signal Vs is input to the detection section determination circuit 109 from both of the NAND circuit 307 and the comparator 304, in the section T2, the detection section determination circuit 109 carries out determination only on whether or not the detection signal Vs input from the comparator 304 belongs to the section T2. According to this, even in a non-rotation state in which a plurality of induced voltage signals VRs exceeding the predetermined reference voltage Vinv are not detected in the section T1a, determination is carried out using the second reference voltage Vcomp with a high level, and thus there is no concern of false determination between the non-rotation and rotation, and determination of the rotation state may be carried out more accurately. In addition, since the detection direction of the induced current Ik is not changed, the detection operation becomes simple.

As a determination result, the detection section determination circuit 109 outputs a pattern (a determination value in the section T1a, a determination value in the section T1b, and a determination value in the section T2) of the induced voltage signal VRs to the control circuit 103.

The control circuit 103 determines the rotation state of the stepping motor 107 with reference to the determination chart of FIG. 16 on the basis of the pattern output from the detection section determination circuit 109, and carries out pulse control such as pulse-up.

In a case where a plurality of induced voltage signals VRs exceeding the predetermined reference voltage Vinv are not detected in the section T1a even in a next cycle after the cycle shown in FIG. 17 is terminated, each of the transistors Q1 to Q6 is drive-controlled to carry out the same operation. That is, the transistor Q4 enters an ON-state in place of the transistor Q3, and the transistor Q1 is switched in place of the transistor Q2 at the same cycle as the transistor Q2, and thus driving with a comb-like main drive pulse P1 having polarity reversed to the previous cycle is carried out. In addition, in the detection section T, the transistor Q3 is switched in place of the transistor Q4 at the same cycle as the transistor Q4, and the transistors Q4 and Q5 are driven to an ON-state in place of the transistors Q3 and Q6. According to this, rotation detection based on the induced current Ik is carried out.

The induced voltage signal VRs, which is generated due to rotation of the stepping motor 107, is generated in the detection resistor 301, and the comparator 304 outputs a result obtained by comparing the induced voltage signal VRs and the second reference voltage Vcomp to the detection section determination circuit 109 as the detection signal Vs. In addition, the inverter 306 compares the induced voltage signal VRs and the first reference voltage Vinv, and outputs "1" or "0" in response to the comparison result. The NAND circuit 307 outputs an inverted signal "0" or "1" to the detection section determination circuit 109 as the detection signal Vs.

In a case where a plurality of induced voltage signals VRs exceeding the predetermined reference voltage Vinv are not detected in the section T1a, the same operation as described above is carried out, and in the section T2, similarly to the previous cycle, the detection section determination circuit 109 carries out section determination only with respect to the detection signal Vs transmitted from the comparator 304.

The detection section determination circuit 109 outputs a pattern (a determination value in the section T1a, a determination value in the section T1b, and a determination value in the section T2) of the induced voltage signal VRs to the control circuit 103.

The control circuit 103 determines the rotation state of the stepping motor 107 on the basis of the pattern output from the detection section determination circuit 109, and carries out pulse control such as pulse-up.

In a case where a plurality of induced voltage signals VRs exceeding the predetermined reference voltage Vinv are not detected in the section T1a, rotation control of the stepping motor 107 is carried out by alternately repeating the above-described two cycles. In addition, in the case of non-rotation, driving with the correction drive pulse P2 is carried out, but in this case, the rotation detection operation is not carried out.

Figure 18:
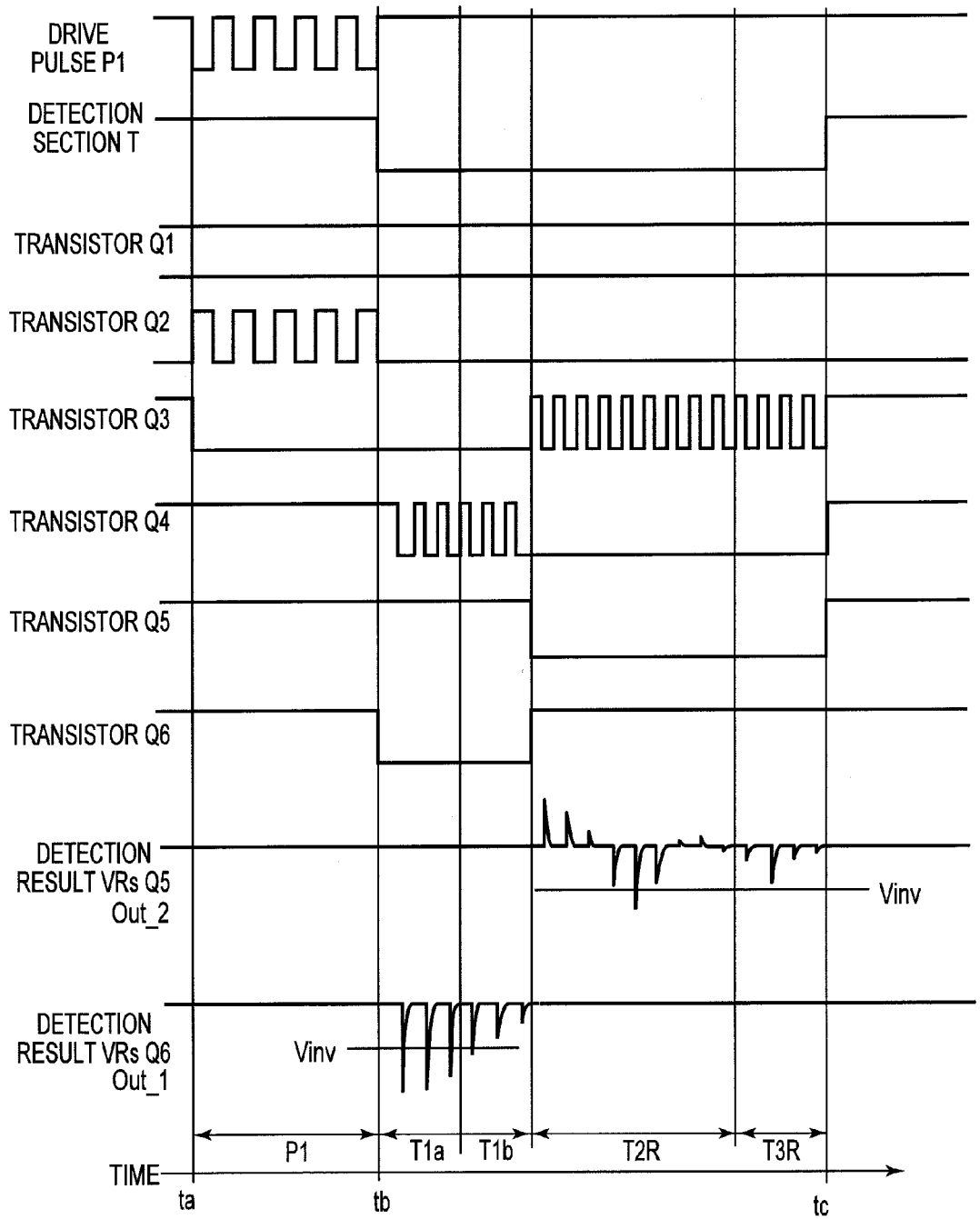
FIG. 18 is a timing chart of the stepping motor control circuit, the movement, and the analog electronic timepiece according to the third embodiment of the invention.

FIG. 18 shows a timing chart of the third embodiment of the invention in a case where detection is carried out by changing the detection direction of the induced current Ik. FIG. 18 illustrates a timing in a large-load-increment driving (small-margin rotation) state. In FIG. 18, to carry out detection by changing the detection direction of the induced current Ik to an opposite direction in the sections T2R and T3R, detection is carried out by inverting the polarity of the induced voltage signal VRs. According to this, the detection of the induced voltage signal VRs is configured to be carried out in the region b earlier in time instead of the region c later in time as shown in FIG. 17 so as to carry out the rotation detection with relatively high accuracy even when rotation is slow.

In a case where the stepping motor 107 is rotatably driven, in a drive period P1 between times ta and tb, the switch control circuit 303 repetitively switches the transistor Q2 between an ON-state (supply state) and an OFF-state (supply stop state) at a predetermined cycle while maintaining the transistor Q3 in an ON-state to supply the drive current i in an arrow direction of FIG. 5 to the drive coil 209 of the stepping motor 107 with the comb-like main drive pulse P1. According to this, in a case where the stepping motor 107 rotates, the rotor 202 rotates in a forward direction by 180°.

On the other hand, detection of a rotation state is carried out in a detection section T from the termination time tb of the drive period P1 of the main drive pulse P1 to time tc.

That is, in the section T1a starting from the time tb, the switch control circuit 303 switches the transistor Q4 between an ON-state and an OFF-state at a predetermined cycle while maintaining the transistors Q3 and Q6 in an ON-state to allow the induced current Ik to flow to the detection resistor 302 in the same direction as the drive current i. According to this, the induced voltage signal VRs is generated in the detection resistor 302.

The comparator 304 compares the induced voltage signal VRs and the second reference voltage Vcomp. When the induced voltage signal VRs exceeds the second reference voltage Vcomp, the comparator 304 outputs "1" to the detection section determination circuit 109 as the detection signal Vs. When the induced voltage signal VRs does not exceed the second reference voltage Vcomp, the comparator 304 outputs "0" to the detection section determination circuit 109 as the detection signal Vs.

In addition, when the induced voltage signal VRs exceeds the first reference voltage Vinv, the inverter 305 outputs "0", and when the induced voltage signal VRs does not exceed the first reference voltage Vinv, the inverter 305 outputs "1". The NAND circuit 307 outputs an inverted signal "1" or "0" to the detection section determination circuit 109 as the detection signal Vs.

The detection section determination circuit 109 determines whether or not a plurality of induced voltage signals VRs exceeding a predetermined reference voltage (in this embodiment, at least two induced voltage signals VRs exceeding the first reference voltage Vinv) are detected in the section T1a on the basis of detection signals Vs transmitted from the comparator 304 and the NAND circuit 307. That is, the detection section determination circuit 109 determines whether or not rotation of the rotor 202 is slower than a predetermined speed in the section T1a.

In an example of FIG. 18, since a plurality of induced voltage signals VRs exceeding the first reference voltage Vinv is detected in the entire region of the section T1a (in a state in which the rotation of the rotor 202 is slow), even in the section T1b that is continuous with the section T1a, the switch control circuit 303 operates to detect the induced current Ik without changing the detection direction of the induced current Ik by using the first reference voltage Vinv. According to this, an induced signal exceeding the reference voltage Vinv is detected in the section T1b.

In the section T1b, when the level of the induced signal VRs becomes equal to or less than the first reference voltage Vinv, from that point of time, in the section T2R and the section T3R, the switch control circuit 303 operates to carry out detection by changing the detection direction of the induced current Ik to a direction opposite to that of the section T1b. In this case, as the reference voltage, the first reference voltage Vinv is used to raise detection sensitivity so as to carry out accurate rotation detection even in a case where rotation is slow.

In the sections T2R and T3R, the switch control circuit 303 switches the transistor Q3 between an ON-state and an OFF-state at a predetermined cycle while maintaining the transistors Q4 and Q5 in an ON-state and the transistor Q6 in an OFF-state so as to allow the induced current Ik to flow through the detection resistor 301. In the detection resistor 301, the induced voltage signal VRs in which the detection direction is opposite to that of the sections T2 and T3 is generated, and thus detection of the induced current Ik in which the detection direction is changed to the opposite direction is carried out. According to this, the detection of the induced voltage signal VRs generated in the region b is carried out.

The comparator 304 compares the induced voltage signal VRs and the second reference voltage Vcomp. In a case where the induced voltage signal VRs exceeds the second reference voltage Vcomp, the comparator 304 outputs "1" to the detection section determination circuit 109 as a detection signal Vs, and in a case where the induced voltage signal VRs does not exceed the second reference voltage Vcomp, the comparator 304 outputs "0" to the detection section determination circuit 109 as the detection signal Vs.

In addition, in a case where the induced voltage signal VRs exceeds the first reference voltage Vinv, the inverter 306 outputs "0", and in a case where the induced voltage signal VRs does not exceed the first reference voltage Vinv, the inverter 306 outputs "1". The NAND circuit 307 outputs an inverted signal "1" or "0" to the detection section determination circuit 109 as the detection signal Vs.

In the sections T2R and T3R, rotation is slow and the level of the induced signal VRs is low, and thus a determination value of the induced voltage signal VRs, which is obtained by carrying out determination using the first reference voltage Vinv without using the second reference voltage Vcomp is only used so as to increase detection sensitivity. That is, although the detection signal Vs is input to the detection section determination circuit 109 from both of the NAND circuit 307 and the comparator 304, in the sections T2R and T3R, the detection section determination circuit 109 carries out determination only on whether or not the detection signal Vs input from the NAND circuit 307 belongs to the section T2R or T3R.

As a determination result, the detection section determination circuit 109 outputs a pattern (a determination value in the section T1a, a determination value in the section T1b, a determination value in the section T2R, and a determination value in the section T3R) of the induced voltage signal VRs to the control circuit 103.

The control circuit 103 determines the rotation state of the stepping motor 107 on the basis of the pattern transmitted from the detection section determination circuit 109, and carries out pulse control such as pulse-up.

As described above, in a case where it is determined that the energy of the main drive pulse P1 with respect to a load is small, and the rotation of the rotor 202 is slow in the section T1a (also including the section T1b in a case of using the section T1b), in sections after the section T1a, detection is carried out after changing the detection direction of the induced current Ik to an opposite direction, and determination of the rotation state is carried out, whereby rotation detection in a stage in which the rotation of the rotor is fast (the rotation region b of the rotor 202) is possible, and thus the rotation state may be detected in a relatively accurate manner. In addition, even in a case where the rotation of the rotor 202 is slow, and the level of the induced voltage signal VRs is low, since a plurality of the induced voltage signals VRs exceeding a predetermined reference voltage (in this embodiment, two induced voltage signals VRs exceeding the first reference voltage Vinv) are detected in the section T1a, stable stopping at a position perpendicular to a line segment connecting the notched portions 204 and 205 is possible in a reliable manner, and the first reference voltage Vinv that is a relatively low reference voltage is used, and thus determination of the rotation state may be carried out in a relatively accurate manner.

In a case where a plurality of induced voltage signals VRs exceeding a plurality of predetermined reference voltages Vinv and Vcomp are detected in the section T1a even in a next cycle after the cycle shown in FIG. 18 is terminated, each of the transistors Q1 to Q6 is drive-controlled to carry out the same operation as described above. That is, the transistor Q4 enters an ON-state in place of the transistor Q3, and the transistor Q1 is switched in place of the transistor Q2 at the same cycle as the transistor Q2, and thus driving with a comb-like main drive pulse P1 having polarity reversed to the previous cycle is carried out.

In the section T1a of the detection section T, the transistor Q3 is switched in place of the transistor Q4 at the same cycle as the transistor Q4, and the transistors Q4 and Q5 are driven to an ON-state in place of the transistors Q3 and Q6. According to this, the induced current Ik flows to the detection resistor 301 in the same direction as the drive current i, and thus the induced voltage signal VRs is generated in the detection resistor 301. According to this, rotation detection based on the induced current Ik flowing in the same direction as the drive current i is carried out.

In addition, in the sections T2R and T3R, the transistor Q4 is switched between an ON-state and an OFF-state in place of the transistor Q3 at a predetermined cycle while maintaining the transistors Q3 and Q6 in an ON-state in place of the transistors Q4 and Q5, the induced current Ik is allowed to flow to the detection resistor 302. The induced voltage signal VRs is generated in the detection resistor 302. According to this, detection of the induced current Ik in which the detection direction is changed to an opposite direction is carried out.

Similarly to the previous cycle, with regard to the induced voltage signal VRs generated due to rotation of the stepping motor 107, in the section T1*a*, a determination value may be obtained on the basis of the first reference voltage Vinv, and in the sections T2R and T3R, the determination value may be obtained only on the basis of the first reference voltage Vinv.

As a determination result, the detection section determination circuit 109 outputs a pattern (a determination value in the section T1*a*, a determination value in the section T1*b*, a determination value in the section T2, and a determination value in the section T3) of the induced voltage signal VRs to the control circuit 103.

Figure 19:
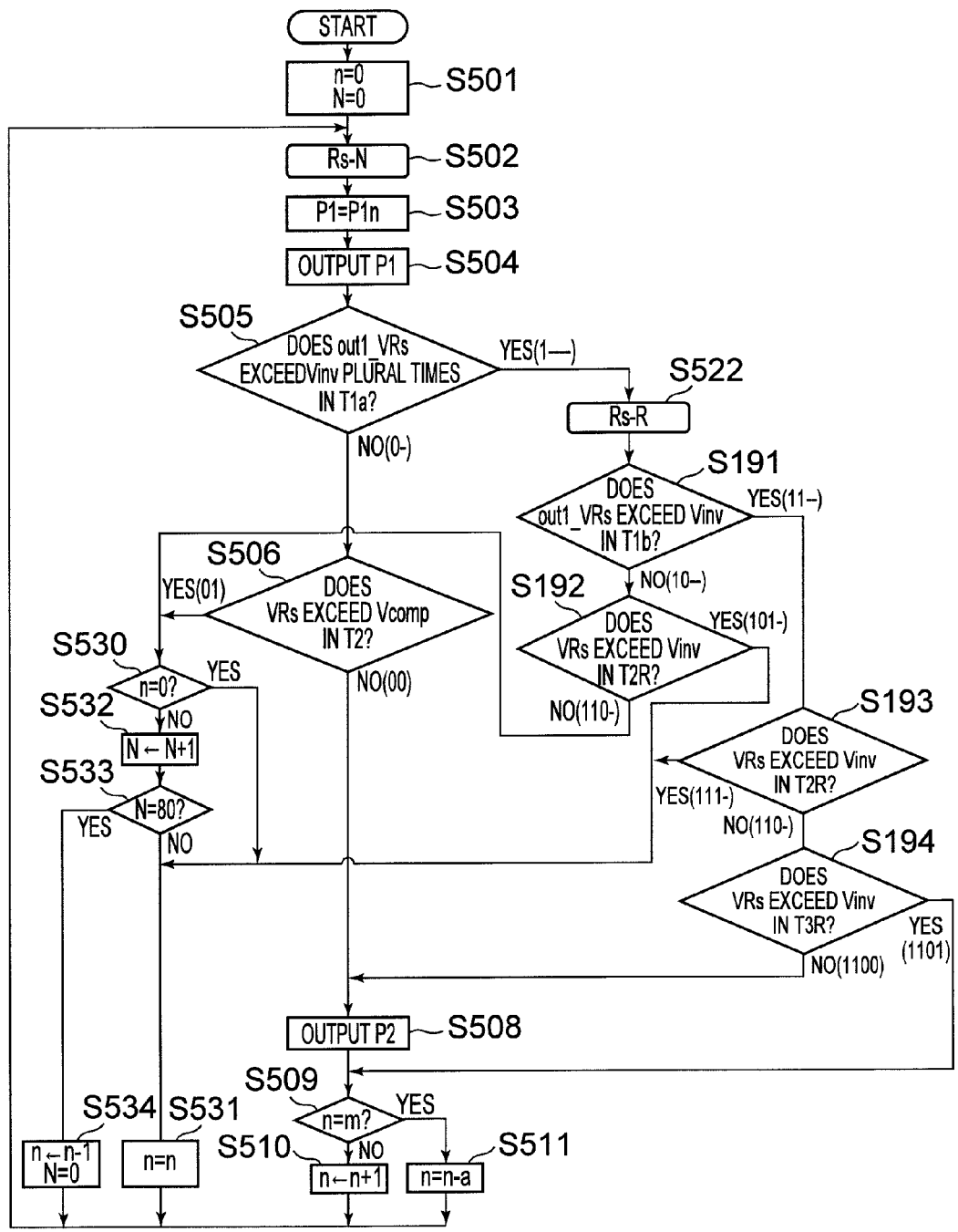
FIG. 19 is a flowchart of the stepping motor control circuit, the movement, and the analog electronic timepiece according to the third embodiment of the invention.

FIG. 19 shows a flowchart illustrating the operation of the stepping motor control circuit, the movement, and the analog electronic timepiece according to the third embodiment of the invention. The flowchart mainly illustrates a process of the control circuit 103. The same reference numerals are given to portions in which a process of the same content as FIG. 8 is carried out.

Hereinafter, an operation of the third embodiment of the invention will be described in detail with reference to FIGS. 1, 2, 5, and 15 to 19.

The control circuit 103 carries out a time counting operation by counting the timepiece signal transmitted from the frequency dividing circuit 102, and first of all, resets an energy rank n of the main drive pulse P1*n*, and a counted value N indicating the number of times of continuous driving with the same main drive pulse P1 to 0 (step S501 in FIG. 19).

The control circuit 103 carries out initial setting to allow the rotation detection circuit 108 to carry out rotation detection on the basis of the induced current Ik (in other words, the induced voltage signal VRs) flowing in the same direction as the drive current i (setting to Rs-N) (step S502).

Next, the control circuit 103 outputs a main drive pulse control signal so as to rotatably drive the stepping motor 107 with a main drive pulse P10 having the minimum energy which is set in process step S501 (steps S503 and S504).

The main drive pulse generation circuit 104 outputs the main drive pulse P10 corresponding to the control signal to the motor driver circuit 106 in response to the control signal output from the control circuit 103. The motor driver circuit 106 rotatably drives the stepping motor 107 with the main drive pulse P10.

The rotation detection circuit 108 detects whether or not the induced current Ik that flows in the same direction as the drive current i and exceeds a predetermined reference value is present. In other words, the rotation detection circuit 108 determines whether or not a plurality of induced voltage signals VRs exceeding a predetermined reference voltage Vinv is detected in the section T1*a*. That is, first, as described with reference to FIGS. 17 and 18, the rotation detection circuit 108 detects the induced voltage signal VRs while allowing the induced current Ik to flow in the same direction as the drive current i. The control circuit 103 determines whether or not the rotation detection circuit 108 detects the plurality of induced voltage signals VRs exceeding the reference voltage Vinv (step S505).

In process step S505, in a case where it is determined that the plurality of induced signals VRs exceeding the reference voltage Vinv are not detected, in the subsequent section T2, as shown in FIG. 17, the control circuit 103 controls the rotation detection circuit 108 to determine whether or not an induced voltage signal VRs exceeding the reference voltage Vcomp is detected while retaining the detection direction of the induced current Ik without change. In addition, the detection section determination circuit 109 determines whether or not the rotation detection circuit 108 detects the induced voltage signal VRs exceeding the reference voltage Vcomp in the section T2.

The control circuit 103 determines whether or not the induced voltage signal VRs exceeding the reference voltage Vcomp is detected in the section T2 (step S506). In a case where it is determined that the induced voltage signal VRs exceeding the reference voltage Vcomp is not detected in the section T2, the control circuit 103 carries out the process of process steps S508 to S511, and returns to process step S502.

In process step S506, in a case where it is determined that the induced voltage signal VRs exceeding the reference voltage Vcomp is detected in the section T2, the control circuit 103 carries out the process of process steps S530 to S534, and returns to process step S502.

On the other hand, in process step S505, in a case where it is determined that the rotation detection circuit 108 detects the induced voltage signal VRs exceeding the reference voltage Vinv, as described with reference to FIG. 18, the control circuit 103 carries out control in order for the rotation detection circuit 108 to carry out rotation detection in the sections T2R and T3R after changing the detection direction of the induced current Ik (in other words, induced voltage signal VRs) to the opposite direction (setting to Rs-R) (step S522).

In the section T1*b*, the rotation detection circuit 108 detects whether or not the induced current Ik flowing in the same direction as the drive current i is present, that is, whether or not the induced voltage signal VRs exceeding the reference voltage Vinv is present, and the detection section determination circuit 109 determines whether or not the induced voltage signal VRs, which is detected by the rotation detection circuit 108 and exceeds the reference voltage Vinv, is included in the section T1*b*.

The control circuit 103 determines whether or not the rotation detection circuit 108 detects the induced voltage signal VRs exceeding the reference voltage Vinv (step S191).

In process step S191, in a case where it is determined that the induced voltage signal VRs exceeding the reference voltage Vinv is not detected in the section T1*b* (step S191), the control circuit 103 determines whether or not the rotation detection circuit 108 detects the induced voltage signal VRs exceeding the reference voltage Vinv in the section T2R (step S192).

In process step S192, in a case where it is determined that the induced voltage signal VRs exceeding the reference voltage Vinv is not detected by the rotation detection circuit 108 in the section T2R, the control circuit 103 transitions to process step S530.

In process step S192, in a case where it is determined that the induced voltage signal VRs exceeding the reference voltage Vinv is detected by the detection circuit 108 in the section T2R, the control circuit 103 transitions to process step S531.

In process step S191, in a case where it is determined that the induced voltage signal VRs, exceeding the reference voltage Vinv is detected in the section T1*b*, the control circuit 103 determines whether or not the induced voltage signal VRs exceeding the reference voltage Vinv is detected in the section T2R (step S193).

In process step S193, in a case where it is determined that the induced voltage signal VRs exceeding the reference voltage Vinv is detected in the section T1*b*, the control circuit 103 transitions to process step S531.

In process step S193, in a case where it is determined that the induced voltage signal VRs exceeding the reference voltage Vinv is not detected in the section T1*b*, in process step S194, the control circuit 103 determines whether or not the induced voltage signal VRs exceeding the reference voltage Vinv is detected in the section T3R (step S194).

In process step S194, in a case where it is determined that the induced voltage signal VRs exceeding the reference voltage Vinv is not detected in the section T3R, the control circuit 103 transitions to the process step S508 (step S194).

In process step S194, in a case where it is determined that the induced voltage signal VRs exceeding the reference voltage Vinv is detected in the section T3R, the control circuit 103 transitions to the process step S509.

As described above, the stepping motor control circuit according to the third embodiment of the invention includes: a rotation detection unit that detects an induced current flowing through a drive coil due to free vibration of a stepping motor in a detection section divided into a plurality of sections, and detects a rotation state of the stepping motor on the basis of a pattern indicating whether or not an induced current exceeding a predetermined reference value is detected in each of the sections by using a phenomenon in which a detection time of the induced current is delayed along with a relative load increase with respect to drive energy, and a level of the induced current decreases; and a control unit that selects a drive pulse corresponding to the rotation state that is detected by the rotation detection unit among a plurality of kinds of drive pulses, each having different energy, and supplies a drive current to the drive coil by the selected drive pulse to rotatably drive the stepping motor.

The rotation detection unit is configured to carry out the detection by selecting a detection direction of the induced current in sections after a first section on the basis of whether or not an induced current exceeding a predetermined reference value is detected in the first section that is an initial section of the detection section, and to detect the rotation state of the stepping motor by a pattern based on the induced current detected in each of the sections.

A fifth section T1a having a predetermined time width from the beginning of the first section T1 is set in the first section T1.

The rotation detection unit carries out the detection by selecting a detection direction of an induced current Ik in sections after the fifth section T1a on the basis of whether or not an induced current Ik exceeding a predetermined reference value is detected plural times in the fifth section T1a, and detects the rotation state of the stepping motor 107 by a pattern based on induced currents Ik detected in the fifth section T1a and the sections after the fifth section T1a.

Here, the rotation detection unit may be configured as follows. In a case where the induced current Ik exceeding the reference value is not detected plural times in the fifth section T1a, the rotation detection unit detects the induced current Ik by setting the fifth section T1a as the first section T1, and setting the detection direction to the same direction as the first section T1 in sections after the first section T1, and detects the rotation state of the stepping motor 107 by a pattern based on induced currents Ik detected in the first section T1 and the sections after the first section T1.

In addition, the rotation detection unit may be configured as follows. In a case where the induced current Ik exceeding the predetermined reference value is detected plural times in the fifth section T1a, the rotation detection unit detects the induced current Ik by setting a section until an induced current Ik lower than the reference value is detected after termination of the fifth section T1a as a sixth section T1b, and setting a detection direction in sections after the sixth section T1b to a direction opposite to the direction of the fifth section T1b, and detects the rotation state of the stepping motor 107 by a pattern based on induced currents Ik detected in the fifth section T1a, the sixth section T1b, and other sections.

In addition, the rotation detection unit may be configured as follows. In a case where the induced current Ik exceeding the reference value is detected plural times in the fifth section T1a, when a seventh section (the maximum width of the section T1b) until an induced current lower than the reference value is detected after termination of the fifth section T1a exceeds a predetermined time width, the rotation detection unit detects the induced current by setting a detection direction in sections after the seventh section to a direction opposite to the direction of the fifth section T1a, and detects the rotation state of the stepping motor 107 by a pattern based on induced currents Ik detected in the fifth section T1a, the seventh section, and other sections T2R and T3R.

In addition, in a state in which the stepping motor 107 is driven while retaining a rank of a main drive pulse P1, it may be configured that the fifth section T1a and the seventh section become sections in which a first forward rotation state of the rotor 202 in a second quadrant II of a space centering around the rotor 202 of the stepping motor 107 is determined.

In addition, the rotation detection unit may be configured as follows. The rotation detection unit includes first and second detection resistors 301 and 302 that detect induced currents Ik flowing through the drive coil 209 due to free vibration of the stepping motor 107 in directions opposite to each other, and detects the induced current Ik in the detection section T by alternately repeating a first closed circuit including the drive coil 209 of the stepping motor 107 and the detection resistors 301 and 302, and a second closed circuit constituted by the drive coil 209 and a low-impedance element. The rotation detection unit carries out the detection by changing the detection element constituting the first closed circuit to the first detection resistor 301 or the second detection resistor 302 in correspondence with the direction of the induced current Ik that is detected.

In the first embodiment, since the section T1 in which whether or not to change the current direction of the induced current Ik that is detected is determined is set to have a constant time width, there is a concern that an appropriate change timing may not be obtained, and it may be falsely determined as non-rotation in spite of rotation. However, in the third embodiment, the detection section (T1a+T1b) in which whether or not to change the current direction of the induced current Ik that is detected is determined varies in order for the position of the rotor 202 when the section T2R is initiated to be the horizontal magnetic pole axis X, accurate rotation detection may be carried out at an early time. In addition, since it transitions to rotation detection at an appropriate timing after determining the current direction of the induced current Ik, stable rotation detection may be carried out. In addition, false rotation determination may be avoided, and useless power consumption may be suppressed.

In addition, the movement according to each embodiment of the invention is provided with the stepping motor control circuit, and thus an analog electronic timepiece, which is capable of carrying out accurate rotation detection by reducing an effect of a load variation, may be constituted.

In addition, the analog electronic timepiece according to each embodiment of the invention is provided with each movement described above, and thus the analog electronic timepiece may carry out accurate rotation detection by reducing the effect due to the load variation, and thus an accurate hand movement operation or low power consumption may be realized.

In addition, in each embodiment of the invention, an example in which the detection section T is basically divided into three sections T1 to T3 has been described, but any application is possible as long as the sections are plural in number.

In addition, in a case where the induced current Ik exceeding each of a plurality of reference values is detected plural times in the first section T1, each embodiment of the invention is configured to carry out rotation detection by allowing the induced current Ik to flow through the drive coil 209 in a direction opposite to that of the section T1 in all sections after the section T1. However, it may be configured to carry out the rotation detection by allowing the induced current Ik to flow through the drive coil 209 in a direction opposite to that of the section T1 only in partial sections after the section T1.

In addition, the stepping motor control circuit according to each embodiment of the invention is also applicable to a stepping motor that drives components other than the time indicating hands or calendar.

In addition, as an application example of the stepping motor, the electronic timepiece has been described as an example, but the stepping motor is applicable to electronic apparatuses using a motor.

The stepping motor control circuit according to the invention is applicable to various kinds of electronic apparatuses using a stepping motor.

In addition, the movement and the analog electronic timepiece according to the invention are applicable to various kinds of analog electronic timepieces starting from various kinds of analog electronic timepiece with a calendar function such as an analog electronic watch with the calendar function and an analog electronic clock with the calendar function.

What is claimed is:

1. A stepping motor control circuit comprising:
   a rotation detection unit that detects an induced current flowing through a drive coil due to free vibration of a stepping motor in a detection section divided into a plurality of sections, and detects a rotation state of the stepping motor on the basis of a pattern indicating whether or not an induced current exceeding a predetermined reference value is detected in each of the sections by using a phenomenon in which a detection time of the induced current is delayed along with a relative load increase with respect to drive energy, and a level of the induced current decreases; and
   a control unit that selects a drive pulse corresponding to the rotation state that is detected by the rotation detection unit among a plurality of kinds of drive pulses, each having different energy, and supplies a drive current to the drive coil by the selected drive pulse to rotatably drive the stepping motor,
   wherein the rotation detection unit carries out the detection by selecting a detection direction of the induced current in sections after a first section on the basis of whether or not an induced current exceeding a predetermined reference value is detected in the first section that is an initial section of the detection section, and detects the rotation state of the stepping motor by a pattern based on the induced current detected in each of the sections.

2. The stepping motor control circuit according to claim 1, wherein the rotation detection unit carries out the detection by selecting the detection direction of the induced current in sections after the first section on the basis of whether or not the induced current exceeding the predetermined reference value is detected plural times in the initial first section of the detection section to detect the rotation state of the stepping motor by a pattern based on the induced current detected in each of the sections.

3. The stepping motor control circuit according to claim 2, wherein in a case where the induced current exceeding the predetermined reference value is detected plural times in the first section, in sections after the first section, the rotation detection unit carries out the detection by changing the detection direction of the induced current to a direction opposite to the direction of the first section to detect the rotation state of the stepping motor by a pattern based on the induced current detected in each of the sections.

4. The stepping motor control circuit according to claim 2, wherein in a case where the induced current exceeding the predetermined reference value is not detected plural times in the first section, in sections after the first section, the rotation detection unit detects the induced current by setting the detection direction to the same direction as the first section to detect the rotation state of the stepping motor by a pattern based on the induced current detected in each of the sections.

5. The stepping motor control circuit according to claim 2, wherein the detection is carried out by allowing the drive current and the induced current to flow in the same direction in the first section.

6. The stepping motor control circuit according to claim 2, wherein as the reference value, a first reference value and a second reference value larger than the first reference value are set, and
   in a case where the induced current exceeding the first reference value is detected plural times in the first section, in sections after the first section, the rotation detection unit changes the detection direction of the induced current to a direction opposite to the direction of the first section, and detects the induced current on the basis of the first reference value.

7. The stepping motor control circuit according to claim 6, wherein the detection section is divided into the first section after driving with the drive pulse, a second section after the first section, and a third section after the second section, and in a state in which the stepping motor is driven while retaining a rank of the drive pulse, the first section is a section in which a first forward rotation state of the rotor in a second quadrant of a space centering around the rotor of the stepping motor is determined, the second section is a section in which the first forward rotation state of the rotor in the second quadrant, and a first forward rotation state of the rotor in a third quadrant are determined, and the third section is a section in which a first backward rotation state of the rotor in the third quadrant is determined, and
   in a case where the induced current exceeding the first reference value is detected plural times in the first section, in the second and third sections, the rotation detection unit detects the induced current using the first reference value.

8. The stepping motor control circuit according to claim 6, wherein the detection section is divided into a first section immediately after driving with the drive pulse, a second section after the first section, and a third section after the second section, and in a state in which the stepping motor is driven while retaining a rank of the drive pulse, the first section is a section in which a first forward rotation state of the rotor in a second quadrant of a space centering around the rotor of the stepping motor is determined, the second section is a section in which the first forward rotation state of the rotor in the second quadrant, and a first forward rotation state of the rotor in a third quadrant are determined, and the third section is a section in which a first backward rotation state of the rotor in the third quadrant is determined, and in a case where the induced current exceeding the first reference value is not detected plural times in the first section, in the second and third sections, the rotation detection unit detects the induced current using the second reference value.

9. The stepping motor control circuit according to claim 2, wherein as the reference value, a first reference value and a second reference value larger than the first reference value are set, and in a case where the induced current exceeding the first reference value is not detected plural times in the first section, the rotation detection unit sets the detection direction in sections after the first section to the same direction as the first section, and detects the induced current on the basis of the second reference value.

10. The stepping motor control circuit according to claim 1, wherein a fifth section having a predetermined time width from the beginning of the first section is set in the first section, and the rotation detection unit carries out the detection by selecting a detection direction of an induced current in sections after the fifth section on the basis of whether or not an induced current exceeding a predetermined reference value is detected plural times in the fifth section, and detects the rotation state of the stepping motor by a pattern based on induced currents detected in the fifth section and the section after the fifth section.

11. The stepping motor control circuit according to claim 10, wherein in a case where the induced current exceeding the predetermined reference value is not detected plural times in the fifth section, the rotation detection unit detects the induced current by setting the fifth section as the first section, and setting the detection direction to the same direction as the first section in sections after the first section, and detects the rotation state of the stepping motor by a pattern based on induced currents detected in the first section and the section after the first section.

12. The stepping motor control circuit according to claim 10, wherein in a case where the induced current exceeding the predetermined reference value is detected plural times in the fifth section, the rotation detection unit detects the induced current by setting a section until an induced current lower than the reference value is detected after termination of the fifth section as a sixth section, and setting a detection direction in sections after the sixth section to a direction opposite to the direction of the fifth section, and detects the rotation state of the stepping motor by a pattern based on induced currents detected in the fifth section, the sixth section, and other sections.

13. The stepping motor control circuit according to claim 10, wherein in a case where the induced current exceeding the predetermined reference value is detected plural times in the fifth section, when a seventh section until an induced current lower than the reference value is detected after termination of the fifth section exceeds a predetermined time width, the rotation detection unit detects the induced current by setting a detection direction in sections after the seventh section to a direction opposite to the direction of the fifth section, and detects the rotation state of the stepping motor by a pattern based on induced currents detected in the fifth section, the seventh section, and other sections.

14. The stepping motor control circuit according to claim 13, wherein in a state in which the stepping motor is driven while retaining a rank of a main drive pulse, the fifth section and the seventh section are sections in which a first forward rotation state of the rotor in a second quadrant of a space centering around the rotor of the stepping motor is determined.

15. The stepping motor control circuit according to claim 1, wherein the rotation detection unit includes first and second detection elements that detect induced currents flowing through the drive coil due to free vibration of the stepping motor in directions opposite to each other, and is configured to detect the induced current in the detection section by alternately repeating a first closed circuit including the drive coil of the stepping motor and the detection elements, and a second closed circuit constituted by the drive coil and a low-impedance element, and the rotation detection unit carries out the detection by changing the detection element constituting the first closed circuit to the first detection element or the second detection element in correspondence with the direction of the induced current that is detected.

16. A movement comprising:

the stepping motor control circuit according to claim 1.

17. A stepping motor control circuit comprising:

a rotation detection unit that detects an induced current flowing through a drive coil due to free vibration of a stepping motor in a detection section divided into a plurality of sections, and detects a rotation state of the stepping motor on the basis of a pattern indicating whether or not an induced current exceeding a predetermined reference value is detected in each of the sections by using a phenomenon in which a detection time of the induced current is delayed along with a relative load increase with respect to drive energy, and a level of the induced current decreases; and a control unit that selects a drive pulse corresponding to the rotation state that is detected by the rotation detection unit among a plurality of kinds of drive pulses, each having different energy, and supplies a drive current to the drive coil by the selected drive pulse to rotatably drive the stepping motor, wherein the rotation detection unit includes first and second detection elements that detect induced currents flowing through the drive coil due to free vibration of the stepping motor in directions opposite to each other, and is configured to detect the induced current in the detection section by alternately repeating a first closed circuit including the drive coil of the stepping motor and the detection elements, and a second closed circuit constituted by the drive coil and a low-impedance element, and in a first section that is an initial section of the detection section, the rotation detection unit carries out the detection by selecting a detection element to be used in sections after the first section on the basis of detection results of the induced current using the first and second detection elements, and detects the rotation state of the stepping motor by a pattern based on the induced current detected in each of the sections.

18. The stepping motor control circuit according to claim 17, wherein the detection section is divided into the first section after driving with the drive pulse, a second section after the first section, and a third section after the second section, and in a state in which the stepping motor is driven while retaining a rank of the drive pulse, the first section is a section in which a first forward rotation state of the rotor in a second quadrant of a space centering around the rotor of the stepping motor is determined, the second section is a section in which a first forward rotation state of the rotor in a third quadrant is determined, and the third section is a section in which a first backward rotation state of the rotor in the third quadrant is determined, and in a case where an induced current, which exceeds a predetermined value, in a direction opposite to the direction of the drive current is detected, the rotation detection unit carries out the detection of an induced current in the same direction as the drive current after the second section, and carries out determination of a rotation state.

19. The stepping motor control circuit according to claim 18, wherein in a case where an induced current, which exceeds a predetermined value, in a direction opposite to the direction of the drive current is detected, the rotation detection unit carries out the detection of the induced current in a fourth section obtained by unifying the second section and the third section, and carries out determination of the rotation state on the basis of a pattern of induced currents detected in the first section and the fourth section.

20. The stepping motor control circuit according to claim 17, wherein the detection section is divided into the first section after driving with the drive pulse, a second section after the first section, and a third section after the second section, and in a state in which the stepping motor is driven while retaining a rank of the drive pulse, the first section is a section in which a first forward rotation state of the rotor in a second quadrant of a space centering around the rotor of the stepping motor is determined, the second section is a section in which a first forward rotation state of the rotor in a third quadrant is determined, and the third section is a section in which a first backward rotation state of the rotor in the third quadrant is determined, and in a case where an induced current, which exceeds a predetermined value, in the same direction as the drive current is detected, the rotation detection unit carries out the detection of an induced current in a direction opposite to the direction of the drive current after the second section to determine a rotation state.

21. The stepping motor control circuit according to claim 20, wherein in a case where an induced current, which exceeds a predetermined value, in the same direction as the drive current is detected, the rotation detection unit carries out determination of the rotation state on the basis of a pattern of induced currents detected in the first to third sections.

22. An analog electronic timepiece comprising:
the movement according to claim 16.

* * * * *